United States Patent
Berthoud et al.

(10) Patent No.: US 11,578,148 B2
(45) Date of Patent: Feb. 14, 2023

(54) METAL COMPLEX COMPRISING AMIDINE AND THIOPHENE FUSED CYCLOPENTADIENYL LIGANDS

(71) Applicant: ARLANXEO NETHERLANDS B.V., Geleen (NL)

(72) Inventors: Alexandra Berthoud, Neerharn (BE); Maxence Valla, Ixelles (BE); Georgy P. Goryunov, Moscow (RU); Oleg V. Samsonov, Moscow (RU); Dmitry Y. Mladentsev, Moscow (RU); Dmitry V. Uborsky, Moscow (RU); Alexander Z. Voskoboynikov, Moscow (RU)

(73) Assignee: Arlanxeo Netherlands B.V.

( * ) Notice: Subject to any disclaimer, the term of this patent is extended or adjusted under 35 U.S.C. 154(b) by 37 days.

(21) Appl. No.: 16/956,240

(22) PCT Filed: Dec. 13, 2018

(86) PCT No.: PCT/EP2018/084758
§ 371 (c)(1),
(2) Date: Jun. 19, 2020

(87) PCT Pub. No.: WO2019/129502
PCT Pub. Date: Jul. 4, 2019

(65) Prior Publication Data
US 2021/0087305 A1    Mar. 25, 2021

(30) Foreign Application Priority Data
Dec. 25, 2017  (WO) ................. PCT/RU2017/000969

(51) Int. Cl.
| | | |
|---|---|---|
| C07F 17/00 | (2006.01) | |
| C08F 4/6592 | (2006.01) | |
| C08F 210/16 | (2006.01) | |
| C08F 210/18 | (2006.01) | |
| C08F 4/659 | (2006.01) | |
| C08F 236/04 | (2006.01) | |

(52) U.S. Cl.
CPC .......... *C08F 4/65912* (2013.01); *C07F 17/00* (2013.01); *C08F 4/65908* (2013.01); *C08F 236/045* (2013.01); *C08F 210/18* (2013.01); *C08F 2410/01* (2013.01); *C08F 2410/04* (2013.01)

(58) Field of Classification Search
CPC ...... C07F 17/00; C08F 4/6592; C08F 210/16; C08F 210/18
See application file for complete search history.

(56) References Cited

U.S. PATENT DOCUMENTS
10,472,431 B2   11/2019   Karbaum et al.

FOREIGN PATENT DOCUMENTS
KR     1020170046462     5/2017

OTHER PUBLICATIONS

International Search Report from co-pending Application PCT/EP2018/084758 dated Feb. 22, 2019, 12 pages.
International Search Report from co-pending Application PCT/RU2017/000969 dated Aug. 24, 2018, 3 pages.
Eun Seok Park et al., Preparation of half-titanocenes of thiophene-fused trimethylcyclopentadienyl ligands and their ethylene copolymerization reactivity, Journal of Organometallic Chemistry, Aug. 3, 2011, pp. 2451-2456, vol. 696.
Office Action for corresponding Japanese Application No. 2020-554377.

*Primary Examiner* — Caixia Lu
(74) *Attorney, Agent, or Firm* — Dentons Cohen & Grigsby P.C.

(57) ABSTRACT

A metal complex of the formula (1) $TCyLMZ_p$ (1), wherein M is a group 4 metal, Z is an anionic ligand, p is the number 1 or 2, TCy is a thiophene-fused cyclopentadienyl-type ligand of the formula (2)

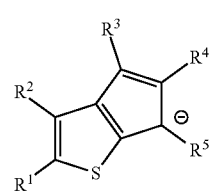

is described. Methods of making and using the metal complex are also described.

15 Claims, No Drawings

METAL COMPLEX COMPRISING AMIDINE AND THIOPHENE FUSED CYCLOPENTADIENYL LIGANDS

CROSS REFERENCE TO RELATED APPLICATION

This application is a national stage application under 35 U.S.C. § 371 of International Application No. PCT/EP2018/084758, filed Dec. 13, 2018, which claims the benefit of International Application No. PCT/RU2017/000969, filed Dec. 25, 2017, having the title METAL COMPLEX COMPRISING AMIDINE AND THIOPHENE FUSED CYCLOPENTADIENYL LIGANDS, the disclosure of each of which is incorporated herein by reference in its entirety.

The present invention relates to a metal complex comprising certain thiophene fused cyclopentadienyl and amidine ligands, a catalyst system containing said metal complex and a process for manufacturing polymers wherein said metal complex or catalyst system is used.

A process for the polymerization of at least one olefin having 2 to 8 carbon atoms in the presence of a polymerization catalyst component comprising a benzothiophene fused cyclopentadienyl and an amidine ligand, is known from KR20170046462.

Surprisingly and advantageously it is observed that catalyst components with a certain thiophene fused cyclopentadienyl and amidine ligands produce higher molecular weight polymers than in the KR20170046462 and are highly productive.

A purpose of the invention is to provide new catalyst components that provide a higher molecular weight capability than the catalyst components in the known process embodied in KR20170046462.

DETAILS OF THE INVENTION

This objective is achieved with a metal complex of the formula (1)

$$TCyLMZ_p \quad (1),$$

wherein
M is a group 4 metal
Z is an anionic ligand,
p is number of 1 to 2, preferably 2,
TCy is a thiophene fused cyclopentadienyl-type ligand of the formula (2)

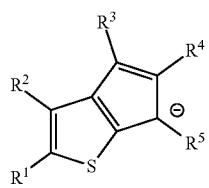

(2)

wherein
$R^1$ and $R^2$ being individually selected from the group of hydrogen, halogen, in particular Cl or Br, $C_1$-$C_{10}$-alkyl, $C_5$-$C_{10}$-cycloalkyl, an unsubstituted or $C_1$-$C_{10}$-alkyl or $C_1$-$C_4$-dialkyl amino substituted $C_6$-$C_{10}$-aryl, in particular $C_1$-$C_4$-alkyl or $C_1$-$C_4$-dialkyl amino substituted phenyl, and $SiR_3$, OR, $NR_2$, SR, $PR_2$, wherein R means individually $C_1$-$C_{10}$-alkyl, $C_5$-$C_{10}$-cycloalkyl, and an unsubstituted or $C_1$-$C_{10}$-alkyl or $C_1$-$C_4$-dialkyl amino substituted $C_6$-$C_{10}$-aryl, in particular $C_1$-$C_4$-alkyl substituted phenyl, in particular $R^1$ and $R^2$ being individually selected from the group of hydrogen, halogen, in particular Cl or Br, $C_1$-$C_{10}$-alkyl, $C_5$-$C_{10}$-cycloalkyl, an unsubstituted or $C_1$-$C_{10}$-alkyl or $C_1$-$C_4$-dialkyl amino substituted $C_6$-$C_{10}$-aryl, in particular $C_1$-$C_4$-alkyl or $C_1$-$C_4$-dialkyl amino substituted phenyl or
$R^1$ and $R^2$ together with the 2 double bond carbon atoms of the thiophene ring they are connected to form an unsubstituted or $C_1$-$C_4$-alkyl substituted aliphatic $C_5$-$C_6$-cycloalkene ring,
$R^3$, $R^4$ and $R^5$ being individually selected from the group of hydrogen, $C_1$-$C_4$-alkyl, unsubstituted or $C_1$-$C_4$-alkyl and/or halogen, in particular chlorine or fluorine substituted $C_6$-$C_{10}$-aryl, in particular $C_1$-$C_4$-alkyl substituted phenyl, and $SiR_3$, OR, $NR_2$, SR, $PR_2$, wherein R means individually $C_1$-$C_{10}$-alkyl, $C_5$-$C_{10}$-cycloalkyl, and an unsubstituted or $C_1$-$C_{10}$-alkyl or $C_1$-$C_4$-dialkyl amino substituted $C_6$-$C_{10}$-aryl, in particular $C_1$-$C_4$-alkyl substituted phenyl, whereby preferably $R^3$, $R^4$ and $R^5$ being individually selected from the group of hydrogen, $C_1$-$C_4$-alkyl, unsubstituted or $C_1$-$C_4$-alkyl and/or halogen, in particular chlorine or fluorine substituted $C_6$-$C_{10}$-aryl, in particular $C_1$-$C_4$-alkyl substituted phenyl, more preferably at least one of the radicals $R^3$ to $R^5$ shall mean $C_1$-$C_4$-alkyl, in particular methyl and,
L is an amidinate ligand of the formula (3)

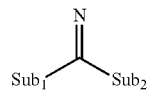

(3)

wherein the amidine-containing ligand is covalently bonded to the metal M via the imine nitrogen atom, and
$Sub_1$ is an unsubstituted or $C_1$-$C_4$-alkyl and/or halogen, in particular chlorine or fluorine substituted $C_6$-$C_{10}$-aromatic substituent, in particular phenyl and
$Sub_2$ is a substituent comprising a heteroatom of group 15, through which $Sub_2$ is bonded to the imine carbon atom or
$Sub_1$ and $Sub_2$ together with the imino group they are connected to form a ligand of formula (3a)

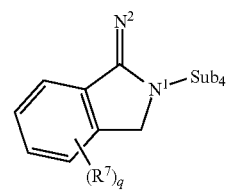

(3a)

wherein the amidine-containing ligand (3a) is covalently bonded to the metal M via the imine nitrogen atom $N^2$, wherein the benzo ring fused to the amidine ring may be unsubstituted or contain further substituents $R^7$, which are individually of the index "q" selected from the group of hydrogen, $C_1$-$C_4$-alkyl and halogen and whereby q is a number of 0 to 4, preferably 0 to 2, most preferably 0,
$Sub_4$ is an aliphatic or aromatic cyclic or linear substituent comprising a group 14 atom through which $Sub_4$ is bonded to the amino nitrogen atom $N^1$, preferably $Sub_4$ is a $C_6$-$C_{10}$- aromatic ring, preferably phenyl which is unsubstituted or substituted by one or more substituents from the group selected from halogen, in particular Cl or F and $C_1$-$C_4$-alkyl.
$R^1$ and $R^2$ In a preferred embodiment $R^1$ and $R^2$ being individually selected from the group of hydrogen, $C_1$-$C_{10}$-alkyl, $C_5$-$C_{10}$-cycloalkyl, and an unsubstituted or $C_1$-$C_{10}$-alkyl substituted $C_6$-$C_{10}$-aryl, in particular $C_1$-$C_4$-alkyl substituted Phenyl or $R^1$ and $R^2$ together with the 2 double bond carbon atoms of the thiophene ring they are connected to form an unsubstituted or $C_1$-$C_4$-alkyl substituted aliphatic $C_5$-$C_6$-cycloalkene ring.
M In a preferred embodiment the metal M of group 4 is titanium (Ti), zirconium (Zr) or hafnium (Hf), most preferably titanium.
TCy As used herein, the term cyclopentadienyl-type ligand is meant to broadly convey its conventional meaning, namely a substituted ligand having a five-membered carbon ring which is bonded to the metal via a π-type bonding usually in adopting $\eta^5$-coordination to the metal.

Preferably the substituents $R^3$, $R^4$ and $R^5$ of the TCy ligand shall individually have the following meaning, hydrogen, $C_1$-$C_4$-alkyl, in particular methyl and isopropyl, phenyl, fluorophenyl and halogen. In one preferred embodiment $R^3$ to $R^5$ shall all individually be selected from a group consisting of hydrogen, methyl and isopropyl.

Also preferred is the metal complex of formula (1) wherein TCy is a thiophene fused cyclopentadienyl-type ligand of the formula (2a)

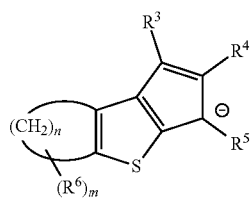

(2a)

wherein
n is a number of 3 to 4 and
$R^6$ means for each index m individually a $C_1$-$C_4$-alkyl,
m is a number of 0 to 4, preferably 0 to 2 and $R^3$, $R^4$ and $R^5$
have the above given meaning.

Any $R^6$ substituent would substitute a hydrogen of the respective $CH_2$ units fused to the thiophene ring.
Z In a preferred embodiment Z independently means a halogen atom, a $C_{1-10}$ alkyl group, a $C_{7-20}$ aralkyl group, a $C_{6-20}$ aryl group or a $C_{1-20}$ hydrocarbon-substituted amino group, a $C_{1-20}$ alkoxy group and more preferably, a halogen atom and a $C_{1-10}$ alkyl group, a $C_{7-20}$ aralkyl group, most preferably Cl, methyl, benzyl, methyltrimethylsilyl. Most preferred are Cl or methyl. In case p is more than 1, means p=2, the given meanings for Z are independent. Preferably p=2 and both Z are identical.
L Typical examples for such a preferred amidinate-containing ligand are represented by formula 3 with $Sub_1$ being a phenyl or substituted phenyl residue, preferably 2,6-dimethyl phenyl, 2,6-dichlorophenyl or 2,6-difluorophenyl.

Another preferred embodiment of the present invention relates to a metal complex of the formula (1) having an L of the formula (2), wherein Sub2 is of the general formula —$NR^8R^9$ with $R^8$ and $R^9$ being individually selected from the group of aliphatic hydrocarbyl, halogenated aliphatic hydrocarbyl, aromatic hydrocarbyl and halogenated aromatic hydrocarbonyl residues. $R^8$ optionally forming a heterocyclic structure with $R^9$ or $Sub_1$. Examples for $Sub_2$ are dimethylamide, diisopropylamide and biscyclohexyl amide. Most preferred examples of the amidinate-containing ligand represented by the formula (3) are based on protio-amidines of the formula (3H)

(3H)

Examples include N,N-dimethylacetimidamide, N,N-diisopropylacetimidamide, N,N-dicyclohexylacetimidamide, N-(2,6-dimethylphenyl)-N-ethylacetimidamide, N,N-dimethylisobutyrimidamide, N,N-diisopropylisobutyrimidamide, N,N-dicyclohexyliso-butyrimidamide, N-(2,6-dimethylphenyl)-N-ethylisobutyrimidamide, N,N-dimethyl-cyclohexanecarboximidamide, N,N-diisopropylcyclohexanecarboximidamide, N,N-dicyclohexylcyclohexanecarboximidamide, N-(2,6-dimethylphenyl)-N-ethylcyclohexane-carboximidamide, N,N-dimethylpivalimidamide, N,N-diisopropylpivalimidamide, N,N-dicyclohexylpivalimidamide, N-(2,6-dimethylphenyl)-N-ethylpivalimidamide, 2,2,2-trifluoro-N,N-dimethylacetimidamide, 2,2,2-trifluoro-N,N-diisopropylacetimidamide, N,N-dicyclohexyl-2,2,2-trifluoroacetimidamide, N-(2,6-dimethylphenyl)-N-ethyl-2,2,2-trifluoro-acetimidamide, 2-(phenyl)-N,N-dimethylacetimidamide, 2-(phenyl)-N,N-diisopropylacetimidamide, N,N-dicyclohexyl-2-(phenyl)acetimidamide, 2-(phenyl)-N-(2,6-dimethylphenyl)-N-ethylacetimidamide, 2-(2,6-dimethylphenyl)-N,N-dimethylacetimidamide, 2-(2,6-dimethylphenyl)-N,N-diisopropylacetimidamide, N,N-dicyclohexyl-2-(2,6-dimethylphenyl)acetimidamide, N,2-bis(2,6-dimethylphenyl)-N-ethylacetimidamide, 2-(2,6-difluorophenyl)-N,N-dimethylacetimidamide, 2-(2,6-difluorophenyl)-N,N-diisopropylacetimidamide, N,N-dicyclohexyl-2-(2,6-difluorophenyl)acetimidamide, 2-(2,6-difluorophenyl)-N-(2,6-dimethylphenyl)-N-ethyl-acetimidamide, N,N-dimethyl-benzimidamide, N,N-diisopropylbenzimidamide, N,N-dicyclohexylbenzimidamide, N-(2,6-dimethylphenyl)-N-ethylbenzimidamide, N,N-dimethyl-1-naphthimidamide, N,N-diisopropyl-1-naphthimidamide, N,N-dicyclohexyl-1-naphthimidamide, N-(2,6-dimethyl-phenyl)-N-ethyl-1-naphthimidamide, N, N,2,6-tetra-methylbenzimidamide, N,N-diiso-propyl-2,6-dimethylbenzimidamide, N,N-dicyclohexyl-2,6-dimethylbenzimidamide, N-(2,6-dimethylphenyl)-N-ethyl-2,6-dimethylbenz-imidamide, 2,6-difluoro-N,N-dimethyl-benzimidamide, 2,6-difluoro-N,N-diisopropyl-benzimidamide, N,N-dicyclohexyl-2,6-difluorobenzimidamide, N-(2,6-dimethylphenyl)-N-ethyl-2, 6-difluorobenzimidamide, 2,6-dichloro-N,N-dimethylbenzimidamide, 2,6-dichloro-N,N-diisopropylbenzimidamide, 2,6-dichloro-N,N-dicyclohexylbenzimidamide, 2,6-dichloro-N-(2,6-dimethylphenyl)-N-ethyl-benzimidamide. Preferred examples are 2,6-difluoro-N,N-piperidinylbenzamidine, 2,4-difluoro-N,N-diisopropylbenz-imidamide (2,4-difluoro- N,N-diisopropylbenzamidine), 2,4,6-trifluoro-N,N-diisopropylbenz-imidamide (2,4,6-trifluoro-N,N-diisopropylbenzamidine), 3,5-difluoro-N,N-diisopropylbenz-imidamide (3,5-difluoro-N,N-diisopropylbenzamidine), pentafluoro-N,N-diisopropylbenz-imidamide (pentafluoro-N,N-diisopropylbenzamidine), 2,6-difluoro-N,N-diisopropylbenz-imidamide (2,6-difluoro-N,N-diisopropylbenzamidine) and N,N-diisopropylbenzimidamide (N,N-diisopropylbenzamidine).

Another preferred embodiment of the present invention relates to a metal complex of the formula (1) having a ligand L of the formula (3a)

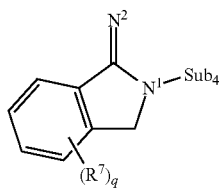

(3a)

wherein the amidine-containing ligand (3a) is covalently bonded to the metal M via the imine nitrogen atom $N^2$, wherein the benzo ring fused to the amidine ring may be unsubstituted or contain further substituents $R^7$, which are individually of the index "q" selected from the group of hydrogen, $C_1$-$C_4$-alkyl and halogen and whereby q is a number of 0 to 4, preferably 0 to 2, most preferably 0, $Sub_4$ is an aliphatic or aromatic cyclic or linear substituent comprising a group 14 atom through which $Sub_4$ is bonded to the amino nitrogen atom $N^1$, preferably $Sub_4$ is a $C_6$-$C_{10}$ aromatic ring, preferably phenyl which is unsubstituted or substituted by one or more substituents from the group selected from halogen, in particular Cl or F and $C_1$-$C_4$-alkyl, in particular methyl.

Typical examples for preferred $R^7$ are hydrogen and fluorine.

Preferred is a metal complex of formula (1), wherein
M is Ti,
Z is selected from the group consisting of chlorine, $C_1$-$C_4$-alkyl and $C_{7-20}$ aralkyl, preferably methyl or benzyl
p is 2
TCy is a ligand of the formula (2) wherein $R_1$ and $R_2$ are independently of another hydrogen, methyl, phenyl, or $C_1$-$C_4$-alkyl substituted phenyl,
$R^3$, $R^4$ and $R^5$ are independently of another hydrogen, methyl, fluorophenyl, i-propylphenyl, or
TCy is a ligand of the formula (2a) wherein m=0.

Process

The invention further relates to a process for the manufacturing of a metal complex of formula (1), wherein a metal complex of the formula (3)

$$TCyMZ_{p+1} \qquad (3)$$

is reacted with an amidine of the formula LH or its hydrohalogen acid salt LH.HZ wherein L has the meaning according to at least one of claims 1 to 6 and Z means halogen, aralkyl or alkoxy, in particular Cl, benzyl or isopropoxyl.

The reaction with LH or its hydrohalogen acid salt LH.HZ is preferably carried out in a suitable solvent and preferably in the presence of suitable base.

Suitable bases include organic bases, inorganic bases, and organometallics. Typical examples for suitable bases are triethylamine and methylmagnesium bromide/chloride.

A suitable solvent is preferably an aromatic or aliphatic hydrocarbon solvent. The reaction is preferably carried out at ambient pressure, preferably at 0.9 bar to 1.1 bar, and a temperature in the range of 0 to 90° C. More preferably, in the range 20 to 60° C.

The molar ratio of LH or LH.HZ to $TCyMZ_{p+1}$ is preferably in the range of 0.8 to 1.5, most preferably the ratio is 0.95 to 1.05. The molar ratio of suitable base to LH, LH.HZ is preferably in the range of 1 to 5, more preferably the ratio is 2 to 4.

The metal complex of formula (1) wherein Z means a halogen atom may be isolated using techniques well known to those skilled in the art by filtration, to remove any inorganic or organic salt byproducts, followed by removal of volatiles under reduced pressure or by crystallization with subsequent removal of the mother liquor by filtration or by decantation. Optionally the crude mixture may be employed in polymerization reactions without further work-up or purification steps.

Techniques well-known to those skilled in the art are used to obtain further a metal complex of the formula 1 wherein Z means a C1-10 alkyl group, a C7-20 aralkyl group, a C6-20 aryl group from the metal complex of formula (1) wherein Z means a halogen atom by using suitable hydrocarbylating reagents for the salt metathesis reaction preferably in a suitable solvent. Preferably, Grignard reagents or organolithium reagents are employed as alkylating agents. The molar ratio of hydrocarbylating agent, in particular the alkylating agent to the metal complex of formula (1) is preferably in the range of 1.8 to 5.0, more preferably in the range 2.0-2.5. The alkylating agent is preferably methyl magnesium chloride, methyl lithium, benzyl magnesium chloride or benzyl magnesium bromide. This may be carried out at ambient pressure, preferably at 0.9 bar to 1.1 bar and a temperature in the range of 0 to 90° C. Preferably in the range −30° C. to 30° C.

Alternatively, a metal complex of the formula (1) wherein Z means a C1-10 alkyl group, a $C_{7-20}$ aralkyl group, a C6-20 aryl group may be prepared by combining LH or LH.HZ with $TCyMZ_{p+1}$ wherein Z means a C1-10 alkyl group, a C7-20 aralkyl group, a C6-20 aryl group and A, p and n have the above mentioned meaning in a suitable solvent. Suitable solvents preferably are aromatic or aliphatic hydrocarbon solvents. This may be carried out at ambient pressure, preferably at 0.9 bar to 1.1 bar, preferably at temperatures in the range of 0 to 120° C. More preferably in the range 70 to 110° C.

The invention further provides a catalyst system comprising
a) a metal complex of the formula (1) according to the present invention and
b) an activator and
c) optionally a scavenger.

The preferred metal complex of compound a) is mentioned above. A scavenger c) is a compound that reacts with impurities present in the process of the invention, which are poisonous to the catalyst.

In a preferred embodiment of the present invention the scavenger c) as of the catalyst system is a hydrocarbyl of a metal or metalloid of group 1-13 or its reaction products with at least one sterically hindered compound containing a group 15 or 16 atom. Preferably, the group 15 or 16 atom of the sterically hindered compound bears a proton. Examples of these sterically hindered compounds are tert-butanol, iso-propanol, triphenylcarbinol, 2,6-di-tert-butylphenol, 4-methyl-2,6-di-tert-butylphenol, 4-ethyl-2,6-di-tert-butylphenol, 2,6-di-tert-butylanilin, 4-methyl-2,6-di-tertbutylanilin, 4-ethyl-2,6-di-tert-butylanilin, HMDS (hexamethyldisilazane), diisopropylamine, di-tert-butylamine, diphenylamine and the like. Some non-limiting examples of scavengers are organoaluminium compounds (E), butyllithium including its isomers, dihydrocarbylmagnesium, and hydrocarbylzinc and their reaction products with a sterically hindered compound or an acid, such as HF, HCl, HBr, HI. Furthermore organoaluminium compounds (E) as defined below can be used as activator b), in particular hydrocarbylaluminoxanes like methylaluminoxane (MAO).

Activators of the component b) for single-site catalysts are fairly well known in the art. These activators often comprise a group 13 atom, such as boron or aluminium. Examples of these activators are described in *Chem. Rev.*, 2000, 100, 1391 by E. Y-X. Chen and T. J. Marks. A preferred activator b) is a borane (C1), a borate (C2, C3) or an organoaluminum compound (E) like alkylaluminoxane such as methyl aluminoxane (MAO). The activator for activation preferably is any boron compound of the following (C1) to (C3) and/or an organoaluminum compound (E). The organoaluminum compound (E) may be employed as a scavenger and/or an activator.

(C1) A boron compound represented by the general formula $BQ_1Q_2Q_3$ (C2) A boron compound represented by the general formula $G(BQ_1Q_2Q_3Q_4)$ (C3) A boron compound represented by the general formula $(J-H)(BQ_1Q_2Q_3Q_4)$ $Q_1$ to $Q_3$ are a halogen atom, hydrocarbon group, halogenated hydrocarbon group, substituted silyl group, alkoxy group or di-substituted amino group, and they may be the same or different. $Q_1$ to $Q_3$ are preferably a halogen atom, hydrocarbon group having 1 to 20 carbon atoms, halogenated hydrocarbon group having 1 to 20 carbon atoms, substituted silyl group having 1 to 20 carbon atoms, alkoxy group having 1 to 20 carbon atoms or amino group having 2 to 20 carbon atoms, and more preferably, $Q_1$ to $Q_3$ are a halogen atom, hydrocarbon group having 1 to 20 carbon atoms, or halogenated hydrocarbon group having 1 to 20 carbon atoms. Further preferably, $Q_1$ to $Q_3$ are a fluorinated hydrocarbon group having 1 to 20 carbon atoms containing at least one fluorine atom, and particularly preferably, $Q_1$ to $Q_3$ are a fluorinated aryl group having 6 to 20 carbon atoms containing at least one fluorine atom. $Q_4$ has the same meaning as one of the radicals $Q_1$ to $Q_3$ and $Q_1$ to $Q_4$ may be the same or different. G is an inorganic or organic cation, J is a neutral Lewis base, and (J-H) is a Bronsted acid.

In the boron compound (C1) represented by the general formula $BQ_1Q_2Q_3$, B is a boron atom in the trivalent valence state, $Q_1$ to $Q_3$ have the above mentioned meanings and may be the same or different.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenyl-bis(pentafluoro-phenyl)-borane and the like, and tris(pentafluorophenyl)borane is most preferable.

In the boron compound (C2) represented by the general formula $G(BQ_1Q_2Q_3Q_4)$, $G^+$ is an inorganic or organic cation, B is a boron atom in the trivalent valence state, and $Q_1$ to $Q_4$ are as defined for $Q_1$ to $Q_3$ in the above-mentioned (C1).

Specific examples of the inorganic cation G in a compound represented by the general formula $G(BQ_1Q_2Q_3Q_4)$ include a ferrocenium cation, alkyl-substituted ferrocenium cation, silver cation and the like, specific examples of the organic cation G thereof include a triphenylmethyl cation and the like. G is preferably a carbenium cation, and particularly preferably a triphenylmethyl cation.

Examples of (B $Q_1Q_2Q_3Q_4$) include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, teterakis(2,3,4-trifluorophenyl)borate, phenyltris(pentafluoro-phenyl) borate, tetrakis(3,5-bistrifluoromethylphenyl)borate and the like.

As specific combination of them, ferroceniumtetrakis(pentafluorophenyl)borate, 1,1'-dimethylferroceniumtetrakis(pentafluorophenyl)borate, silvertetrakis(pentafluorophenyl)borate, triphenylmethyltetrakis-(pentafluorophenyl)borate, triphenylmethyl-tetrakis(3,5-bistrifluoromethylphenyl)borate and the like are listed, and triphenylmethyltetrakis(pentafluorophenyl)borate is most preferable.

In the boron compound (C3) represented by the general formula $(J-H)^+(BQ_1Q_2Q_3Q_4)$, is a neutral Lewis base, (J-H) is a Bronsted acid, B is a boron atom in the trivalent valence state, and $Q_1$ to $Q_4$ are as defined for $Q_1$ to $Q_4$ in the above-mentioned Lewis acid (C1).

Specific examples of the Bronsted acid $(J-H)^+$ in a compound represented by the general formula (J-H) $(BQ_1Q_2Q_3Q_4)$ include a trialkyl-substituted ammonium, N,N-dialkylanilinium, dialkylammonium, triaryl phosphonium and the like, and as the (B $Q_1Q_2Q_3Q_4$), the same compounds as described above are listed. As specific combination of them, there are listed triethylammoniumtetrakis(pentafluoro-phenyl)-borate, tripropylammoniumtetrakis(pentafluorophenyl)borate, tri(n-butyl)ammonium-tetrakis(pentafluorophenyl)borate, tri(n-butyl)ammoniumtetrakis(3,5-bistrifluoromethyl-phenyl)borate, N,N-dimethylaniliniumtetrakis(pentafluoro-phenyl)borate, N,N-diethylaniliniumtetrakis(penta-fluorophenyl)borate, N,N-2,4,6-pentamethylanilinium-tetrakis(pentafluorophenyl)borate, N,N-dimethylanilinium-tetrakis(3,5-bistrifluoromethyl-phenyl)borate, diisopropylammoniumtetrakis(penta-fluorophenyl)borate, dicyclohexyl-ammoniumtetrakis-(pentafluorophenyl)borate, triphenylphosphoniumtetrakis(penta-fluorophenyl)borate, tri(methylphenyl)phosphoniumtetrakis(pentafluorophenyl)borate, tri(dimethylphenyl)-phosphonium-tetrakis(pentafluorophenyl)borate and the like, and tri(n-butyl) ammonium-tetrakis(pentafluorophenyl)borate or N,N-dimethylaniliniumtetra-kis(pentafluoro-phenyl)borate is most preferable.

The molar ratio of metal complex:activating cocatalyst C1-03 employed preferably ranges from 1:10 to 2:0, more preferably ranges from 1:5 to 1:0, and most preferably from 1:3 to 1:1.

The organoaluminum compound (E) is an aluminum compound having a carbon-aluminum bond, and one or more of aluminum compounds selected from the following (E1) to (E3) are preferable.

(E1) An organoaluminum compound represented by the general formula $T^1_a AlZ_{3-a}$ (E2) A cyclic aluminoxane having a structure represented by the general formula $\{-Al(T^2)-O-\}_b$ (E3) Linear aluminoxane having a structure represented by the general formula $T^3\{-Al(T^3)-O-\}_c AlT^3_2$ (wherein, each of $T^1$, $T^2$ and $T^3$ is hydrocarbon group, and all $T^1$, all $T^2$ and all $T^3$ may be the same or different respectively. Z represents a hydrogen atom or halogen atom, and all Z's may be the same or different. 'a' represents a number satisfying $0 < a \leq 3$, 'b' is an integer of 2 or more, and 'c' is an integer of 1 or more.).

The hydrocarbon group in E1, E2 or E3 is preferably a hydrocarbon group having 1 to 8 carbon atoms, and more preferably an alkyl group.

Specific examples of the organoaluminum compound (E1) represented by the general formula $T^1{}_a AlZ_{3-a}$ include trialkylaluminums such as trimethylaluminum, triethylaluminum, tripropylaluminum, triisobutylaluminum, trihexylaluminum and the like; dialkylaluminum chlorides such as dimethylaluminum chloride, diethylaluminum chloride, dipropylaluminum chloride, diisobutylaluminum chloride, dihexylaluminum chloride and the like; alkylaluminum dichlorides such as methylaluminum dichloride, ethylaluminum dichloride, propylaluminum dichloride, isobutylaluminum dichloride, hexylaluminum dichloride and the like; dialkylaluminum hydrides such as dimethylaluminum hydride, diethylaluminum hydride, dipropylaluminum hydride, diisobutylaluminum hydride, dihexylaluminum hydride and the like; and so forth.

A preferred activator-scavenger combination is $[CPh_3][B(C_6F_5)_4]/MAO$.

Specific examples of cyclic aluminoxane E2 having a structure represented by the general formula $\{Al(T^2)\text{-}O\text{---}\}_b$ and the linear aluminoxane E3 having a structure represented by the general formula $T^3\{Al(T^3)\text{-}O\text{---}\}_c AlT^3{}_2$ include alkyl groups such as a methyl group, ethyl group, n-propyl group, isopropyl group, n-butyl group, isobutyl group, n-pentyl group, neopentyl group and the like. b is an integer of 2 or more, c is an integer of 1 or more. Preferably, $T^2$ and $T^3$ represent a methyl group or isobutyl group, and b is 2 to 40 and c is 1 to 40.

The above-described aluminoxane is made by various methods. This method is not particularly restricted, and the aluminoxane may be produced according to a known method. For example, a solution prepared by dissolving at least one trialkylaluminum (for example, trimethylaluminum and the like) in a suitable organic solvent (benzene, an aliphatic hydrocarbon or the like) is allowed to contact with water to produce aluminoxane.

The molar ratio of metal complex (1):scavenger c) employed preferably ranges from 0.1:1000 to 0.1:10, more preferably ranges from 0.1:1000 to 0.1:300, and most preferably from 0.14:600 to 0.14:400.

Polymerization

The invention further provides a process for the polymerization of a polymer by polymerizing at least one, preferably at least two olefinic monomer comprising contacting said monomer with a metal complex of formula (1).

The metal complex of the formula (1) may also be used as a supported catalyst which comprises a organometallic compound of formula (1), a supporting material and optionally the activator (b) and/or a scavenger (c).

A supporting material is defined as an inorganic or organic compound that does not dissolve in the inert hydrocarbon solvent in which the process of the invention is carried out. Suitable inorganic supports include silica, magnesium halides, such as $MgF_2$, $MgCl_2$, $MgBr_2$, $MgI_2$, zeolites, and alumina. Suitable organic supports include polymers. Some non-limiting examples of polymeric supports are polyolefins such as polystryrene, polypropylene and polyethylene, polycondensates such as polyamides and polyesters and combinations thereof.

The preferred process for polymerization is generally concluded by contacting at least one preferably at least two olefinic monomers with the metal complex of the formula (1) or the catalyst system according to the present invention in the gas phase, in slurry, or in solution in an inert solvent preferable a hydrocarbon solvent. Suitable solvents are in the gas phase, in slurry, or in solution in an inert solvent preferable a hydrocarbon solvent. Suitable solvents are a $C_{5-12}$ hydrocarbon such as pentane, hexane, heptane, octane, isomers and mixtures thereof, cyclohexane, methylcyclohexane, pentamethyl heptane and hydrogenated naphtha. The process of the invention may be conducted at temperatures from 10 to 250° C., depending on the product being made.

Monomer Definition

An olefinic monomer is understood to be a molecule containing at least one polymerizable double bond.

Suitable olefinic monomers are $C_{2-20}$ olefins. Preferred monomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, and $C_{4-12}$ straight chained or cyclic hydrocarbyl radicals which are unsubstituted or substituted by a $C_{1-4}$ alkyl radical. Illustrative non-limiting examples of such a-olefins are propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-hepta-decene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These a-olefins may be used in combination.

The monomer may also be a polyene comprising at least two double bonds. The double bonds may be conjugated or non-conjugated in chains, ring systems or combinations thereof, and they may be endocyclic and/or exocyclic and may have different amounts and types of substituents. This means that the polyene may comprise at least one aliphatic, alicyclic or aromatic group, or combinations thereof.

Suitable polyenes include aliphatic polyenes and alicyclic polyenes. More specifically, aliphatic polyenes can be mentioned, such as 1,4-hexadiene, 3-methyl-1,4-hexadiene, 4-methyl-1,4-hexadiene, 5-methyl-1,4-hexadiene, 4-ethyl-1,4-hexadiene, 1,5-hexadiene, 3-methyl-1,5-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 1,8-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 1,9-decadiene, 1,5,9-decatriene, 6-methyl-1,6-undecadiene, 9-methyl-1,8-undecadiene and 1,13-tetradecadiene, 1,3-butadiene, isoprene.

Alicyclic polyenes may consist of at least one cyclic fragment. Examples of these alicyclic polyenes are vinylcyclohexene, vinylnorbornene, ethylidene norbornene, dicyclopentadiene, cyclooctadiene, 2,5-norbornadiene, 1,4-divinylcyclohexane, 1,3-divinylcyclohexane, 1,3-divinylcyclopentane, 1,5-divinylcyclooctane, 1-allyl-4-vinylcyclo-hexane, 1,4-diallylcyclohexane, 1-allyl-5-vinylcyclooocatane, 1,5-diallylcyclooctane, 1-allyl-4-isopropenylcyclohexane, 1-isopropenyl-4-vinylcyclohexane and 1-isopropenyl-3-vinylcyclopentane, and 1,4-cyclohexadiene. Preferred polyenes are polyenes having at least one endocyclic double bond and optionally at least one exocyclic double bond, such as 5-methylene-2-norbornene and 5-ethylidene-2-norbornene, 5-vinylnorbornene, and 2,5-norbornadiene, dicyclopentadiene and vinylcyclohexene.

Examples of aromatic polyenes are divinylbenzene (including its isomers), trivinyl-benzene (including its isomers) and vinylisopropenylbenzene (including its isomers).

All of the above-mentioned monomers may be further substituted with at least one group comprising a heteroatom of group 13-17, or combinations thereof.

Homopolymers, copolymers and copolymers on the basis of 3 or more of the above-mentioned olefinic monomers and also blends thereof can be prepared with the process of the present invention.

In a preferred embodiment copolymers on the basis of ethylene, at least one $C_{3-12}$ alpha olefin, preferably propylene and at least one non-conjugated diene, preferably a diene selected from the group consisting of 5-methylene-2-norbornene 5-ethylidene-2-norbornene, 5-vinylnorbornene, 2,5-norbornadiene, dicyclopentadiene (DCPD) and vinylcyclohexene, preferably from the group consisting of 5-ethylidene-2-norbornene and 5-vinylnorbornene are made with metal complex of the present invention.

The invention further relates to polymers obtainable with the metal complex of the present invention or the catalyst system of the present invention. Below, the invention will be elucidated on the basis of the following examples and comparative experiments, without being limited thereto.

Examples

Test Methods.
Size Exclusion Chromatography with IR Detector (SEC-IR)
Equipment: Freeslate Rapid GPC system with single detection (Infrared detector IR4 Standalone by Polymer Char)
Columns: PLGel Mixed-B 10 μm (×3 300×7.5 mm columns)
Calibration: Calibration with linear polystyrene (PS) standards (molecular weight ca. 30-3000 kg/mol)
Temperature: 140° C.
Flow: 1.5 ml/min
Injection volume: 125 μl
Solvent/eluent: 1,2,4-trichlorobenzene with 0.4 g/l of BHT stabilizer
Sample preparation: Dissolving for 2 hours at approx. 140° C.
Filtration through 2 and 0.5 micron sintered glass filter
Sample concentration 1.5 mg/ml
NMR ($^1$H, 400 MHz) spectra were measured on a Bruker Avance 400 spectrometer.
Fourier transformation infrared spectroscopy (FT-IR), was used to determine the composition of the copolymers according to the method that is known in the art. The FT-IR measurement gives the composition of the various monomers in weight percent relative to the total composition.

Composition was determined using mid-range FT-IR spectroscopy.

Part I: Synthesis of Ligands and Compounds
General.

All manipulations were carried out using standard Schlenk line or dry-box techniques under an atmosphere of argon or nitrogen. Solvents were degassed by sparging with nitrogen and dried by passing through a column of the appropriate drying agent. Toluene was refluxed over sodium and distilled. Deuterated solvents were dried over potassium ($C_6D_6$) or $P_2O_5$ (CDCl$_3$ and CD$_2$Cl$_2$), distilled under reduced pressure and stored under nitrogen in Teflon valve ampoules. NMR samples were prepared under nitrogen in 5 mm Wilmad 507-PP tubes fitted with J. Young Teflon valves. $^1$H and $^{13}$C—{$^1$H} spectra were recorded at ambient temperature and referenced internally to residual protio-solvent ($^1$H) or solvent ($^{13}$C) resonances, and are reported relative to tetramethylsilane (d=0 ppm). Chemical shifts are quoted in δ (ppm) and coupling constants in Hz.

Synthesis of Ligands and Literature Compounds 1.1. Syntheses of Ligands 1.1.1. Synthesis of 4,5-Dimethyl-4,5-dihydro-6H-cyclopenta[b]thiophen-6-one

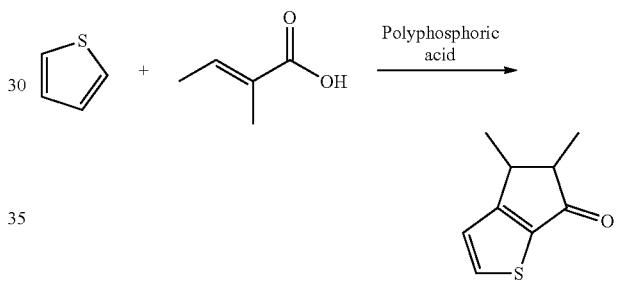

To polyphosphoric acid prepared from 400 g of $P_4O_{10}$ and 280 g of 85% $H_3PO_4$ a mixture of 33.6 g (400 mmol) of thiophene and 40.0 g (400 mmol) of tiglic acid in 50 ml of dichloromethane was added for 2.5 h at 50° C. The mixture was stirred at this temperature for 2 h and poured into 1 l of ice-cold water. The product was extracted with 4×300 ml of ethyl acetate. The combined extracts were washed by aqueous Na$_2$CO$_3$, dried over K$_2$CO$_3$, and the solvent was evaporated in vacuum. Fractional rectification of crude product gave 47.0 g (70%) of colorless oil which solidified at room temperature, b.p. 87-90° C. under 2 mbar.

$^1$H NMR (CDCl$_3$, 400 MHz): δ 7.90-7.91 (d, J=4.8 Hz, 1H), 7.05-7.06 (d, J=4.7 Hz, 1H), 2.88-2.94 (m, 1H), 2.53-2.59 (m, 1H), 1.40-1.42 (d, J=7.6 Hz, 3H), 1.34-1.36 (d, J=7.2 Hz, 3H).

1.1.2. Synthesis of 4,5,6-Trimethyl-4H-cyclopenta[b]thiophene

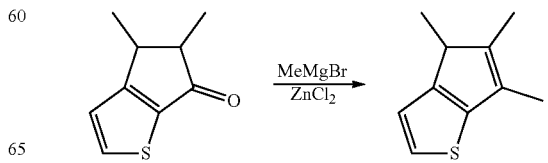

To a solution of 3.65 g (27 mmol) of ZnCl$_2$ in 150 ml of THF 62 ml (180 mmol, 2.87M in ether) of MeMgBr was added, then a solution of 15.0 g (90 mmol) of 4,5-dimethyl-4,5-dihydro-6H-cyclopenta[b]thiophen-6-one in 100 ml of THF was added also. The resulting mixture was stirred overnight at 65° C., then poured into ice-cold 5% HCl. The organic layer was separated, and the aqueous layer was extracted with 3×100 ml of ethyl acetate. The combined extract was dried over Na$_2$SO$_4$ and evaporated to dryness. The product was isolated by flash chromatography on silica gel 60 (40-63 um, eluent: hexane). This procedure gave 13.1 g (88%) of a yellowish oil.

$^1$H NMR (CDCl$_3$, 400 MHz): δ 7.08-7.09 (d, J=4.4 Hz, 1H), 7.00-7.01 (d, J=4.1 Hz, 1H), 3.07-3.13 (m, 1H), 2.05 (s, 3H), 1.97 (s, 3H), 1.26-1.28 (d, 3H).

1.1.3. Synthesis of 2,4,5-Trimethyl-4,5-dihydro-6H-cyclopenta[b]thiophen-6-one

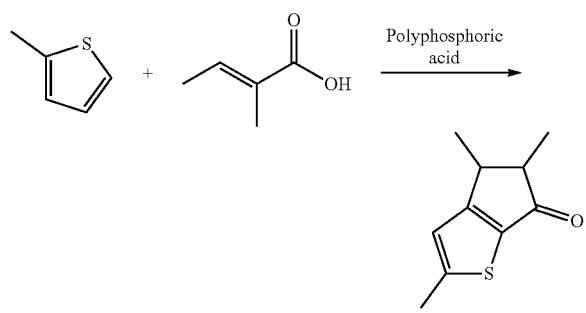

To polyphosphoric acid prepared from 300 g of P$_4$O$_{10}$ and 210 g of 85% H$_3$PO$_4$ a mixture of 29.5 g (300 mmol) of 2-methylthiophene and 30.0 g (300 mmol) of tiglic acid in 40 ml of dichloromethane was added for 2.5 h at 50° C. This mixture was stirred at this temperature for 2 h and then poured into 1 l of ice-cold water. The product was extracted with 4×200 ml of ethyl acetate. The combined extract was washed by aqueous Na$_2$CO$_3$, dried over K$_2$CO$_3$, and then solvent was evaporated in vacuum. Fractional rectification of crude product gave 44.0 g (82%) of colorless oil which solidified at room temperature, b.p. 119-120° C./3 mbar.

$^1$H NMR (CDCl3, 400 MHz): δ 6.71 (s, 1H), 2.76-2.82 (m, 1H), 2.53 (s, 3H), 2.38-2.44 (m, 1H), 1.26-1.33 (m, 6H).

1.1.4. Synthesis of 3-Bromo-2,4,5-trimethyl-4,5-dihydro-6H-cyclopenta[b]thiophen-6-one

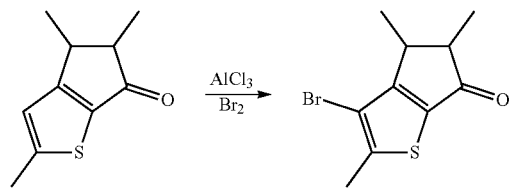

A solution of 39.0 g (215 mmol) of 2,4,5-trimethyl-4,5-dihydro-6H-cyclopenta-[b]thiophen-6-one in 100 ml of dichloromethane was added to a suspension of 72.0 g (540 mmol) of AlCl$_3$ in 300 ml of dichloromethane at 0° C. The resulting suspension was stirred for 10 min followed by addition of 34.6 g (215 mmol) of bromine. The reaction mixture was stirred for 1 h at room temperature, then poured into ice-cold water, the organic layer was separated, and the aqueous layer was extracted with 3×200 ml of dichloromethane. The combined extract was washed with aqueous Na$_2$CO$_3$, dried over Na$_2$SO$_4$, passed through a pad of silica gel 60 (40-63 um), and then evaporated to dryness. Fractional distillation of the residue gave 50.7 g (90%) of yellowish oil which solidified at room temperature, b.p. 135-137° C./2 mbar.

$^1$H NMR (CDCl3, 400 MHz): 52.81-2.86 (m, 1H), 2.47 (s, 3H), 1.28-1.44 (m, 6H).

1.1.5. Synthesis of 3-Bromo-2,4,5,6-tetramethyl-4H-cyclopenta[b]thiophene

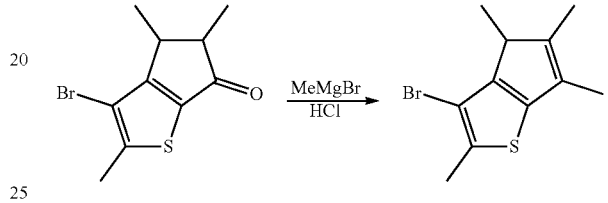

To a solution of 42.0 g (160 mmol) of 3-bromo-2,4,5-trimethyl-4,5-dihydro-6H-cyclopenta[b]thiophen-6-one in 400 ml of THF 120 ml (320 mmol, 2.87M in ether) of MeMgBr was added. The resulting mixture was stirred overnight at 65° C., and then poured into ice-cold 5% HCl. The organic phase was separated, and the aqueous layer was extracted with 3×200 ml of ethyl acetate. The combined extract was dried over Na2SO4 and then evaporated to dryness. Crude product was purified by flash chromatography on silica gel 60 (40-63 um, eluent: hexane). This procedure gave 40.5 g (97%) of a brownish oil. 1H NMR (CDCl3, 400 MHz): δ 3.05-3.10 (m, 1H), 2.40 (s, 3H), 1.94 (s, 3H), 1.91 (s, 3H), 1.29-1.30 (d, J=7.0 Hz, 3H).

1.1.6. Synthesis of 2,3,4,5,6-Pentamethyl-4H-cyclopenta[b]thiophene

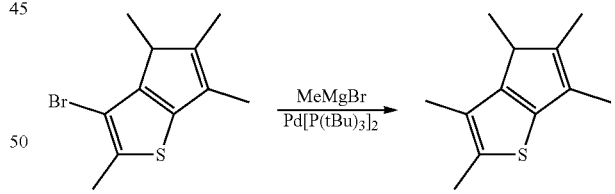

To a solution of 15.0 g (57 mmol) of 3-bromo-2,4,5,6-tetramethyl-4,6a-dihydro-3aH-cyclopenta[b]thiophene in 300 ml of THF 600 mg (1.2 mmol) of Pd[P(tBu)3]2 and 24 ml (64 mmol, 2.70M in ether) of MeMgBr were added. The obtained mixture was stirred overnight at 60° C., poured into water, the organic phase was separated and the aqueous layer was extracted with 3×100 ml of ethyl acetate. The combined extract was dried with Na$_2$SO$_4$ and then evaporated to dryness. The crude product was purified by flash chromatography on silica gel 60 (40-63 um, eluent: hexane). The yield was 10.3 g (93%) of a product as a yellowish oil. $^1$H NMR (CDCl$_3$, 400 MHz): δ 3.01-3.07 (m, 1H), 2.40 (s, 3H), 2.17 (s, 3H), 1.99 (s, 3H), 1.94 (s, 3H), 1.25-1.27 (d, J=7.4 Hz, 3H).

1.1.7. Synthesis 2 Trimethyl(2,3,4,5,6-pentamethyl-6H-cyclopenta[b]thien-6-yl)silane

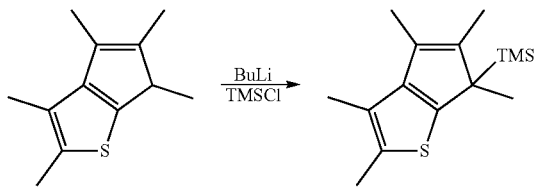

To a solution of 3.2 g (16.6 mmol) of 2,3,4,5,6-pentamethyl-4H-cyclopenta[b]thiophene in 50 ml of THF 6.7 ml (16.6 mmol, 2.5 M in hexane) of n-butyllithium was added at room temperature. The obtained mixture was stirred at this temperature for 1 h, cooled to −78° C., and 2.3 ml (18.3 mmol) of chlorotrimethylsilane was added. The resulting mixture was allowed to warm to room temperature, then poured into 20 ml of water. The organic phase was separated, and the aqueous layer was extracted with 3×30 ml of ethyl acetate. The combined organic extract was dried over $Na_2SO_4$ and then evaporated to dryness. This procedure gave 4.20 g (95%) of a yellowish oil.

$^1$H NMR ($CDCl_3$, 400 MHz): δ 2.39 (s, 3H), 2.28 (s, 3H), 2.15 (s, 3H), 1.93 (s, 3H), 1.37 (s, 3H), −0.08 (s, 9H).

1.1.8. Synthesis of 1,2,3-Trimethyl-1H-benzo[b]cyclopenta[d]thiophene

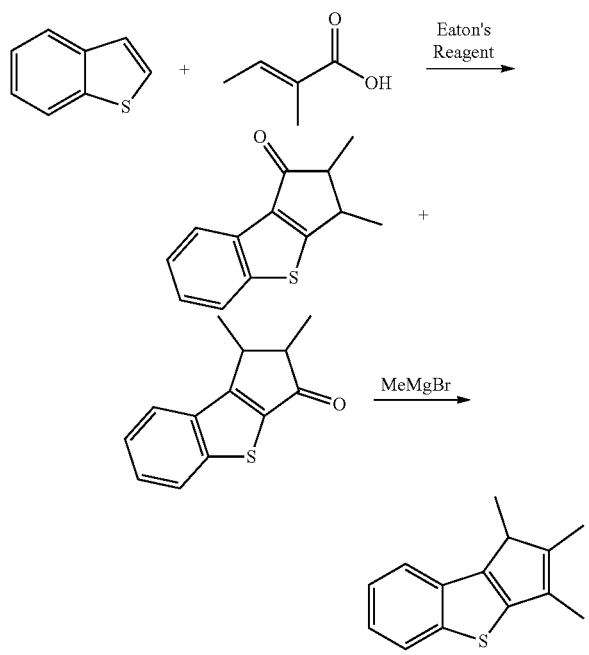

To Eaton's reagent prepared from 16 g of P4O10 and 180 ml of methanesulfonic acid a mixture of 20 g (150 mmol) of benzothiophene and 15.8 g (160 mmol) of tiglic acid was added dropwise by vigorous stirring at 65° C. This mixture was stirred at this temperature for 1 h and then poured into ice-cold water. Crude product was extracted with a mixture of hexane and dichloromethane (70:30 vol.). The combined extract was washed by aqueous $Na_2CO_3$, dried over $K_2CO_3$, and then evaporated to dryness. Crude product was distilled off using the Kugelrohr apparatus (140° C., 1 mbar) yielding 15.0 g of a mixture of 2,3-dimethyl-2,3-dihydro-1H-benzo[b]cyclopenta[d]thiophen-1-one and 1,2-dimethyl-1,2-dihydro-3H-benzo[b]cyclopenta[d]-thiophen-3-one. This mixture was further used without an additional purification. To a solution of 15.0 g (70 mmol) of dimethyl-dihydro-H-benzo[b]cyclopenta[d]thiophenone in 250 ml of THF 52.0 ml (140 mmol, 2.70M in ether) of MeMgBr was added. The resulting mixture was stirred overnight at 65° C., then poured into ice-cold 5% HCl. The organic phase was separated, and the aqueous layer was extracted with 3×100 ml of ethyl acetate. The combined extract was dried over $Na_2SO_4$ and then evaporated to dryness. Crude product was purified by flash chromatography on silica gel 60 (40-63 um, eluent: hexane). This procedure gave 11.8 g (37% on two stages) of the title material as a yellowish oil.

$^1$H NMR (CDCl3, 400 MHz): δ 7.96-7.98 (m, 1H), 7.84-7.86 (m, 1H), 7.24-7.38 (m, 2H), 3.30-3.35 (m, 1H), 2.32 (s, 3H), 2.00 (s, 3H), 1.33-1.35 (d, J=7.1 Hz, 3H).

1.1.9. Synthesis of Trimethyl(1,2,3-trimethyl-3H-benzo[b]cyclopenta[d]thien-3-yl)silane

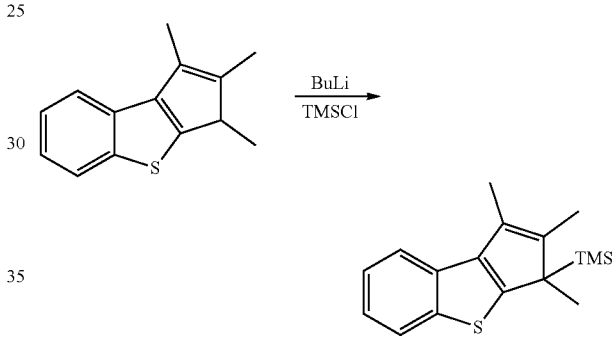

To a solution of 11.2 g (52 mmol) of 1,2,3-trimethyl-1H-benzo[b]cyclopenta[d]thiophene in 250 ml of THF 20.9 ml (52 mmol, 2.5 M in hexane) of n-butyllithium was added at room temperature. The obtained mixture was stirred at this temperature for 1 h, cooled to −78° C., and 7.4 ml (58 mmol) of chlorotrimethylsilane was added. The resulting mixture was allowed to warm to room temperature and then poured into 100 ml of water. The organic phase was separated, and the aqueous layer was extracted with 3×100 ml of ethyl acetate. The combined organic extract was dried over Na2SO4 and then evaporated to dryness. This procedure gave 14.8 g (99%) of a colorless oil. 1H NMR (CDCl3, 400 MHz): δ 7.95-7.97 (m, 1H), 7.69-7.71 (m, 1H), 7.31-7.35 (m, 1H), 7.13-7.17 (m, 1H), 2.11 (s, 3H), 2.02 (s, 3H), 1.62 (s, 3H), −0.11 (s, 9H).

1.1.10. Synthesis of 3-Bromo-4,5-dimethyl-4,5-dihydro-6H-cyclopenta[b]thiophen-6-one

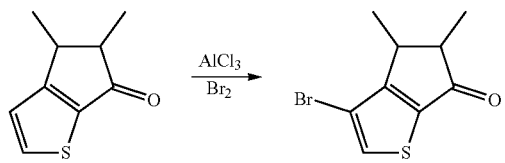

A solution of 20.0 g (120 mmol) of 4,5-dimethyl-4,5-dihydro-6H-cyclopenta[b]thiophen-6-one in 40 ml of dichloromethane was added to a suspension of 35.8 g (270 mmol) of AlCl₃ in 45 ml of dichloromethane at 0° C. The resulting suspension was stirred for 10 min followed by addition of 20.6 g (135 mmol) of bromine. The reaction mixture was stirred for 1 h at room temperature, then poured into ice-cold water, the organic layer was separated, and the aqueous layer was extracted with 3×100 ml of dichloromethane. The combined extract was washed with aqueous Na₂CO₃, dried over Na₂SO₄, passed through a pad of silica gel 60 (40-63 um), and then evaporated to dryness. This procedure gave 31.8 g (99%) of light-yellow solid.

¹H NMR (CDCl₃, 400 MHz): δ 7.76 (s, 1H), 2.86-2.92 (m, 1H), 2.53-2.59 (m, 1H), 1.31-1.48 (m, 6H).

1.1.11. Synthesis of 3-Bromo-4,5,6-trimethyl-4H-cyclopenta[b]thiophene

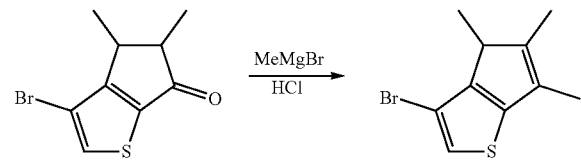

To a solution of 24.8 g (100 mmol) of 3-bromo-4,5-dimethyl-4,5-dihydro-6H-cyclopenta[b]thiophen-6-one in 250 ml of THF, 75 ml of MeMgBr was added (200 mmol, 2.87M in ether). The resulting mixture was stirred overnight at 65° C., then poured into ice-cold 5% HCl. The organic phase was separated, and the aqueous layer was extracted with 3×150 ml of ethyl acetate. The combined extract was dried over Na₂SO₄ and then evaporated to dryness. Crude product was purified by flash chromatography on silica gel 60 (40-63 um, eluent: hexane). This procedure yielded 21.5 g (87%) of a light-yellow oil.

¹H NMR (CDCl₃, 400 MHz): δ 6.92 (s, 1H), 3.07-3.13 (m, 1H), 1.97 (s, 3H), 1.93 (s, 3H), 1.30-1.32 (d, J=7.6 Hz, 3H).

1.1.12. Synthesis of 3,4,5-Trimethyl-4H-cyclopenta[b]thiophen-6(5H)-one

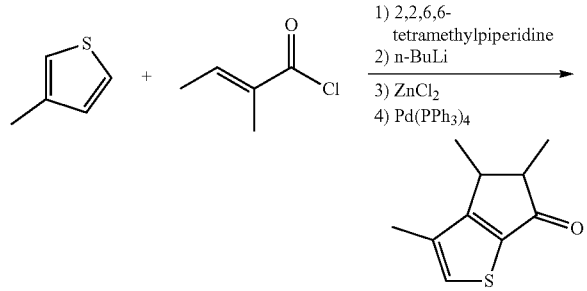

To a solution of 45.3 g (321 mmol) of 2,2,6,6-tetramethylpiperidine in 1000 ml of THF 132 ml (321 mmol) of 2.43 M n-BuLi in hexanes was slowly added at −80° C. The resulting solution was stirred at this temperature for 2 h, then 30.0 g (305 mmol) of 3-methylthiophene was added dropwise, maintaining the temperature below −75° C., and stirred at this temperature for 1 h, followed by an addition of 45.7 g (335 mmol) of dry ZnCl₂. The obtained suspension was stirred at room temperature overnight, cooled to −30° C., and 2.0 g (1.7 mmol) of Pd(PPh₃)₄ and 79.5 g (671 mmol) of tigloyl chloride were subsequently added. The reaction mixture was stirred for 3 h at room temperature, poured into 1000 ml of water and diluted with 300 ml of diethyl ether. The organic phase was separated, and the aqueous layer was extracted with 3×200 ml of diethyl ether. The combined organic extract was dried over Na₂SO₄ and then evaporated to dryness. The crude vinyl ketone was immediately poured into polyphosphoric acid prepared in advance from 1000 ml of phosphoric acid and 300 g of P₄O₁₀. The reaction mixture was stirred for 2 h at 80° C. and then poured into ice-cold water. Crude product was extracted with a mixture of hexane and dichloromethane (70:30, vol.). The combined extract was washed with aqueous Na₂CO₃, dried over K₂CO₃, and then evaporated to dryness. The product was distilled off using the Kugelrohr apparatus (90° C./1 mbar). Yield: 44.0 g (80%) of a colorless oil.

¹H NMR (CDCl₃, 400 MHz): δ 7.46 (s, 1H), 2.81-2.87 (dq, 1H, J=6.9 Hz, J=2.4 Hz), 2.46-2.53 (dq, 1H, J=7.5 Hz, J=2.4 Hz), 2.24 (s, 3H), 1.38 (d, 3H, J=6.9 Hz), 1.31 (d, 3H, J=7.5 Hz).

1.1.13. Synthesis of 2-Bromo-3,4,5-trimethyl-4H-cyclopenta[b]thiophen-6(5H)-one

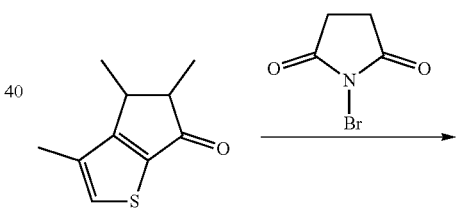

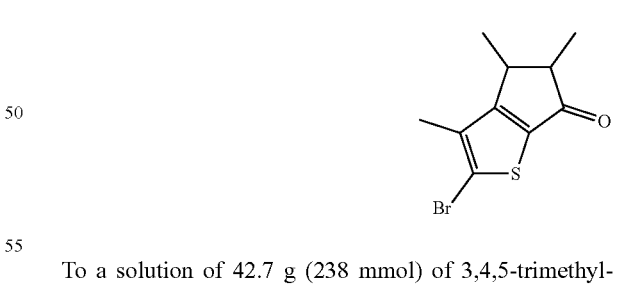

To a solution of 42.7 g (238 mmol) of 3,4,5-trimethyl-4H-cyclopenta[b]thiophen-6(5H)-one in 500 ml of DMF 46.4 g (260 mmol) of N-bromosuccinimide was added portionwise at room temperature. The reaction mixture was stirred overnight, poured into 1000 ml of water, then diluted with 300 ml of diethyl ether. The organic phase was extracted with 6×150 ml of water. The organic extract was dried over Na₂SO₄ and then evaporated to dryness. This procedure gave 46.0 g (75%) of a yellow oil.

¹H NMR (CDCl₃, 400 MHz): δ2.82-2.87 (m, 1H), 2.38-2.44 (m, 1H), 2.19 (s, 3H), 1.37 (s, 3H, J=7.1 Hz), 1.29 (d, 3H, J=7.5 Hz).

1.1.14. Synthesis of 2-Bromo-3,4,5-trimethyl-4H-cyclopenta[b]thiophen-6(5H)-one

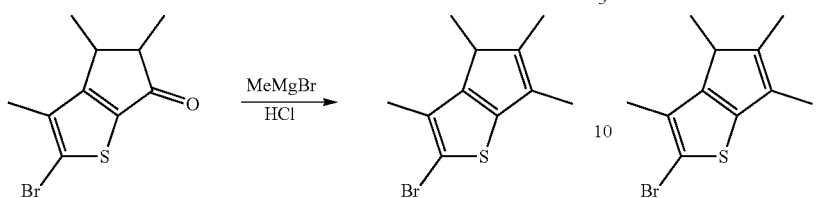

To a solution of 46.0 g (178 mmol) of 2-bromo-3,4,5-trimethyl-4H-cyclopenta[b]thiophen-6(5H)-one in 500 ml of diethyl ether 100 ml (266 mmol) of 2.7 M MeMgBr in ether was added. The obtained mixture was stirred overnight at reflux and then poured into ice-cold 5% HCl. The organic phase was separated, and the aqueous layer was extracted with 3×150 ml of ethyl acetate. The combined organic extract was dried over $Na_2SO_4$ and then evaporated to dryness. The residue was purified by flash chromatography on silica gel 60 (40-63 um, eluent: hexane). This procedure gave 25.0 g (55%) of a yellow oil.

$^1$H NMR (CDCl$_3$, 400 MHz): δ 3.03-3.08 (m, 1H), 2.19 (s, 3H), 1.95 (s, 3H), 1.90 (s, 3H), 1.24 (d, 3H, J=7.9 Hz).

1.1.15. Synthesis of 3,4,5,6-Tetramethyl-2-phenyl-4H-cyclopenta[b]thiophene

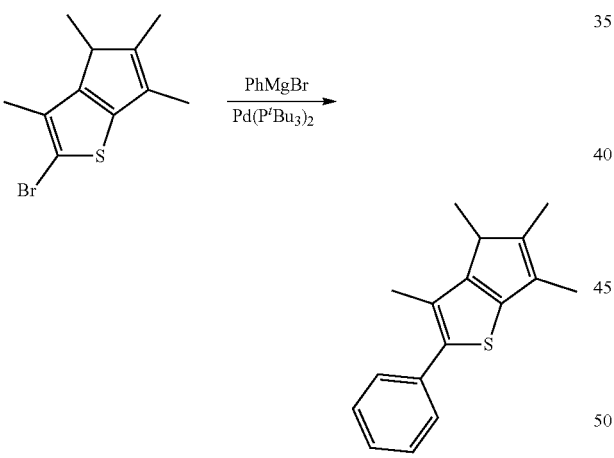

To a solution of 6.00 g (23.0 mmol) of 2-bromo-3,4,5,6-tetramethyl-4H-cyclo-penta[b]thiophene in 150 ml of THF 12.0 ml (1.20 mmol) of 0.1 M Pd(P$^t$Bu$_3$)$_2$ in toluene and 20.0 ml (51.0 mmol) of 2.60 M PhMgBr in ether were added. The obtained mixture was stirred overnight at 60° C., then poured into water. The organic phase was separated, and the aqueous layer was extracted with 3×100 ml of ethyl acetate. The combined extract was dried with $Na_2SO_4$ and then evaporated to dryness. The crude product was purified by flash chromatography on silica gel 60 (40-63 um, eluent: hexane). Yield: 4.21 g (71%) of a yellow oil.

$^1$H NMR (CDCl$_3$, 400 MHz): δ 7.37-7.47 (m, 4H), 7.25-7.28 (m, 1H), 3.08-3.14 (m, 1H), 2.35 (s, 3H), 2.02 (s, 3H), 1.96 (s, 3H), 1.30 (d, 3H, J=7.6 Hz).

1.1.16. Synthesis of 2-(3,5-Di-tert-butylphenyl)-3,4,5,6-tetramethyl-4H-cyclopenta[b]thiophene

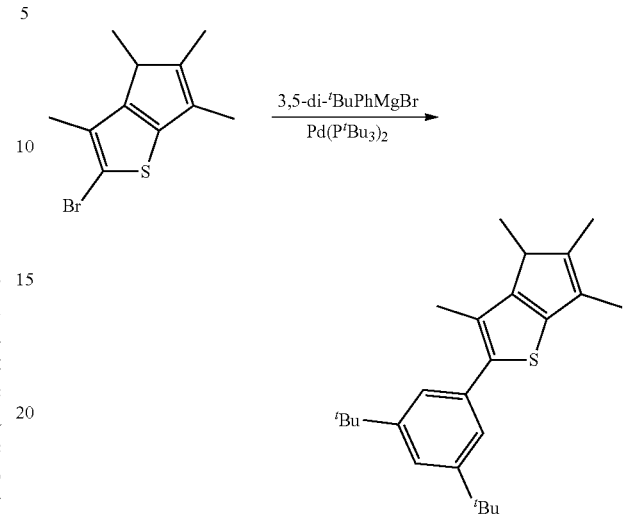

To a solution of 5.00 g (19.4 mmol) of 2-bromo-3,4,5,6-tetramethyl-4H-cyclopenta[b]thiophene in 150 ml of THF 10.0 ml (1.00 mmol) of 0.1 M Pd(P$^t$Bu$_3$)$_2$ in toluene and 80.0 ml (43.0 mmol) of 0.55 M 3,5-di-tert-butylphenylmagnesium bromide in THF were added. The obtained mixture was stirred overnight at 60° C., then poured into cold water. The organic phase was separated, and the aqueous layer was extracted with 3×100 ml of ethyl acetate. The combined extract was dried with $Na_2SO_4$ and then evaporated to dryness. The crude product was purified by flash chromatography on silica gel 60 (40-63 um, eluent: hexane). Yield: 5.53 g (78%) of a yellow oil.

$^1$H NMR (CDCl$_3$, 400 MHz): δ 7.33 (s, 1H), 7.29 (s, 2H), 3.09-3.12 (m, 1H), 2.34 (s, 3H), 2.01 (s, 3H), 1.95 (s, 3H), 1.33-1.35 (m, 21H).

1.1.17. Synthesis of 2-(2-Isopropylphenyl)-3,4,5,6-tetramethyl-4H-cyclopenta[b]thiophene

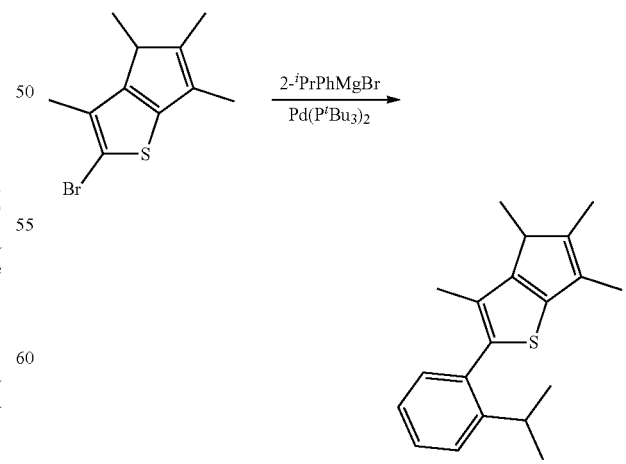

To a solution of 5.00 g (19.4 mmol) of 2-bromo-3,4,5,6-tetramethyl-4H-cyclo-penta[b]thiophene in 150 ml of THF 10.0 ml (1.00 mmol) of 0.1 M Pd(P′Bu₃)₂ in toluene and 80.0 ml (43.0 mmol) of 0.55 M 2-isopropylphenylmagnesium bromide in THF were added. The obtained mixture was stirred overnight at 60° C., then poured into water. The organic phase was separated, and the aqueous layer was extracted with 3×100 ml of ethyl acetate. The combined extract was dried over Na₂SO₄ and then evaporated to dryness. The crude product was purified by flash chromatography on silica gel 60 (40-63 um, eluent: hexane). Yield: 4.22 g (72%) of a yellow oil.

¹H NMR (CDCl₃, 400 MHz): δ 7.35-7.40 (m, 2H), 7.27-7.29 (m, 1H), 7.18-7.22 (m, 1H), 3.09-3.17 (m, 2H), 2.05 (s, 3H), 2.04 (s, 3H), 1.98 (s, 3H), 1.32 (d, 3H, J=7.4 Hz), 1.18 (d, 3H, J=6.9 Hz), 1.17 (d, 3H, J=6.9 Hz).

1.1.18. Synthesis of 2-Cyclohexyl-3,4,5,6-tetramethyl-4H-cyclopenta[b]thiophene

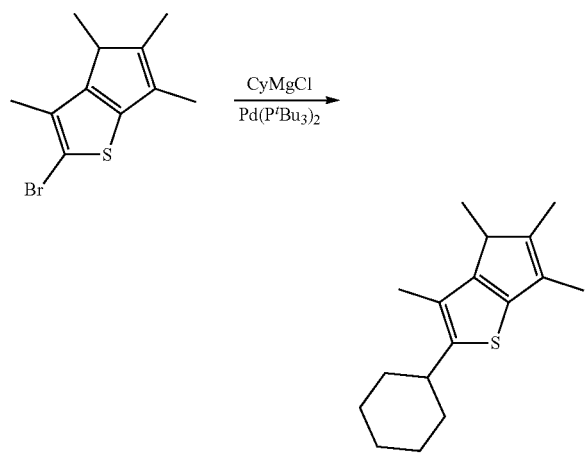

To a solution of 4.10 g (16.0 mmol) of 2-bromo-3,4,5,6-tetramethyl-4H-cyclopenta-[b]thiophene in 150 ml of THF 8.00 ml (0.80 mmol) of 0.1 M Pd(P′Bu₃)₂ in toluene and 60.0 ml (48.0 mmol) of 0.8 M cyclohexylmagnesium chloride in ether were added. The obtained mixture was stirred overnight at 60° C., then poured into water. The organic phase was separated, and the aqueous layer was extracted with 3×100 ml of ethyl acetate. The combined extract was dried over Na₂SO₄ and then evaporated to dryness. The crude product was purified by flash chromatography on silica gel 60 (40-63 um, eluent: hexane). Yield: 2.51 g (60%) of a yellow oil.

¹H NMR (CDCl₃, 400 MHz): δ2.99-3.05 (m, 1H), 2.80-2.86 (m, 1H), 2.18 (s, 3H), 1.96 (s, 3H), 1.91 (s, 3H), 1.89-1.93 (m, 2H), 1.82-1.84 (m, 2H), 1.72-1.74 (m, 1H), 1.37-1.43 (m, 4H), 1.21-1.30 (m, 1H), 1.24 (d, 3H, J=7.6 Hz).

1.1.19. Synthesis of 2,2,5,6,7-Pentamethyl-1,2,3,7-tetrahydrodicyclopenta[b,d]thiophene

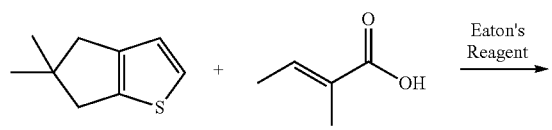

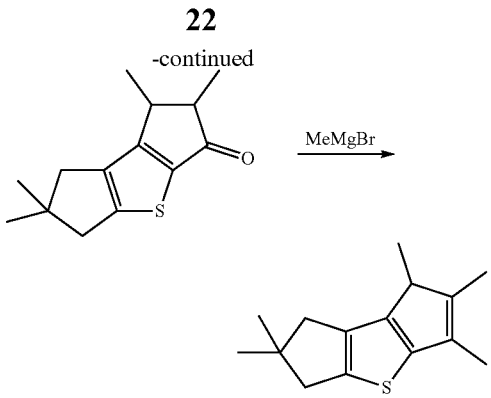

To the Eaton's reagent prepared from 25 g of P₄O₁₀ and 130 ml of methanesulfonic acid a mixture of 4.00 g (26.0 mmol) of 5,5-dimethyl-5,6-dihydro-4H-cyclopenta-[b]thiophene and 2.60 g (26.0 mmol) of tiglic acid was added dropwise by vigorous stirring at 65° C. This mixture was stirred at this temperature for 2 h and then poured into ice-cold water. Crude product was extracted with a mixture of hexane and dichloromethane (70:30, vol.). The combined extract was washed with aqueous Na₂CO₃, dried over K₂CO₃, and evaporated to dryness. The crude product was distilled off using the Kugelrohr apparatus (140° C./1 mbar). To 4.20 g of this crude product in 100 ml of diethyl ether 10 ml (27.0 mmol) of 2.7 M MeMgBr in ether was added. The obtained mixture was stirred overnight at reflux and then poured into ice-cold 5% HCl. The organic phase was separated, and the aqueous layer was extracted with 3×30 ml of ethyl acetate. The combined organic extract was dried over Na₂SO₄ and then evaporated to dryness. The residue was purified by flash chromatography on silica gel 60 (40-63 um, eluent: hexane). This procedure gave 2.83 g (67%) of a yellow oil.

¹H NMR (CDCl₃, 400 MHz): δ2.95-3.01 (m, 1H), 2.72 (m, 2H), 2.53-2.54 (m, 2H), 1.95 (s, 3H), 1.90 (s, 3H), 1.17-1.25 (m, 9H).

1.1.20. Synthesis of 1,2,3-Trimethyl-5,6,7,8-tetrahydro-1H-benzo[b]cyclopenta[d]thiophene

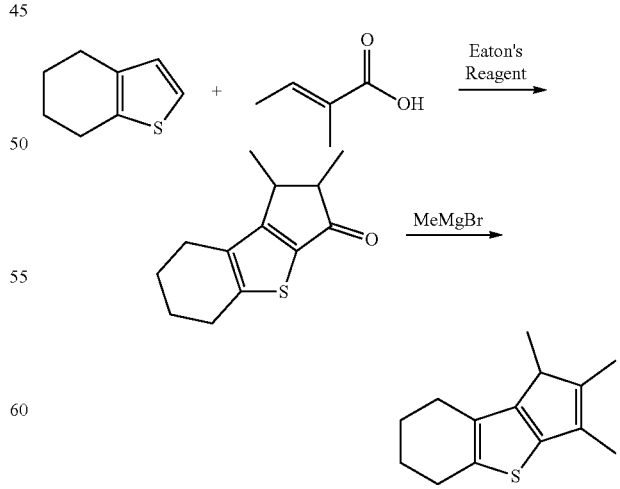

To the Eaton's reagent prepared from 50 g of P₄O₁₀ and 300 ml of methanesulfonic acid a mixture of 10.4 g (75.0 mmol) of 4,5,6,7-tetrahydrobenzo[b]thiophene and 7.50 g (75.0 mmol) of tiglic acid was added dropwise by vigorous stirring at 65° C. This mixture was stirred at this temperature for 2 h and then poured into ice-cold water. Crude product was extracted with a mixture of hexane and dichloromethane (70:30, vol.). The combined extract was washed with aqueous Na$_2$CO$_3$, dried over K$_2$CO$_3$, and evaporated to dryness. The crude product was distilled off using the Kugelrohr apparatus (140° C./1 mbar). To 7.22 g of this crude product in 100 ml of diethyl ether 19 ml (49.0 mmol) of 2.7 M MeMgBr in ether was added. The obtained mixture was stirred overnight at reflux and then poured into ice-cold 5% HCl. The organic phase was separated, and the aqueous layer was extracted with 3×70 ml of ethyl acetate. The combined organic extract was dried over Na$_2$SO$_4$ and then evaporated to dryness. The residue was purified by flash chromatography on silica gel 60 (40-63 um, eluent: hexane). This procedure gave 6.12 g (87%) of a yellow oil.

$^1$H NMR (CDCl$_3$, 400 MHz): δ2.99-3.03 (m, 1H), 2.73-2.81 (m, 2H), 2.56-2.65 (m, 2H), 1.96 (s, 3H), 1.91 (s, 3H), 1.84-1.89 (m, 3H), 1.21-1.27 (m, 4H).

1.1.21. Synthesis of 3-(2-isopropylphenyl)-2,4,5,6-tetramethyl-4H-cyclopenta[b]thiophene

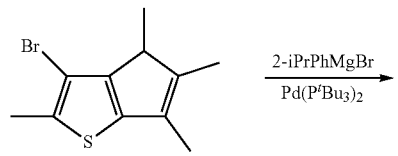

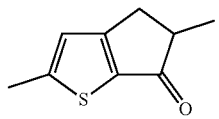

To a solution of 9.40 g (36.5 mmol) of 3-bromo-2,4,5,6-tetramethyl-4H-cyclopenta[b]thiophene in 150 ml of THF 1.20 g (2.4 mmol) of Pd[P(tBu)3]2 and 91.3 ml (43.8 mmol, 0.48M in THF) of 2-isopropylphenylmagnesium bromide were added. The obtained mixture was stirred overnight at 60° C., cooled to room temperature and poured into 200 ml of water. The organic phase was separated and the aqueous layer was extracted with 3×100 ml of ethyl acetate. The combined organic extract was dried with Na2SO4 and then evaporated to dryness. The crude product was purified by flash chromatography on silica gel 60 (40-63 um, eluent: hexane). The yield was 10.4 g (95%) of a product as an yellow viscous oil.

$^1$H NMR (CDCl3, 400 MHz): δ 7.32-7.34 (m, 1H), 7.20-7.21 (m, 2H), 7.07-7.09 (m, 1H), 3.34 (sept, J=6.9 Hz, 1H), 3.11-3.17 (m, 1H), 2.40 (s, 3H), 2.17 (s, 3H), 1.94 (s, 3H), 1.40-1.41 (d, J=6.9 Hz, 6H), 1.27-1.29 (d, J=7.5 Hz, 3H)

1.1.22. Synthesis of 2,5-dimethyl-4,5-dihydro-6H-cyclopenta[b]thiophen-6-one

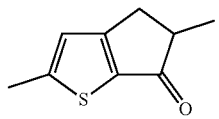

A mixture of 2-methylthiophene (150 g, 1.53 mol, 1.0 equiv) and methacrylic acid (159 g, 1.84 mol, 1.2 equivs) was added dropwise to Eaton's reagent (prepared from 175 g of P$_4$O$_{10}$ and 1400 ml of methanesulfonic acid) at 80° C. for 30 min. The reaction mixture was stirred for additional 5 min and then poured into crushed ice. This mixture was extracted with dichloromethane (3×300 ml), the combined organic extracts were washed with 10% aqueous Na$_2$CO$_3$, dried over anhydrous Na$_2$SO$_4$ and evaporated to dryness. The residue was distilled (90° C., 1 mbar) to afford a mixture of the title compound, A (137 g, 54%), and the isomeric 2,5-dimethyl-5,6-dihydro-4H-cyclopenta[b]thiophen-4-one, B, in molar ratio A:B=10:1.

$^1$H NMR (400 MHz, CDCl$_3$): δ 6.74 (s, 1H, B), 6.69 (s, 1H, A), 3.33 (d, 1H, J=17.1 Hz, J=6.0 Hz, B), 3.16 (dd, 1H, J=17.2 Hz, J=6.8 Hz, A), 2.90 (quind, 1H, J=7.3 Hz, J=2.8 Hz, A), 2.67 (dd, 1H, J=17.7 Hz, J=2.9 Hz, B), 2.54 (s, 3H, A), 2.44-2.52 (m, 1H(A)+H(B)+3H(B)), 1.28 (d, 3H(A)+3H (B)).

1.1.23. Synthesis of 3-bromo-2,5-dimethyl-4,5-dihydro-6H-cyclopenta[b]thiophen-6-one

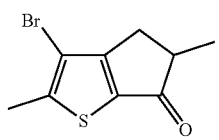

N-bromosuccinimide (161 g, 907 mmol, 1.1 equiv) was added in small portions to the solution of 2,5-dimethyl-4,5-dihydro-6H-cyclopenta[b]thiophen-6-one (137 g, 824 mmol, 1.0 equiv) in 800 ml of DMF at r.t. The resulting solution was stirred overnight. The reaction mixture poured into 3 L of water, extracted with dichloromethane (3×400 ml), the combined organic extracts were washed thoroughly with water, dried over anhydrous Na$_2$SO$_4$ and evaporated to dryness. The resulting solid was recrystallized from hexane to afford 76.8 g (38%) of the title compound as a single isomer. The mother liquor was evaporated and the residue was purified by column chromatography on silica gel 60 (40-63 um) to afford 63.1 g (31%) of the title compound as a single isomer. These two portions were combined (total yield 69%) as their NMR spectra were identical.

$^1$H NMR (400 MHz, CDCl$_3$): δ 3.11 (dd, 1H, J=17.5 Hz, J=6.9 Hz), 2.92 (quind, 1H, J=7.3 Hz, J=2.6 Hz), 2.43-2.48 (m, 1H), 2.46 (s, 3H), 1.29 (d, 3H, J=7.4 Hz).

1.1.24. Synthesis of 2,3,5-trimethyl-4,5-dihydro-6H-cyclopenta[b]thiophen-6-one

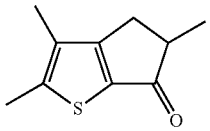

Anhydrous THF (600 ml) was added to a solution of MeMgBr (103 ml, 300 mmol, 1.5 equivs). ZnCl$_2$ (43.6 g, 320 mmol, 1.6 equivs) was added in portions at 0° C. The resulting mixture was allowed to warm to room temperature and stirred for 1 h. Anhydrous NMP (200 ml), 3-bromo-2,5-dimethyl-4,5-dihydro-6H-cyclopenta[b]thiophen-6-one (49.0 g, 200 mmol, 1.0 equiv) and a solution of Pd(P$^t$Bu$_3$)$_2$ in toluene (40 ml, 6.00 mmol, 0.03 equivs) were added sequentially and the resulting mixture was stirred at 60° C. overnight. The reaction mixture was then poured into 2 L of water, extracted with ether (3×200 ml), combined organic extracts were washed thoroughly with water, dried over anhydrous Na$_2$SO$_4$ and evaporated to dryness. The residue was purified using Kugelrohr apparatus (125° C./0.4 mbar) to afford 26.9 g (74%) of the title compound as colorless oil.

$^1$H NMR (400 MHz, CDCl$_3$): δ 3.05 (dd, 1H, J=17.2 Hz, J=6.8 Hz), 2.86 (quind, 1H, J=7.3 Hz, J=2.6 Hz), 2.36-2.41 (m, 1H), 2.37 (s, 3H), 2.02 (s, 3H), 1.25 (d, 3H, J=7.5 Hz).

1.1.25. Synthesis of 2,3,5,6-Tetramethyl-4H-cyclopenta[b]thiophene

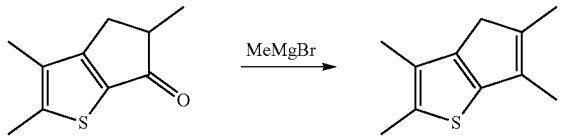

To a solution of 4.00 g (22.0 mmol) of 2,3,5-trimethyl-4,5-dihydro-6H-cyclopenta[b]thiophen-6-one in 100 ml of THF 13.6 ml of 2.9 M (33.0 mmol) MeMgBr in ether was added. The resulting mixture was stirred overnight at 65° C., then accurately poured into ice-cold 5% HCl. The organic phase was separated, and the aqueous layer was extracted with 3×100 ml of ethyl acetate. The combined extract was dried over Na$_2$SO$_4$ and then evaporated to dryness. The crude product was purified by flash chromatography on silica gel 60 (40-63 um, eluent: hexane). Yield: 3.56 g (91%) of a yellow oil.

$^1$H NMR (CDCl$_3$, 400 MHz): δ2.98 (s, 2H), 2.38 (s, 3H), 2.08 (s, 3H), 2.02 (s, 3H), 1.98 (s, 3H).

1.1.26. Synthesis of 2,3,5-Trimethyl-6-phenyl-4H-cyclopenta[b]thiophene

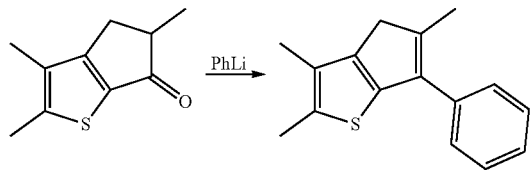

To a solution of 4.00 g (22.0 mmol) of 2,3,5-trimethyl-4,5-dihydro-6H-cyclopenta[b]thiophen-6-one in 100 ml of THF 8.9 ml of 2.5 M (33.0 mmol) phenyllithium in ether was added at −80° C. The resulting mixture was stirred overnight at 65° C., then accurately poured into ice-cold 5% HCl. The organic phase was separated, and the aqueous layer was extracted with 3×100 ml of ethyl acetate. The combined organic extract was dried over Na$_2$SO$_4$ and then evaporated to dryness. The crude product was purified by flash chromatography on silica gel 60 (40-63 um, eluent: hexane). Yield: 4.38 g (83%) of a yellow oil.

$^1$H NMR (CDCl$_3$, 400 MHz): δ7.51-7.57 (m, 2H), 7.40-7.47 (m, 2H), 7.28-7.34 (m, 1H), 3.21 (s, 2H), 2.39 (s, 3H), 2.24 (s, 3H), 2.13 (s, 3H).

1.1.27. Synthesis of 6-(4-Fluorophenyl)-2,3,5-trimethyl-4H-cyclopenta[b]thiophene

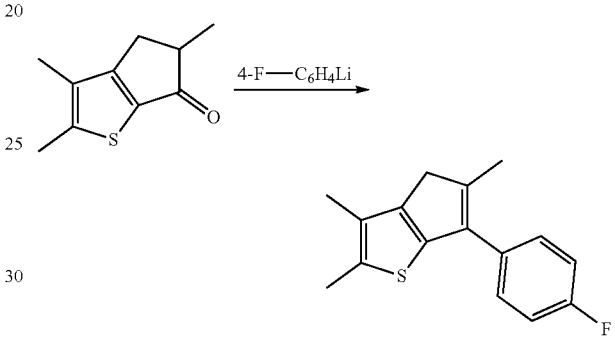

To a solution of 4.00 g (22.0 mmol) of 2,3,5-trimethyl-4,5-dihydro-6H-cyclopenta[b]thiophen-6-one in 100 ml of THF 8.9 ml of 2.5 M (33.0 mmol) 4-fluorophenyllithium in ether was added at −80° C. The resulting mixture was stirred overnight at 65° C., then accurately poured into ice-cold 5% HCl. The organic phase was separated, and the aqueous layer was extracted with 3×100 ml of ethyl acetate. The combined organic extract was dried over Na$_2$SO$_4$ and then evaporated to dryness. The crude product was purified by flash chromatography on silica gel 60 (40-63 um, eluent: hexane). Yield: 4.83 g (85%) of a yellow oil.

$^1$H NMR (CDCl$_3$, 400 MHz): δ7.46-7.55 (m, 2H), 7.07-7.16 (m, 2H), 3.20 (s, 2H), 2.40 (s, 3H), 2.21 (s, 3H), 2.13 (s, 3H).

1.1.28. Synthesis of 6-Isopropyl-2,3,5-trimethyl-4H-cyclopenta[b]thiophene

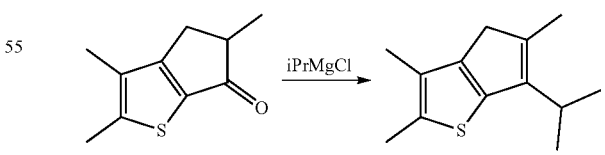

To a 14.2 ml of 0.93 M (13.0 mmol) solution of adduct of isopropylmagnesium chloride with LiCl in THF 240 mg (1.80 mmol) of anhydrous ZnCl$_2$ and 3.60 ml of 1.0 M (3.60 mmol) trimethylsilylmethylmagnesium chloride in ether were subsequently added. The obtained solution was stirred for 30 min at room temperature, then cooled to 0° C., followed by addition of 2.00 g (12.0 mmol) of 2,3,5- trimethyl-4,5-dihydro-6H-cyclopenta[b]thiophen-6-one. The reaction mixture was refluxed for 2 h and then poured into 100 ml of saturated NH$_4$Cl followed by addition of 10 ml of 5% HCl. The aqueous phase was extracted with 3×70 ml of diethyl ether, the combined organic extract was dried over Na$_2$SO$_4$ and then evaporated to dryness. The residue was purified by flash chromatography on silica gel 60 (40-63 um, eluent: hexane). Yield: 1.38 g (56%) of a yellow oil. The obtained material had ca.70% purity, and the major impurity was found to be 2,3,5-trimethyl-6-(propan-2-ylidene)-5,6-dihydro-4H-cyclopenta[b]thiophene.

$^1$H NMR (CDCl$_3$, 400 MHz): δ2.90-3.01 (m, 3H), 2.36 (s, 3H), 2.07 (s, 3H), 2.02 (s, 3H), 1.21 (d, J=7.0 Hz, 6H).

1.2. Syntheses of the Titanium Tri-Chloride Complexes

General Procedure for Preparation of Tri-Chloride Complexes.

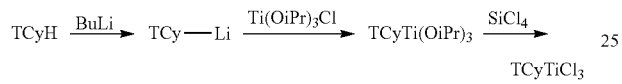

THF (10 ml/mmol) was added to the appropriate thiophene fused cyclopentadiene (TCyH, 1 equiv) to form a solution. Next, n-butyllithium (1 equiv, 2.5 M in hexane) was added at −80° C. in one portion. The resulting solution was stirred for 2 h at room temperature, cooled down to −80° C. followed by an addition of tris(isopropoxy)titanium chloride (1 equiv). The reaction mixture was stirred overnight at room temperature, then evaporated to dryness. The crude tris(isopropoxide)(η$^5$-L)titanium(IV) was diluted with dry toluene (10 ml/mmol) and silicon tetrachloride (5 equiv) was subsequently added. The obtained mixture was stirred overnight at 60° C. and then evaporated to dryness. The crude product was dissolved in dry dichloromethane, and the formed suspension was filtered through a Celite 503 pad. The obtained filtrate was evaporated to dryness, and the residue was recrystallized from methylcyclohexane.

This procedure will be used in the following synthesis unless specified otherwise.

1.2.1. Synthesis of (η5-2,2,5,6,7-Pentamethyl-1,2,3-trihydrodicyclopenta[b,d]thiophenyl)trichlorotitanium

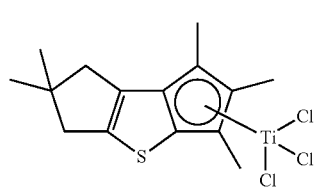

Yield: 70%.
$^1$H NMR (CD$_2$Cl$_2$, 400 MHz): δ 2.70-2.93 (m, 4H), 2.59 (s, 3H), 2.57 (s, 3H), 2.45 (s, 3H), 1.33 (s, 3H), 1.30 (s, 3H).

1.2.2. Synthesis of (η$^5$-6,7,8-Trimethyl-1,2,3,4-tetrahydrocyclohexa[b]cyclopenta[d]thiophenyl)trichlorotitanium

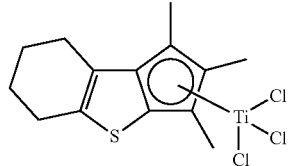

Yield: 31%.
$^1$H NMR (CD$_2$Cl$_2$, 400 MHz): δ 2.78-3.02 (m, 4H), 2.64 (s, 3H), 2.58 (s, 3H), 2.44 (s, 3H), 1.88-1.94 (m, 4H).

1.2.3. Synthesis of η$^5$-2-Phenyl-3,4,5,6-tetramethylcyclopenta[b]thienyl)trichlorotitanium

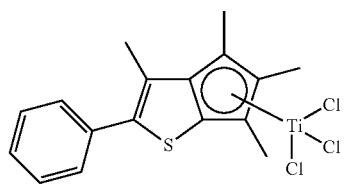

Yield: 73%.
$^1$H NMR (CD$_2$Cl$_2$, 400 MHz): δ 7.45-7.55 (m, 5H), 2.74 (s, 3H), 2.63 (s, 3H), 2.50 (s, 3H), 2.48 (s, 3H).

1.2.4. Synthesis of {η$^5$-2-(3,5-Di-tert-butylphenyl)-3,4,5,6-tetramethylcyclopenta[b]thienyl}trichlorotitanium

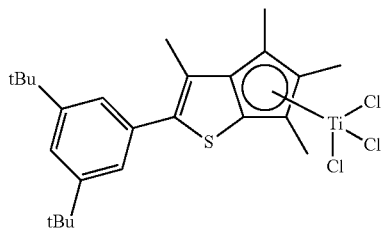

Yield: 54%.
$^1$H NMR (CD$_2$Cl$_2$, 400 MHz): δ 7.54 (m, 1H), 7.37 (m, 2H), 2.76 (s, 3H), 2.64 (s, 3H), 2.54 (s, 3H), 2.49 (s, 3H), 1.39 (s, 18H).

1.2.5. Synthesis of (η$^5$-2-Cyclohexyl-3,4,5,6-tetramethylcyclopenta[b]thienyl)trichlorotitanium

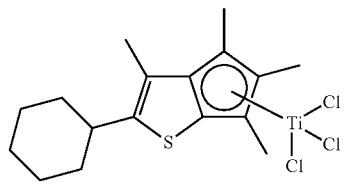

Yield: 55%.

$^1$H NMR (CD$_2$Cl$_2$, 400 MHz): δ 2.97-3.04 (m, 1H), 2.69 (s, 3H), 2.58 (s, 3H), 2.43 (s, 3H), 2.40 (s, 3H), 1.96-2.01 (m, 2H), 1.85-1.88 (m, 2H), 1.75-1.78 (m, 1H), 1.27-1.51 (m, 5H).

1.2.6. Synthesis of (η$^5$-2-(2-Isopropylphenyl)-3,4,5,6-tetramethylcyclopenta[b]thienyl)trichlorotitanium

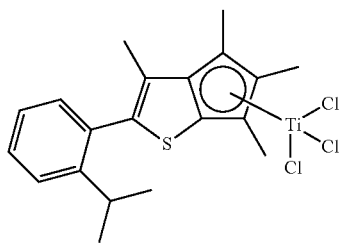

Yield: 38%.

$^1$H NMR (CD$_2$Cl$_2$, 400 MHz): δ 7.45-7.46 (m, 2H), 7.24-7.39 (m, 2H), 3.00-3.30 (br.s, 1H), 2.72 (s, 3H), 2.62 (br.s, 3H), 2.50 (s, 3H), 2.26 (s, 3H), 1.18 (d, 3H, J=6.6 Hz).

1.2.7. Synthesis of Trichloro(4,5,6-trimethyl-cyclopenta[b]thienyl)titanium

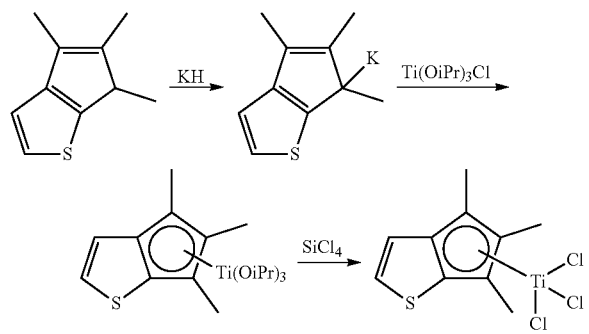

To a suspension of 5.35 g, (134 mmol) of dry potassium hydride in 400 ml of THF a solution of 21.9 g (134 mmol) of 4,5,6-trimethyl-4H-cyclopenta[b]thiophene in 100 ml of THF was slowly added. The formed mixture was stirred for 4 h at 50° C. and then filtered through a pad of Celite. The filtrate was evaporated to dryness. The residue was triturated with 25 ml of hexane, and the resulting mixture was filtered through a glass frit. The potassium salt thus obtained was washed by 2×10 ml of hexane and dried in vacuum. The resulting powder was dissolved in 400 ml of THF, the obtained solution was cooled to −30° C., and a solution of 34.9 g (134 mmol) of tris(isopropoxy)titanium chloride in 100 ml of THF was added by vigorous stirring. The formed mixture was stirred overnight at room temperature, filtered through a Celite pad, and then evaporated to dryness. The residue was dissolved in 700 ml of toluene, and 101 g (600 mmol) of silicon tetrachloride was added. The formed mixture was stirred for 4 h at 60° C., then evaporated to dryness. The residue was dissolved in 700 ml of toluene, and the obtained solution was filtered through a pad of Celite. The filtrate was evaporated to ca. 50 ml, and 250 ml of hexane was added. The resulting suspension was cooled to −30° C., and the precipitate was collected by filtration through a glass frit. The precipitate was washed by 2×100 ml of cold hexane and then dried in vacuum. This procedure gave 27.8 g (65%) of dark violet powder.

$^1$H NMR (CDCl$_3$, 400 MHz): δ 7.71-7.72 (d, J=5.3 Hz, 1H), 7.17-7.18 (d, J=5.3 Hz, 1H), 2.64 (s, 3H), 2.63 (s, 3H), 2.48 (s, 3H).

1.2.8. Synthesis of Trichloro(3-(2-isopropylphenyl)-2,4,5,6-trimethylcyclopenta[b]thienyl) titanium

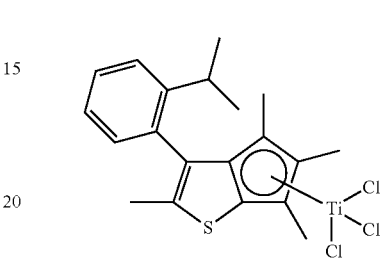

This compound was obtained as described for Trichloro (4,5,6-trimethyl-cyclopenta[b]thienyl)titanium starting from dry potassium hydride (1.02 g, 25.5 mmol), 3-(2-isopropylphenyl)-2,4,5,6-tetramethyl-4H-cyclopenta[b]thiophene (7.60 g, 25.5 mmol), 210 ml of THF, tris(isopropoxy) titanium chloride (6.63 g, 25.5 mmol), 200 ml of toluene and silicon tetrachloride (19.5 g, 115 mmol). The yield was 6.70 g (49%) of a dark violet powder.

$^1$H NMR (CDCl3, 400 MHz): δ 7.51 (d, J=7.3 Hz, 1H), 7.39-7.48 (m, 2H), 7.26-7.36 (m, 1H), 2.54-2.69 (m, 4H), 2.39 (s, 3H), 2.37 (s, 3H), 2.10 (s, 3H), 1.11 (d, J=6.9 Hz, 3H), 1.08 (d, J=6.9 Hz, 3H)

1.2.9. Synthesis of Trichloro(2,3,4,5,6-pentamethyl-cyclopenta[b]thienyl)titanium

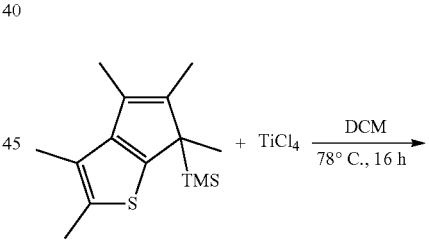

To a solution of 4.20 g (16 mmol) of trimethyl(2,3,4,5,6-pentamethyl-6H-cyclopenta-[b]thien-6-yl)silane in 100 ml of dichloromethane a solution of 3.00 g (16 mmol) of titanium tetrachloride in 20 ml of dichloromethane was added dropwise by vigorous stirring at −78° C. The resulting mixture was stirred overnight at room temperature and then evaporated to dryness. Further on, to the residue 150 ml of toluene was added, and the formed mixture was filtered through a pad of Celite. The filtrate was evaporated to ca. 15 ml, and then 150 ml of hexane was added. The formed mixture was cooled to −30° C. and then filtered through a glass frit (G3). The precipitate was washed with 2×30 ml of cold hexane and then dried in vacuum. This procedure gave 2.93 g (54%) of dark blue powder.

$^1$H NMR (CD$_2$Cl$_2$, 400 MHz): δ 2.67 (s, 3H), 2.56 (s, 3H), 2.51 (s, 3H), 2.45 (s, 3H), 2.38 (s, 3H).

1.2.10. Synthesis of Trichloro(1,2,3-trimethylbenzo[b]cyclopenta[d]thienyl)titanium

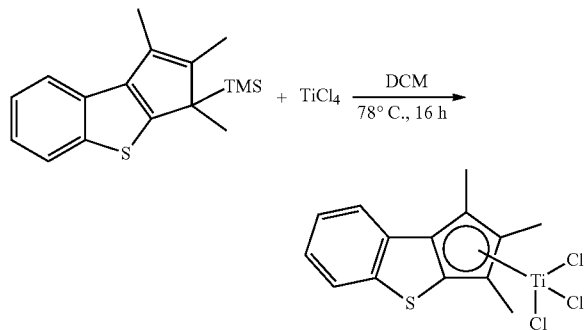

To a solution of 14.8 g (52 mmol) of trimethyl(1,2,3-trimethyl-3H-benzo[b]cyclopenta-[d]thien-3-yl)silane in 300 ml of dichloromethane a solution of 9.90 g (52 mmol) of titanium tetrachloride in 100 ml of dichloromethane was added dropwise by vigorous stirring at −78° C. The resulting mixture was stirred overnight at room temperature and then evaporated to dryness. Further on, to the residue 350 ml of toluene was added, and the formed mixture was filtered through a pad of Celite. The filtrate was evaporated to ca. 150 ml, and 350 ml of hexane was added. The obtained mixture was cooled to −30° C. and then filtered through a glass frit (G3). The precipitate was washed by 2×100 ml of cold hexane and then dried in vacuum. This procedure gave 15.8 g (83%) of a dark violet powder. 1H NMR (CD2Cl2, 400 MHz): δ 8.09-8.11 (m, 1H), 7.84-7.86 (m, 1H), 7.52-7.57 (m, 2H), 2.82 (s, 3H), 2.64 (s, 3H), 2.52 (s, 3H).

1.2.11. Synthesis of [3-Bromo-2,4,5,6-tetramethyl-cyclopenta[b]thienyl](trichloro)titanium

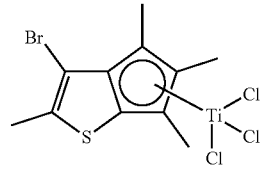

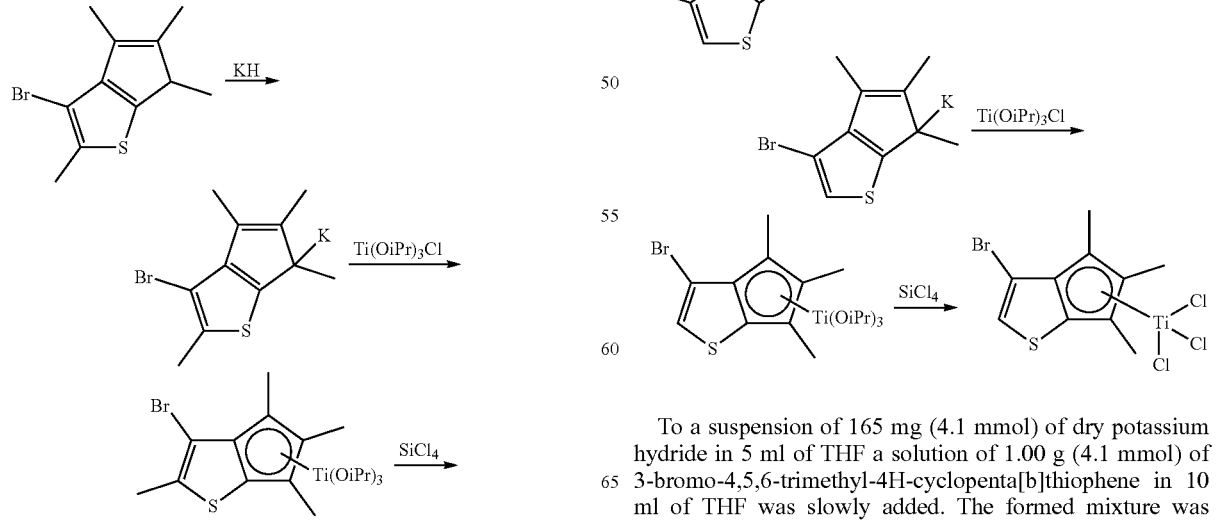

To a suspension of 2.35 g, (58.7 mmol) of dry potassium hydride in 250 ml of THF a solution of 15 g (58.7 mmol) of 3-bromo-2,4,5,6-tetramethyl-4H-cyclopenta[b]thiophene in 50 ml of THF was slowly added. The formed mixture was stirred for 4 h at 50° C. and then filtered through a pad of Celite. The filtrate was evaporated to dryness. The residue was triturated with 25 ml of hexane, and the resulting mixture was filtered through a glass frit. The potassium salt thus obtained was washed by 2×10 ml of hexane and dried in vacuum. The resulting powder was dissolved in 400 ml of THF, the obtained solution was cooled to −30° C., and a solution of 15.0 g (58.7 mmol) of tris(isopropoxy)titanium chloride in 100 ml of THF was added by vigorous stirring. The formed mixture was stirred overnight at room temperature, filtered through a Celite pad, and then evaporated to dryness. The residue was dissolved in 700 ml of toluene, and 44.9 g (264 mmol) of silicon tetrachloride was added. The formed mixture was stirred for 4 h at 60° C., then evaporated to dryness. The residue was dissolved in 300 ml of toluene, and the obtained solution was filtered through a pad of Celite. The filtrate was evaporated to ca. 50 ml, and 250 ml of hexane was added. The resulting suspension was cooled to −30° C., and the precipitate was collected by filtration through a glass frit. The precipitate was washed by 2×100 ml of cold hexane and then dried in vacuum. This procedure gave 18.8 g (78%) of dark purple powder.

$^1$H NMR (CDCl$_3$, 400 MHz): δ2.74 (s, 3H), 2.57 (s, 3H), 2.55 (s, 3H), 2.43 (s, 3H).

1.2.12. Synthesis of (3-Bromo-4,5,6-trimethylcyclopenta[b]thienyl)(trichloro)titanium To a suspension of 165 mg (4.1 mmol) of dry potassium hydride in 5 ml of THF a solution of 1.00 g (4.1 mmol) of 3-bromo-4,5,6-trimethyl-4H-cyclopenta[b]thiophene in 10 ml of THF was slowly added. The formed mixture was stirred for 4 h at 50° C. and then filtered through a pad of Celite. The filtrate was evaporated to dryness. The residue was triturated with 25 ml of hexane, and the resulting mixture was filtered through a glass frit (G3). The potassium salt thus obtained was washed by 2×10 ml of hexane and dried in vacuum. Then it was dissolved in 15 ml of THF, the obtained solution was cooled to −30° C., and a solution of 1.07 g (4.1 mmol) of tris-(isopropoxy)titanium chloride in 10 ml of THF was added by vigorous stirring. The formed mixture was stirred overnight at room temperature, filtered through a Celite pad, and then evaporated to dryness. The residue was dissolved in 20 ml of toluene, and 3.13 g (18.5 mmol) of silicon tetrachloride was added. The formed mixture was stirred for 4 h at 60° C., then evaporated to dryness. The residue was dissolved in 30 ml of toluene, and the obtained solution was filtered through a pad of Celite. The filtrate was evaporated to ca. 5 ml, and 30 ml of hexane was added. The resulting suspension was cooled to −30° C., and the precipitate was collected by filtration through a glass frit (G3). The precipitate was washed by 2×15 ml of cold hexane and then dried in vacuum. This procedure gave 920 mg (57%) of purple powder.

$^1$H NMR (tris-isopropoxy complex, C$_6$D$_6$, 400 MHz): δ 6.60 (s, 1H), 4.56-4.65 (sept, J=6.1 Hz, 3H), 2.43 (s, 3H), 2.09 (s, 3H), 1.98 (s, 3H), 1.13-1.16 (m, 18H).

$^1$H NMR (trichloride complex, CD$_2$Cl$_2$, 400 MHz): δ 7.63 (s, 1H), 2.75 (s, 3H), 2.61 (s, 3H), 2.45 (s, 3H).

1.2.13. Synthesis of (η$^5$-2,3,5,6-Tetramethylcyclopenta[b]thiophenyl)titanium(IV) trichloride

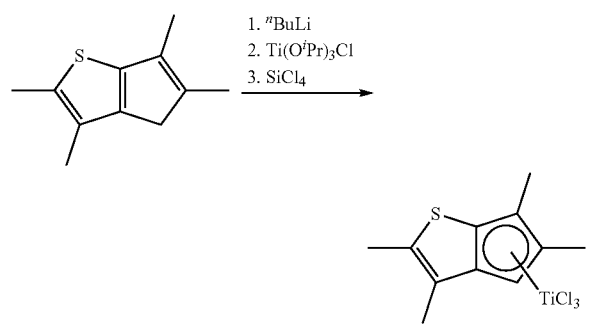

To a solution of 3.56 g (20.0 mmol) of 2,3,5,6-tetramethyl-4H-cyclopenta[b]thiophene in 200 ml of THF 8.00 ml of 2.5 M (20.0 mmol) n-butyllithium in hexanes was added at −50° C. The obtained solution was stirred for 1 h at room temperature, cooled to −80° C. and 5.20 g (20.0 mmol) of tris(isopropoxy)titanium chloride was added. The reaction mixture was stirred overnight at room temperature and then evaporated to dryness. The crude tris(isopropoxy) thiophenefusedcyclopentadienyl titanium was dissolved in 180 ml of dry toluene, and 17.0 g (100 mmol) of SiCl$_4$ was added. The obtained suspension was stirred overnight at 60° C. and then evaporated to dryness. To the residue 140 ml of dichloromethane was added, and the obtained suspension was filtered through a pad of Celite 503. The filtrate was evaporated to dryness, and the crude product was re-crystallized from 350 ml of methylcyclohexane. Yield: 5.65 g (85%) of a purple powder.

$^1$H NMR (CDCl$_3$, 400 MHz): δ6.65 (s, 1H), 2.54 (s, 3H), 2.50 (s, 3H), 2.48 (s, 3H), 2.24 (s, 3H)

1.2.14. Synthesis of (η$^5$-2,3,5-Trimethyl-6-phenyl-cyclopenta[b]thiophenyl)titanium(IV) trichloride

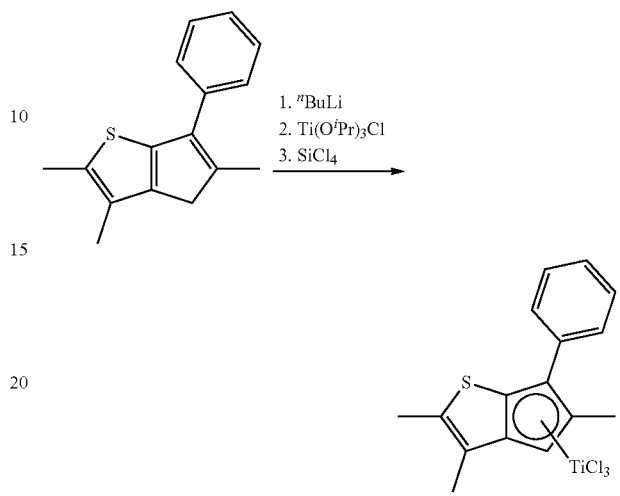

To a solution of 4.38 g (18.2 mmol) of 2,3,5-trimethyl-6-phenyl-4H-cyclopenta[b]thiophene in 200 ml of THF 7.29 ml of 2.5 M (18.2 mmol) n-butyllithium in hexanes was added at −50° C. The obtained solution was stirred for 1 h at room temperature, then cooled to −80° C., and 4.75 g (18.2 mmol) of tris(isopropoxy)titanium chloride was added. The reaction mixture was stirred overnight at room temperature and then evaporated to dryness. The crude tris(isopropoxy) thiophenefusedcyclopentadienyl titanium was dissolved in 180 ml of dry toluene, and 15.5 g (91.1 mmol) of SiCl$_4$ was added. The obtained suspension was stirred overnight at 60° C. and then evaporated to dryness. To the residue 140 ml of dichloromethane was added, and the obtained suspension was filtered through a pad of Celite 503. The filtrate was evaporated to dryness, and the crude product was re-crystallized from 250 ml of methylcyclohexane. Yield: 6.74 g (94%) of a purple powder.

$^1$H NMR (CDCl$_3$, 400 MHz): δ7.74 (d, J=7.2 Hz, 2H), 7.51 (t, J=7.6 Hz, 2H), 7.37-7.47 (m, 1H), 6.77 (s, 1H), 2.79 (s, 3H), 2.50 (s, 3H), 2.30 (s, 3H).

1.2.15. Synthesis of [η$^5$-2,3,5-Trimethyl-6-(4-fluorophenyl)-cyclopenta[b]thiophenyl]titanium(IV) trichloride

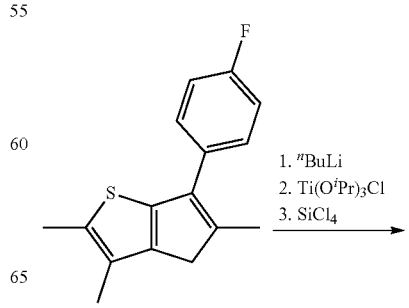

-continued

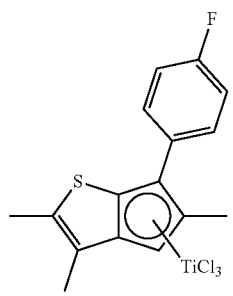

To a solution of 4.83 g (18.7 mmol) of 2,3,5-trimethyl-6-(4-fluorophenyl)-4H-cyclopenta[b]thiophene in 200 ml of THF 7.48 ml of 2.5 M (18.7 mmol) n-butyllithium in hexanes was added at −50° C. The obtained solution was stirred for 1 h at room temperature, then cooled to −80° C., and 4.87 g (18.7 mmol) of tris(isopropoxy)titanium chloride was added. The reaction mixture was stirred overnight at room temperature, then evaporated to dryness. The crude tris(isopropoxy) thiophenefusedcyclopentadienyl titanium was dissolved in 180 ml of dry toluene, and 15.9 g (93.5 mmol) of SiCl$_4$ was added. The obtained suspension was stirred overnight at 60° C. and then evaporated to dryness. To the residue 200 ml of dichloromethane was added, and the obtained suspension was filtered through a pad of Celite 503. The filtrate was evaporated to dryness, and the crude product was re-crystallized from 250 ml of methylcyclohexane. Yield: 6.37 g (83%) of a purple powder.

$^1$H NMR (CDCl$_3$, 400 MHz): δ 7.72 (dd, J=8.1, 5.7 Hz, 2H), 7.20 (t, J=8.5 Hz, 2H), 6.77 (s, 1H), 2.76 (s, 3H), 2.50 (s, 3H), 2.30 (s, 3H).

1.2.16. Synthesis of (η$^5$-2,3,5-Trimethyl-6-isopropylcyclopenta[b]thiophenyl)titanium(IV) trichloride

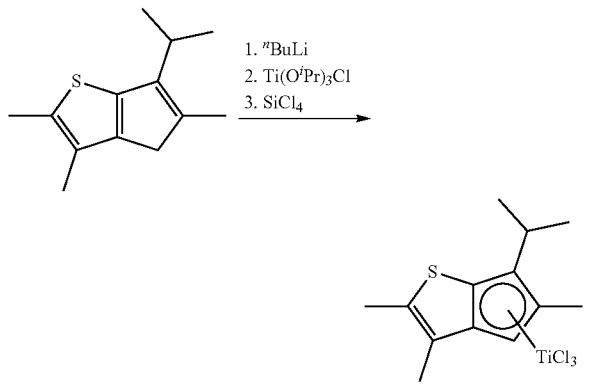

To a solution of 1.03 g (5.00 mmol) of 2,3,5-trimethyl-6-isopropyl-4H-cyclopenta[b]thiophene in 50 ml of THF 2.00 ml of 2.5 M (5.00 mmol) n-butyllithium in hexanes was added at −50° C. The obtained solution was stirred for 1 h at room temperature, then cooled to −80° C., and 1.30 g (5.00 mmol) of tris(isopropoxy)titanium chloride was added. The reaction mixture was stirred overnight at room temperature, then evaporated to dryness. The crude tris (isopropoxy) thiophenefusedcyclopentadienyl titanium was dissolved in 50 ml of dry toluene, and 4.24 g (25.0 mmol) of SiCl$_4$ was added. The obtained suspension was stirred overnight at 60° C. and then evaporated to dryness. To the residue 50 ml of dichloromethane was added, and the obtained suspension was filtered through a pad of Celite 503. The filtrate was evaporated to dryness, and the crude product was re-crystallized from 80 ml of methylcyclohexane. Yield: 1.00 g (56%) of a purple powder.

$^1$H NMR (CDCl$_3$, 400 MHz): δ 6.70 (s, 1H), 3.46 (sept, J=6.8 Hz, 1H), 2.52 (s, 3H), 2.47 (s, 3H), 2.23 (s, 3H), 1.53 (d, J=6.9 Hz, 3H), 1.18 (d, J=7.0 Hz, 3H).

1.3. Syntheses of the Titanium Di-Chloride Amidinate Complexes Bearing Acyclic Amidinate General Procedure for the Tethering of the Acyclic Amidinate Ligand:

To a solution of the metal precursor in 200 mL of toluene, 1 equivalent of the amidinate and 5 equivalent of trimethylamine were added at room temperature. The obtained mixture was stirred at room temperature overnight and then evaporate to dryness. The residue was dissolved in 200 mL of toluene and the resulting mixture was filtered through a pad of celite. The filtrate was concentrated to 20 mL and 150 mL of pentane was added. The resulting suspension, cooled to −30° C., was filtered and the precipitate was washed with 2×50 mL of cold pentane and subsequently dried in vacuum. The obtained powder was re-crystallized from pentane: hexane mixture (1:5) at −30° C.

1.3.1. Comparison Example 1: Synthesis of (1,2,3-Trimethyl-benzo[b]cyclopenta[d]thienyl) [(2,6-difluorophenyl)(piperidin-1-yl)methylene]titanamine dichloride (CE 1) known from KR20170046462

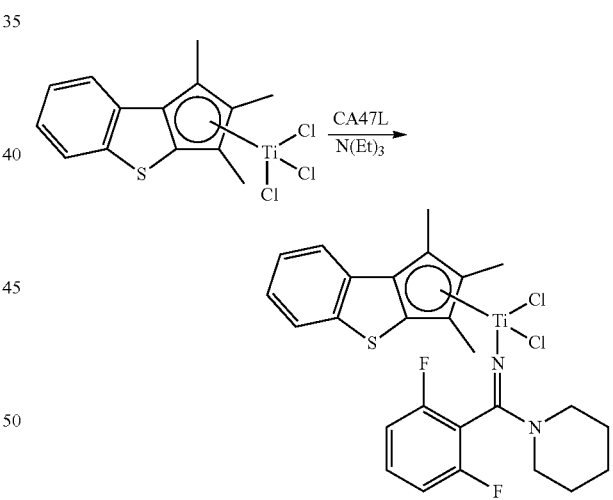

This complex was obtained as described in the general procedure at the beginning of this part starting from trichloro (1,2,3-trimethylbenzo[b]cyclopenta[d]thienyl)titanium (4.02 g, 10.9 mmol), 1-(2,6-difluorophenyl)-1-piperidin-1-ylmethanimine (2.44 g, 10.9 mmol), triethylamine (5.52 g, 54.4 mmol) and 70 ml of toluene. The yield was 3.82 g (63%) of a dark orange powder.

$^1$H NMR (CD$_2$Cl$_2$, 400 MHz): δ 7.87-7.89 (m, 1H), 7.69-7.71 (m, 1H), 7.30-7.41 (m, 3H), 6.96-7.00 (m, 2H), 3.29-3.42 (m, 2H), 3.09-3.19 (m, 2H), 2.48 (s, 3H), 2.23 (s, 3H), 2.21 (s, 3H), 1.49-1.63 (m, 6H).

$^{19}$F NMR (CD$_2$Cl$_2$, 376 MHz): δ −111.15 (m, 1F), −111.22 (m, 1F).

1.3.2. Synthesis of (2,3,4,5,6-Pentamethyl-cyclopenta[b]thienyl)[(2,6-difluorophenyl)(piperidin-1-yl)methylene]titanamine dichloride (Cpd 1)

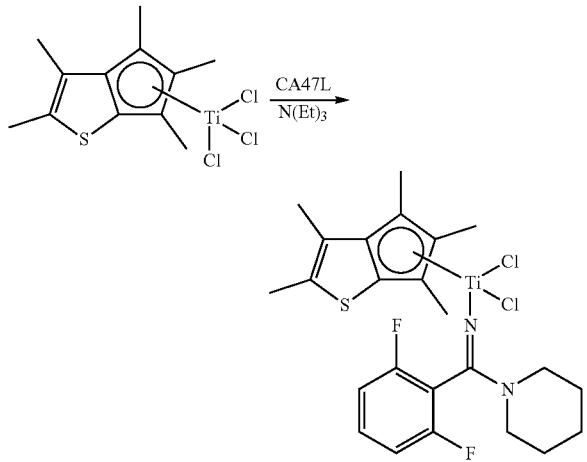

This compound was obtained as described in the general procedure at the beginning of this part starting from trichloro (2,3,4,5,6-pentamethylcyclopenta[b]thienyl)titanium (3.98 g, 11.5 mmol), 1-(2,6-difluorophenyl)-1-piperidin-1-yl-methanimine (2.58 g, 11.5 mmol), triethylamine (5.82 g, 57.6 mmol), and 100 ml of toluene. This procedure gave 5.40 g (88%) of yellow powder.

$^1$H NMR (CD$_2$Cl$_2$, 400 MHz): δ 7.34-7.41 (m, 1H), 6.97-7.01 (m, 2H), 3.65-3.67 (m, 2H), 3.19-3.21 (m, 2H), 2.33 (s, 3H), 2.32 (s, 3H), 2.22 (s, 3H), 2.13 (s, 3H), 2.13 (s, 3H).

$^{19}$F NMR (CD$_2$Cl$_2$, 376 MHz): δ −111.39 (m, 1F), −111.48 (m, 1F).

1.3.3. Synthesis of (3-Bromo-4,5,6-trimethylcyclopenta[b]thienyl)[(2,6-difluorophenyl) (piperidin-1-yl)methylene]titanamine dichloride (Cpd. 3)

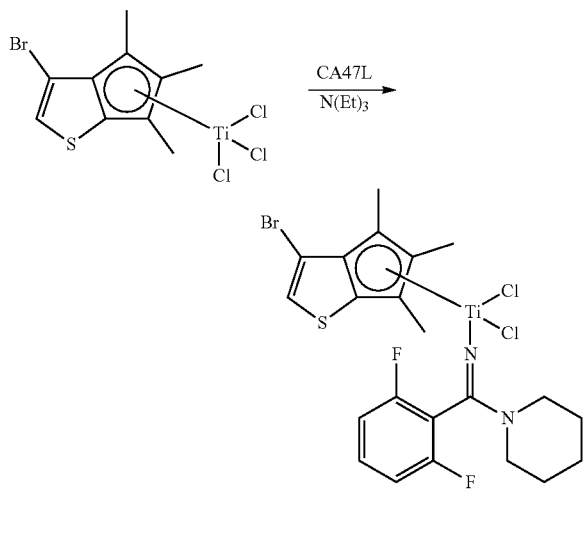

This complex was obtained as described in the general procedure at the beginning of this part starting from (3-bromo-4,5,6-trimethyl-cyclopenta[b]thienyl)(trichloro)titanium (5.96 g, 15.0 mmol), 1-(2,6-difluorophenyl)-1-piperidin-1-ylmethanimine (3.36 g, 15.0 mmol), triethylamine (7.59 g, 75.0 mmol), and 250 ml of toluene. This procedure gave 7.80 g (89%) of orange powder.

$^1$H NMR (CD$_2$Cl$_2$, 400 MHz): δ 7.30-7.37 (m, 1H), 7.11 (s, 1H), 6.93-6.97 (m, 2H), 3.66-3.77 (m, 2H), 3.18-3.21 (m, 2H), 2.43 (s, 3H), 2.22 (s, 3H), 2.11 (s, 3H), 1.63-1.76 (m, 4H), 1.54-1.59 (m, 2H), $^{19}$F NMR (CD$_2$Cl$_2$, 376 MHz): δ −110.03 (m, 1F), −110.12 (m, 1F).

1.3.4. Synthesis of (3-Bromo-2,4,5,6-tetramethylcyclopenta[b]thienyl)[(2,6-difluorophenyl)-(piperidin-1-yl)methylene]titanamine dichloride (Cpd 5)

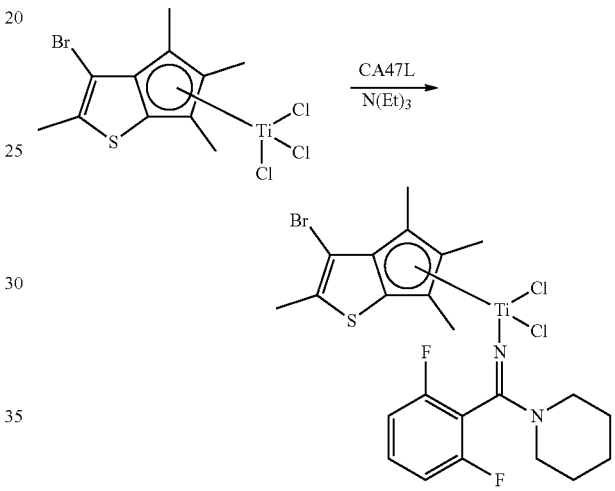

This compound was obtained as described in the general procedure at the beginning of this part starting from (3-bromo-2,4,5,6-tetramethyl-cyclopenta[b]thienyl)(trichloro)-titanium (5.55 g, 13.5 mmol), 1-(2,6-difluorophenyl)-1-piperidin-1-ylmethanimine (3.02 g, 13.5 mmol), triethylamine (6.82 g, 67.4 mmol), and 250 ml of toluene. This procedure gave 7.26 g (90%) of red powder.

$^1$H NMR (CDCl$_3$, 400 MHz): δ 7.29-7.37 (m, 1H), 6.92-6.98 (m, 2H), 3.65-3.76 (m, 2H), 3.18-3.20 (m, 2H), 2.43 (s, 3H), 2.38 (s, 3H), 2.19 (s, 3H), 2.07 (s, 3H), 1.63-1.75 (m, 4H), 1.54-1.59 (m, 2H).

$^{19}$F NMR (CDCl$_3$, 376 MHz): δ −110.24 (m).

1.3.5. Synthesis of Dichloro{4,5,6-trimethylcyclopenta[b]thienyl}[(2,6-difluorophenyl)(piperidin-1-yl)methylene]titanamine (Cpd 11)

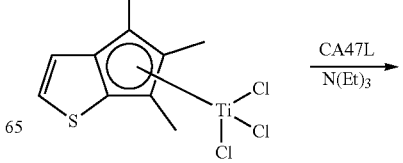

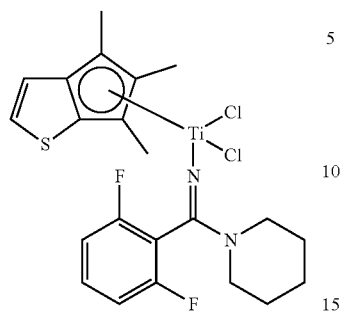

This compound was obtained as described in the general procedure at the beginning of this part starting from trichloro (4,5,6-trimethylcyclopenta[b]thienyl)titanium (5.00 g, 15.8 mmol), (2,6-difluorophenyl)(piperidin-1-yl)methanimine (3.54 g, 15.8 mmol), triethyl-amine (7.97 g, 78.7 mmol), and 200 ml of toluene. This procedure gave 4.70 g (59%) of a yellow powder.

$^1$H NMR (CD$_2$Cl$_2$, 400 MHz): δ 7.39 (m, 1H), 7.28 (d, 1H, J=4.9 Hz), 6.92-7.02 (m, 3H), 3.63 (br.s, 2H), 3.20 (br.s, 2H), 2.23 (s, 6H), 2.18 (s, 3H), 1.68 (br.s, 4H), 1.57 (br.s, 2H).

1.3.6. Synthesis of Dichloro{3-(2-isopropylphenyl)-4,5,6-trimethylcyclopenta[b]thienyl}[(2,6-difluorophenyl)(piperidin-1-yl)methylene]titanamine (Cpd 13)

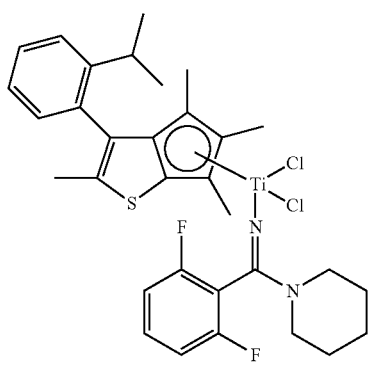

This compound was obtained as described in the general procedure at the beginning of this part starting from trichloro (3-(2-isopropylphenyl)-2,4,5,6-trimethylcyclopenta[b]thienyl)titanium (1.65 g, 3.7 mmol), (2,6-difluorophenyl)(piperidin-1-yl)methanimine (820 mg, 3.7 mmol), triethyl-amine (1.86 g, 18.4 mmol), and 100 ml of toluene. This procedure gave 1.56 g (67%) of a yellow powder.

1H NMR (CD$_2$Cl$_2$, 400 MHz): δ 7.28-7.41 (m, 3H), 7.11-7.15 (m, 1H), 6.98 (m, 3H), 3.67 (br.s, 2H), 3.18 (m, 2H), 2.73 (sept, 1H, J=6.9 Hz), 2.29 (s, 3H), 2.18 (s, 3H), 1.94 (s, 3H), 1.83 (s, 3H), 1.66 (br.s, 4H), 1.55 (br.s, 2H), 1.10 (d, 3H, J=6.9 Hz), 1.04 (d, 3H, J=6.9 Hz)

1.3.7. Synthesis of Dichloro{3-(4-dimethylaminophenyl)-4,5,6-trimethylcyclopenta[b]thienyl}-[(2,6-difluorophenyl)(piperidin-1-yl)methylene]titanamine (Cpd 15)

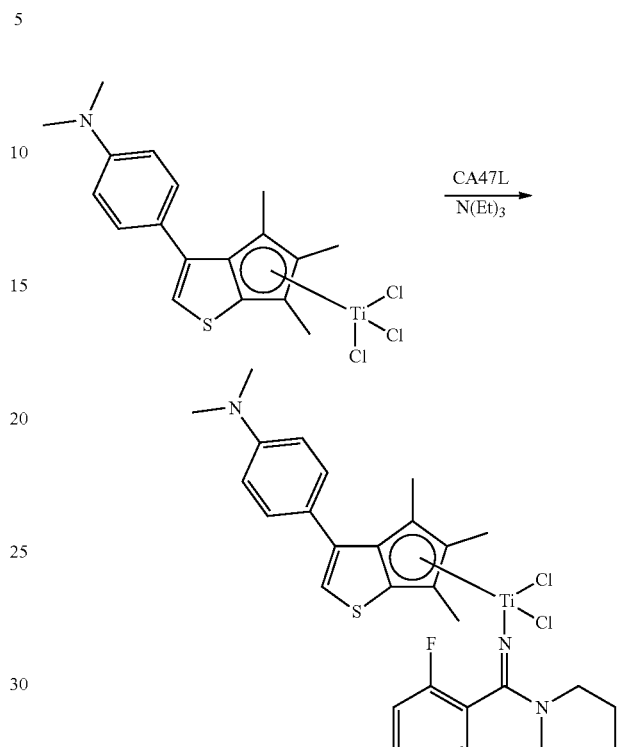

This compound was obtained as described in the general procedure at the beginning of this part starting from trichloro (3-(4-dimethylaminophenyl)-4,5,6-trimethylcyclopenta-[b] thienyl)titanium (2.45 g, 5.61 mmol), (2,6-difluorophenyl)(piperidin-1-yl)methanimine (1.26 g, 5.61 mmol), triethylamine (3.62 g, 28.1 mmol), and 150 ml of toluene. This procedure gave 2.00 g (57%) of a yellow powder.

$^1$H NMR (CD$_2$Cl$_2$, 400 MHz): δ 7.35 (m, 1H), 7.29 (d, 2H, J=8.9 Hz), 7.03 (s, 1H), 6.91-7.00 (m, 2H), 6.67 (d, 2H, J=8.9 Hz), 3.68 (br.s, 2H), 3.18 (m, 2H), 2.97 (s, 6H), 2.29 (s, 3H), 2.18 (s, 3H), 2.10 (s, 3H), 1.67 (br.s, 4H), 1.55 (br.s, 2H),

1.3.8. Synthesis of {3-(3,5-Di-tert-butylphenyl)-4,5,6-trimethylcyclopenta[b]thienyl}[(2,6-difluorophenyl)(piperidin-1-yl)methylene]titanamine dichloride (Cpd 7)

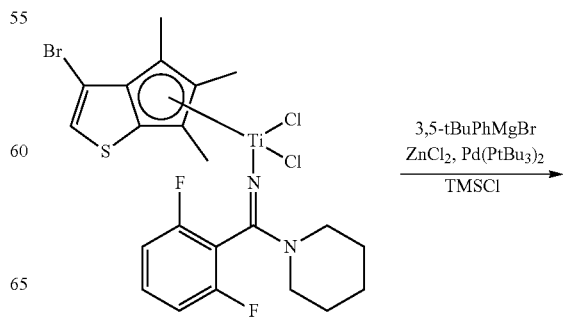

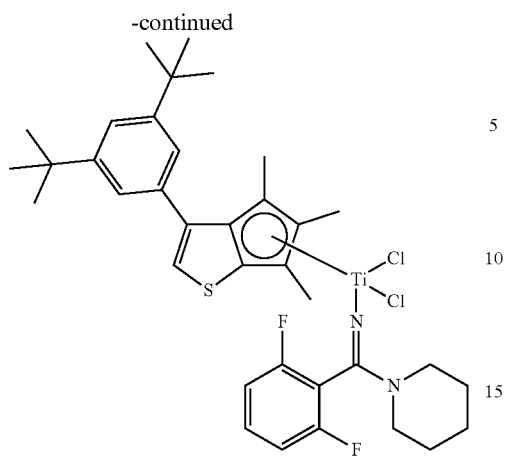

To 7.1 ml of solution of 3,5-di-tert-butylphenylmagnesium bromide (4.16 mmol, 0.588 M) in THF a solution of 570 mg (4.16 mmol) of ZnCl$_2$ in 10 ml of THF was added. The obtained mixture was stirred for 1 h at room temperature, and then 9 mg (0.015 mmol) of Pd(PtBu$_3$)$_2$ in 2 ml of ether was added. The obtained mixture was heated to reflux, and then a solution of 2.33 g (4.00 mmol) of (3-bromo-4,5,6-trimethyl-cyclopenta-[b]thienyl)[(2,6-difluorophenyl)(piperidin-1-yl)methylene]titanamine dichloride in 40 ml of THF was added. The resulting mixture was stirred overnight at 40° C. After that, it was quenched by 10.0 ml of chlorotrimethylsilane and then evaporated to dryness. To the residue 100 ml of toluene was added. This mixture was refluxed for 30 min and then filtered through a pad of Celite. The obtained filtrate was evaporated to ca. 30 ml. Crystals precipitated from this solution at −30° C. were collected, washed by 50 ml of cold hexane, and dried in vacuum. This procedure gave 2.69 g (97%) of dark red crystalline material.

$^1$H NMR (CDCl$_3$, 400 MHz): δ 7.34-7.37 (m, 3H), 7.23-7.30 (m, 1H), 7.13 (s, 1H), 6.87-6.91 (m, 2H), 3.57-3.70 (m, 2H), 3.13-3.16 (m, 2H), 2.28 (s, 3H), 2.17 (s, 3H), 2.07 (s, 3H), 1.50-1.67 (m, 6H), 1.31 (s, 18H).

$^{19}$F NMR (C$_6$D$_6$, 376 MHz): δ −110.31 (m, 1F), −110.66 (m, 1F).

1.3.9. Synthesis of {3-(3,5-Di-tert-butylphenyl)-2,4,5,6-tetramethylcyclopenta[b]thienyl}[(2,6-difluorophenyl)(piperidin-1-yl)methylene]titanamine dichloride (Cpd 9)

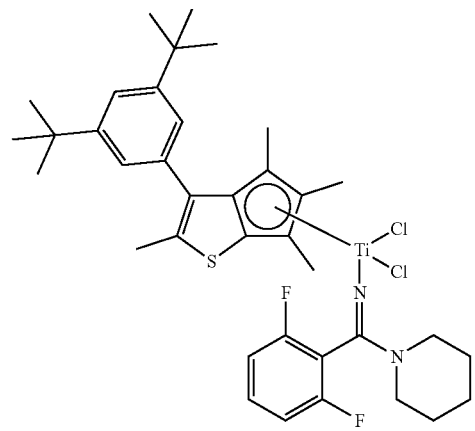

This complex was obtained as described for {3-(3,5-di-tert-butylphenyl)-4,5,6-trimethyl-cyclopenta[b]thienyl}[(2,6-difluorophenyl)(piperidin-1-yl)methylene]titanamine dichloride starting from (3-bromo-2,4,5,6-tetramethyl-cyclopenta[b]thienyl)[(2,6-difluorophenyl)-(piperidin-1-yl)methylene]titanamine dichloride (1.80 g, 3.00 mmol), 3,5-di-tert-butylphenylmagnesium bromode (5.31 ml, 3.12 mmol, 0.588 M in THF), ZnCl$_2$ (425 mg, 3.12 mmol), Pd(PtBu$_3$)$_2$ (6 mg, 0.011 mmol), 15.0 ml of chlorotrimethylsilane, and 40 ml of THF. Crude product was re-crystallized from toluene at −30° C. to give 2.08 g (98%) of red crystalline solid.

$^1$H NMR (CDCl$_3$, 400 MHz): δ 7.28-7.34 (m, 2H), 7.08-7.55 (br.s, 2H), 6.90-6.95 (m, 2H), 3.60-3.73 (m, 2H), 3.15-3.18 (m, 2H), 2.35 (s, 3H), 2.26 (s, 3H), 2.02 (s, 3H), 1.95 (s, 3H), 1.53-1.69 (m, 6H), 1.31 (s, 18H).

$^{19}$F NMR (C$_6$D$_6$, 376 MHz): δ −110.31 (m, 1F), −110.66 (m, 1F).

1.3.10. Synthesis of Dichloro{3-(4-dimethylaminophenyl)-2,4,5,6-tetramethyl-cyclopenta[b]thienyl}[(2,6-difluorophenyl)(piperidin-1-yl)methylene]titanamine (Cpd 18)

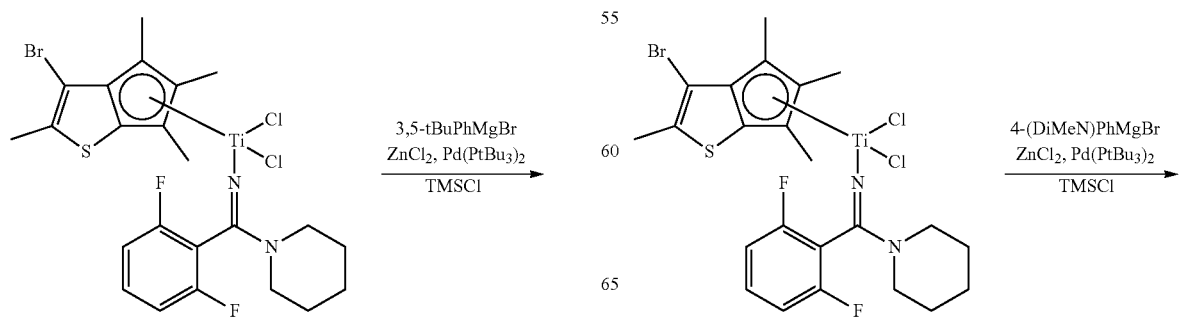

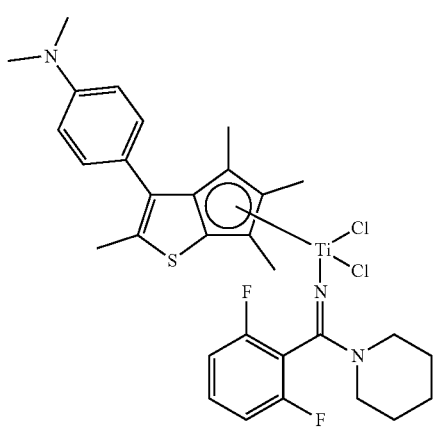

This complex was obtained as described for {3-(3,5-di-tert-butylphenyl)-4,5,6-trimethyl-cyclopenta[b]thienyl}[(2,6-difluorophenyl)(piperidin-1-yl)methylene]titanamine dichloride starting from (3-bromo-2,4,5,6-tetramethyl-cyclopenta[b]thienyl)[(2,6-difluorophenyl)-(piperidin-1-yl)methylene]titanamine dichloride (1.20 g, 2.00 mmol), 3,5-di-tert-butylphenylmagnesium bromode (5.35 ml, 4 mmol), ZnCl$_2$ (600 mg, 4.4 mmol), Pd(PtBu$_3$)$_2$ (51 mg, 0.10 mmol), 10.0 ml of chlorotrimethylsilane, and 40 ml of THF. Crude product was re-crystallized from toluene at −30° C. to give 870 mg (68%) of red crystalline solid.

$^1$H NMR (CD$_2$Cl$_2$, 400 MHz): δ 7.34-7.47 (m, 2H), 7.16 (d, 2H, J=8.4 Hz), 6.99 (m, 1H), 6.70 (d, 2H, J=8.4 Hz), 3.69 (br.s, 2H), 3.19 (br.s, 2H), 2.98 (s, 6H), 2.32 (s, 3H), 2.26 (s, 3H), 2.03 (s, 3H), 1.98 (s, 3H), 1.67 (br.s, 4H), 1.56 (br.s, 2H)

1.3.11. Synthesis of {3-(4-methylphenyl)-2,4,5,6-tetramethylcyclopenta[b]thienyl}[(2,6-difluorophenyl)(piperidin-1-yl)methylene]titanamine dichloride (Cpd 17)

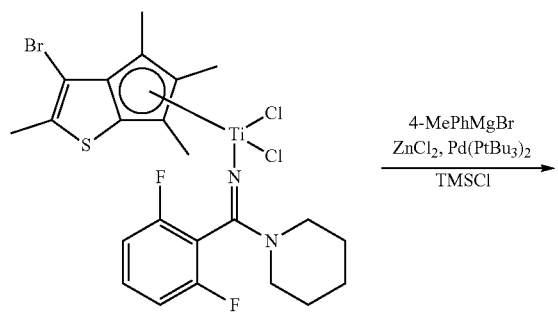

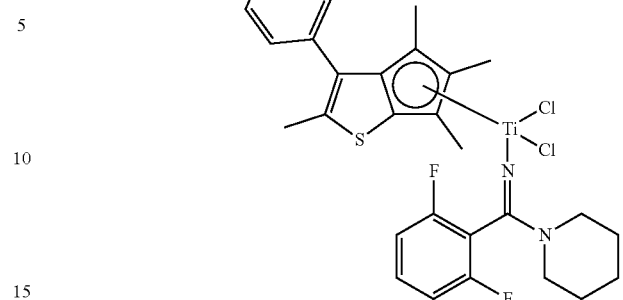

To a solution of 0.53 M p-tolylmagnesiumbromide in THF (34.2 ml, 17.1 mmol) a solution of 51.0 mg (0.10 mmol) of Pd(P$^t$Bu$_3$)$_2$ in 5 ml of ether was added. The resulting mixture was stirred for 15 min at room temperature, then heated to reflux, and a solution of 2.05 g (3.42 mmol) of (dimethyl)(3-bromo-4,5,6-trimethylcyclopenta[b]-thienyl)[(2,6-difluorophenyl)(piperidin-1-yl)methylene] titanamine in 40 ml of ether was added at reflux. The obtained mixture was stirred overnight at 40° C. and then evaporated to dryness. To the residue 25 ml of toluene was added. The resulting mixture was refluxed for 30 min and then evaporated to dryness. The residue was triturated in 100 ml of hexane, and the resulting suspension was filtered through a pad of Celite 503. The filtrate was evaporated to ca. 10 ml. Crystals precipitated from this solution at −30° C. were collected, washed by 2×15 ml of cold hexane, and dried in vacuum. This procedure gave 1.75 g (90%) of a yellow crystals.

$^1$H NMR (C$_6$D$_6$, 400 MHz): δ 7.31 (d, 2H, J=8.1 Hz), 7.02 (d, 2H, J=8.1 Hz), 6.46-6.58 (m, 3H), 3.70 (br.s, 2H), 2.90 (br.s, 2H), 2.26 (s, 3H), 2.20 (s, 3H), 2.16 (s, 3H), 1.97 (s, 3H), 1.75 (s, 3H), 1.40 (br.s, 2H), 1.16 (br.s, 4H), 0.65 (s, 3H), 0.60 (s, 3H).

1.3.12. Synthesis of Dichloro(η$^5$-2,2,5,6,7-pentamethyl-1,2,3-trihydrodicyclopenta-[b,d]thiophenyl)[(2,6-difluorophenyl)(piperidin-1-yl)methylene]titan(IV) amine (Cpd 27)

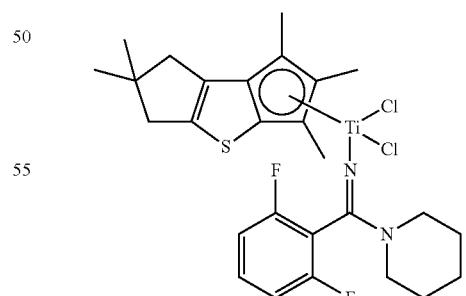

This complex was obtained as described in the general procedure at the beginning of this part Yield: 52%

1H NMR (CD$_2$Cl$_2$, 400 MHz): δ 7.37 (m, 1H), 6.99 (m, 2H), 3.67 (m, 2H), 3.20 (m, 2H), 2.55-2.68 (m, 4H), 2.26 (s,

3H), 2.13 (s, 3H), 2.11 (s, 3H), 1.68 (br.s, 4H), 1.56 (br.s, 2H), 1.24 (s, 3H), 1.21 (s, 3H).

1.3.13. Synthesis of Dichloro(η⁵-6,7,8-trimethyl-1,2,3,4-tetrahydrocyclohexa[b]cyclopenta-[d]thiophenyl)[(2,6-difluorophenyl)(piperidin-1-yl)methylene]titanamine(Cpd 24)

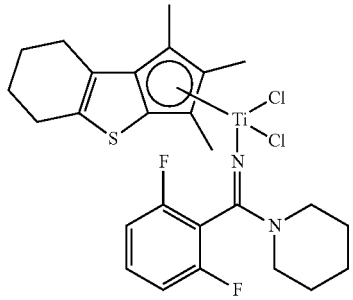

This complex was obtained as described in the general procedure at the beginning of this part Yield: 62%

¹H NMR (CD$_2$Cl$_2$, 400 MHz): δ 7.40 (m, 1H), 6.89 (m, 2H), 3.65 (br.s, 2H), 3.14 (br.s, 2H), 2.80-2.90 (m, 1H), 2.54-2.68 (m, 2H), 2.45-2.48 (m, 1H), 2.29 (s, 3H), 2.14 (s, 3H), 1.78 (s, 3H), 1.65 (br.s, 4H), 1.45 (br.s, 2H).

1.3.14. Synthesis of Dichloro(η⁵-2-phenyl-3,4,5,6-tetramethylcyclopenta[b]thienyl)[(2,6-difluorophenyl)(piperidin-1-yl)methylene]titan(IV)amine (Cpd 28)

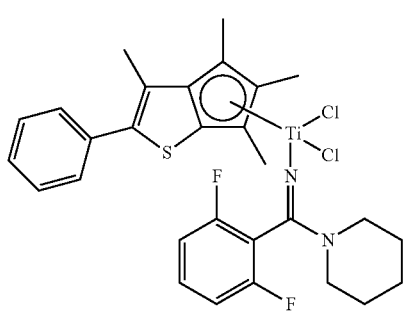

This complex was obtained as described in the general procedure at the beginning of this part Yield: 75%

¹H NMR (CD$_2$Cl$_2$, 400 MHz): δ 7.35-7.44 (m, 6H), 6.98 (m, 2H), 3.66 (br.s, 2H), 3.20 (br.s, 2H), 2.40 (s, 3H), 2.36 (s, 3H), 2.21 (s, 3H), 2.14 (s, 3H), 1.64 (br.s, 4H), 1.55 (br.s, 2H).

1.3.15. Synthesis of Dichloro[η⁵-2-(3,5-di-tert-butylphenyl)-3,4,5,6-tetramethylcyclopenta-[b]thienyl][(2,6-difluorophenyl)(piperidin-1-yl)methylene]titan(IV)amine (Cpd 29)

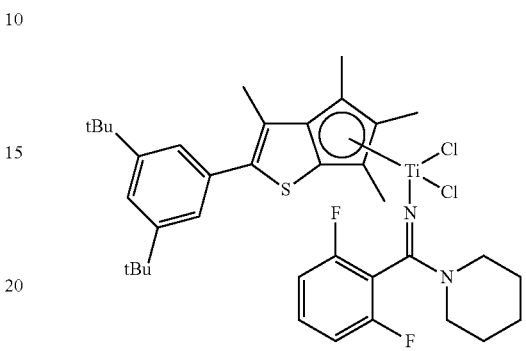

This complex was obtained as described in the general procedure at the beginning of this part Yield: 64%

¹H NMR (CD$_2$Cl$_2$, 400 MHz): δ 7.43 (t, 1H, J4=1.7 Hz), 7.37 (m, 1H), 7.29 (s, 1H), 7.28 (s, 1H), 6.99 (m, 2H), 3.58-3.71 (m, 2H), 3.20 (m, 2H), 2.41 (s, 3H), 2.40 (s, 3H), 2.20 (s, 3H), 2.15 (s, 3H), 1.65 (br.s, 4H), 1.56 (br.s, 2H), 1.36 (s, 18H).

1.3.16. Synthesis of Dichloro[η⁵-2-(2-isopropylphenyl)-3,4,5,6-tetramethylcyclopenta-[b]thienyl][(2,6-difluorophenyl)(piperidin-1-yl)methylene]titan(IV)amine (Cpd. 30)

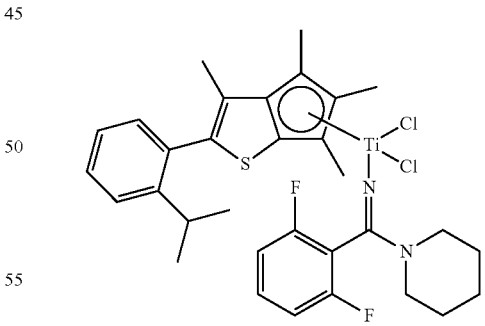

This complex was obtained as described in the general procedure at the beginning of this part Yield: 82%

¹H NMR (CD$_2$Cl$_2$, 400 MHz): δ 7.34-7.43 (m, 3H), 7.14-7.26 (m, 2H), 7.00 (m, 2H), 3.78 (br.s, 2H), 3.12-3.33 (m, 3H), 3.29 (br.s, 3H), 2.24 (br.s, 3H), 2.15 (br.s, 3H), 2.08 (br.s, 3H), 1.68-1.73 (m, 4H), 1.58 (br.s, 2H), 1.14 (d, 6H, J=6.6 Hz).

1.3.17. Synthesis of Dichloro(η⁵-2-cyclohexyl-3,4,5,6-tetramethylcyclopenta[b]thienyl)[(2,6-difluorophenyl)(piperidin-1-yl)methylene]titan(IV)amine (Cpd 31)

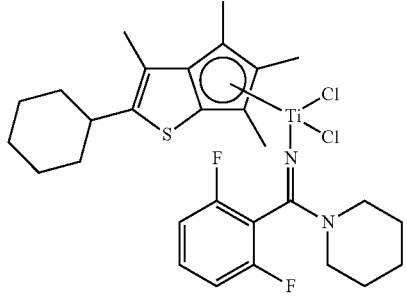

This complex was obtained as described in the general procedure at the beginning of this part Yield: 77%

¹H NMR (CD$_2$Cl$_2$, 400 MHz): δ 7.38 (m, 1H), 6.96-7.03 (m, 2H), 3.71 (br.s, 2H), 3.20 (br.s, 2H), 2.85 (ddd, 1H, J1=11.4 Hz, J2=8.0 Hz, J3=3.5 Hz), 2.35 (s, 3H), 2.24 (s, 3H), 2.20 (s, 3H), 2.09 (s, 3H), 1.78-1.89 (m, 4H), 1.67-1.73 (m, 5H), 1.56 (br.s, 2H), 1.39 (m, 3H), 1.30 (m, 2H).

1.4. Syntheses of the Titanium Di-Chloride Amidinate Complexes Bearing Cyclic Amidinate Ligand General Procedure for the Tethering of the Cyclic Amidinate Ligand:

To a solution of the metal precursor in 70 mL of toluene the amidinate ligand (1 equivalent) and the trimethylamine (5 equivalent) was added at room temperature. The mixture was stirred overnight at room temperature and then evaporated to dryness. The residue was dissolved in 150 mL of toluene and the obtained mixture was filtered through a pad of Celite. The filtrate was then evaporated to 15 mL and 100 mL of hexane was added in view of crystallization at −30° C. The crystals were isolated by filtration and washed with 2×50 mL of hexane and then dried in vacuum.

1.4.1. Synthesis of (2,3,4,5,6-Pentamethylcyclopenta[b]thienyl)[2-(2,6-dimethylphenyl)-2,3-dihydro-1H-isoindol-1-ylidene]titanamine dichloride (Cpd. 2)

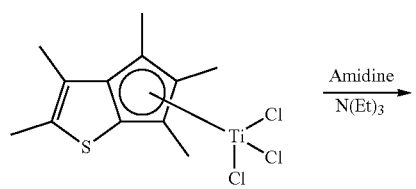

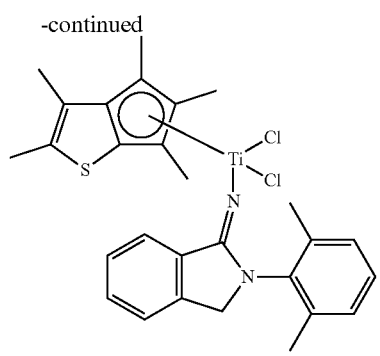

The complex was synthesized using the procedure described at the beginning of this part with (2,3,4,5,6-Pentamethylcyclopenta[b]thienyl)[2-(2,6-dimethylphenyl)-2,3-dihydro-1H-isoindol-1-ylidene]titanamine dichloride and 2-(2,6-dimethylphenyl)-isoindolin-1-imin as starting materials. The reaction yielded 65% of dark red powder.

¹H NMR (CD$_2$Cl$_2$, 400 MHz): δ 7.65-7.67 (m, 1H), 7.58-7.61 (m, 1H), 7.47-7.54 (m, 2H), 7.20-7.24 (m, 1H), 7.15-7.17 (m, 2H), 4.69-4.85 (m, 2H), 2.37 (s, 3H), 2.29 (s, 3H), 2.28 (s, 3H), 2.24 (s, 3H), 2.20 (s, 3H), 2.04 (s, 3H), 1.87 (s, 3H).

1.4.2. Synthesis of (3-Bromo-4,5,6-trimethylcyclopenta[b]thienyl)[2-(2,6-dimethylphenyl)-2,3-dihydro-1H-isoindol-1-ylidene]titanamine dichloride (Cpd 4)

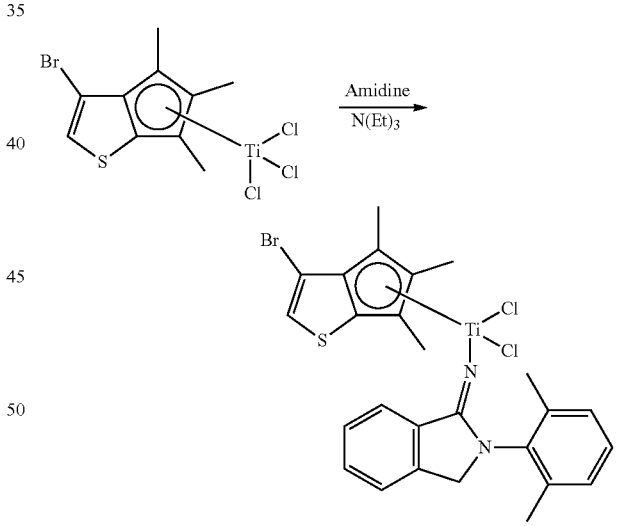

This complex was obtained as described in the general procedure at the beginning of this part starting from (3-bromo-4,5,6-trimethylcyclopenta[b]thienyl)(trichloro)titanium (1.98 g, 4.98 mmol), 2-(2,6-dimethylphenyl)isoindolin-1-imine (1.17 g, 4.98 mmol), triethylamine (2.52 g, 24.9 mmol), and 100 ml of toluene. This procedure gave 1.84 g (62%) of red powder.

¹H NMR (CD$_2$Cl$_2$, 400 MHz): δ 7.84-7.86 (m, 1H), 7.57-7.61 (m, 1H), 7.48-7.52 (m, 2H), 7.21-7.23 (m, 1H), 7.15-7.17 (m, 2H), 7.09 (s, 1H), 4.75 (s, 2H), 2.37 (s, 3H), 2.35 (s, 3H), 2.33 (s, 3H), 2.05 (s, 3H), 2.00 (s, 3H).

1.4.3. Synthesis of (3-Bromo-2,4,5,6-tetramethylcyclopenta[b]thienyl)[2-(2,6-dimethylphenyl)-2,3-dihydro-1H-isoindol-1-ylidene]titanamine dichloride (Cpd. 6)

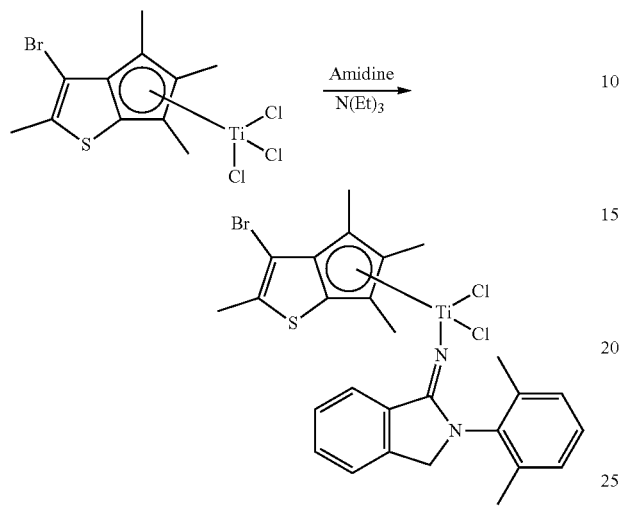

This complex was obtained as described in the general procedure at the beginning of this part starting from (3-bromo-2,4,5,6-tetramethylcyclopenta[b]thienyl)(trichloro)-titanium (1.79 g, 4.36 mmol), 2-(2,6-dimethylphenyl)isoindolin-1-imine (1.05 g, 4.36 mmol), triethylamine (2.21 g, 21.8 mmol), and 100 ml of toluene. This procedure gave 1.65 g (62%) of dark red powder.

$^1$H NMR (CDCl$_3$, 400 MHz): δ 7.73-7.75 (m, 1H), 7.55-7.59 (m, 1H), 7.46-7.50 (m, 2H), 7.14-7.21 (m, 3H), 4.74 (s, 2H), 2.35 (s, 3H), 2.35 (s, 3H), 2.33 (s, 3H), 2.26 (s, 3H), 1.98 (s, 3H), 1.97 (s, 3H).

1.4.4. Synthesis of Dichloro[4,5,6-trimethylcyclopenta[b]thienyl)][2-(2,6-dimethylphenyl)-2,3-dihydro-1H-isoindol-1-ylidene]titanamine (Cpd. 12)

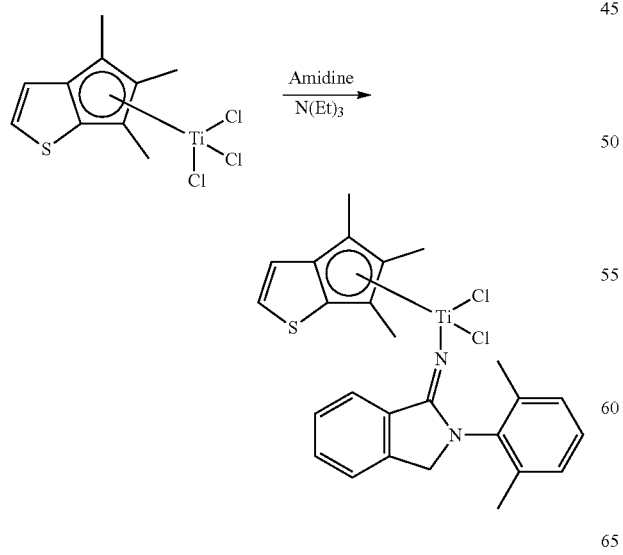

This complex was obtained as described in the general procedure at the beginning of this part starting from from trichloro(4,5,6-trimethylcyclopenta[b]thienyl)titanium (5.00 g, 15.8 mmol), 2-(2,6-dimethylphenyl)isoindolin-1-imine (3.72 g, 15.8 mmol), triethylamine (7.97 g, 78.7 mmol), and 150 ml of toluene. This procedure gave 4.70 g (58%) of a dark red powder.

$^1$H NMR (CD$_2$Cl$_2$, 400 MHz): δ 7.76 (d, 1H, J=7.5 Hz), 7.61 (m, 1H), 7.49-7.54 (m, 2H), 7.17-7.25 (m, 4H), 6.89 (d, 1H, J=4.5 Hz), 4.77 (m, 2H), 2.34 (s, 3H), 2.31 (s, 3H), 2.16 (s, 3H), 2.09 (s, 3H), 2.07 (s, 3H).

1.4.5. Synthesis of Dichloro[3-(2-isopropylphenyl)-2,4,5,6-tetramethylcyclopenta[b]thienyl)][2-(2,6-dimethylphenyl)-2,3-dihydro-1H-isoindol-1-ylidene]titanamine (Cpd. 14)

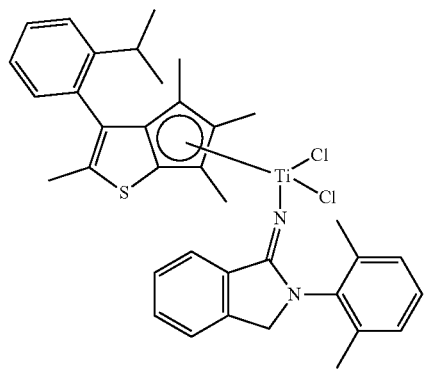

This complex was obtained as described in the general procedure at the beginning of this part starting from dichloro (2,3,4,5,6-pentamethylcyclopenta[b]-thienyl)[2-(2,6-dimethylphenyl)-2,3-dihydro-1H-isoindol-1-ylidene]titanamine (2.00 g, 4.5 mmol), 2-(2,6-dimethylphenyl)isoindolin-1-imine (1.1 g, 4.5 mmol), triethylamine (2.25 g, 22.3 mmol), and 150 ml of toluene. This procedure gave 1.04 g (36%) of a dark red powder.

$^1$H NMR (CD$_2$Cl$_2$, 400 MHz): δ 7.81 (d, 1H, J=7.5 Hz), 7.59-7.62 (m, 1H), 7.42-7.54 (m, 2H), 7.35-7.42 (m, 3H), 7.12-7.29 (m, 4H), 4.75 (m, 2H), 2.70 (sept, 1H, J=6.9 Hz), 2.34 (s, 3H), 2.27 (s, 3H), 2.16 (s, 3H), 2.13 (s, 3H), 1.80 (s, 3H), 1.75 (s, 3H), 1.09 (d, 3H, J=6.9 Hz), 1.02 (d, 3H, J=6.9 Hz)

1.4.6. Synthesis of Dichloro[(3-(4-dimethylaminophenyl)-4,5,6-trimethylcyclopenta[b]thienyl)][2-(2,6-dimethylphenyl)-2,3-dihydro-1H-isoindol-1-ylidene]titanamine (Cpd. 16)

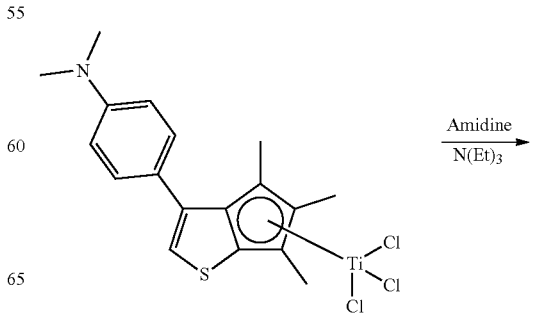

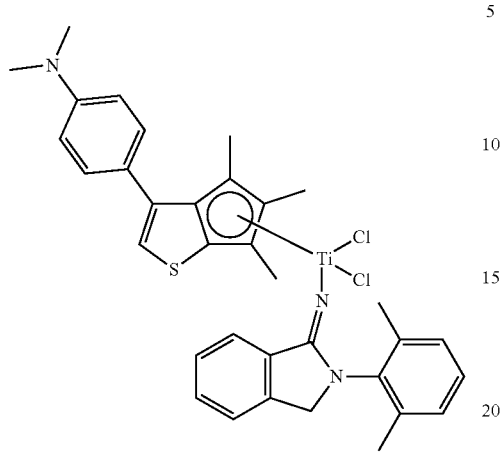

This complex was obtained as described in the general procedure at the beginning of this part starting from trichloro (3-(4-dimethylaminophenyl)-4,5,6-trimethylcyclopenta-[b]thienyl)titanium (3.12 g, 7.14 mmol), 2-(2,6-dimethylphenyl)isoindolin-1-imine (1.69 g, 7.14 mmol), triethylamine (3.62 g, 35.7 mmol), and 150 ml of toluene. This procedure gave 2.06 g (45%) of a dark red powder.

$^1$H NMR (CD$_2$Cl$_2$, 400 MHz): δ 7.76 (d, 1H, J=7.7 Hz), 7.59 (m, 1H), 7.41-7.52 (m, 3H), 7.32 (d, 2H, J=8.8 Hz), 7.23 (m, 2H), 7.00 (s, 1H), 6.71 (d, 2H, J=8.8 Hz), 4.74 (m, 2H), 2.99 (s, 6H), 2.32 (s, 3H), 2.22 (s, 3H), 2.18 (s, 3H), 2.10 (s, 3H), 1.95 (s, 3H).

This complex was obtained as described for {3-(3,5-di-tert-butylphenyl)-4,5,6-trimethyl-cyclopenta[b]thienyl}[(2,6-difluorophenyl)(piperidin-1-yl)methylene]titanamine dichloride starting from (3-bromo-4,5,6-trimethylcyclopenta[b]thienyl)[2-(2,6-dimethylphenyl)-2,3-dihydro-1H-isoindol-1-ylidene]titanamine dichloride (1.40 g, 2.36 mmol), 3,5-di-tert-butylphenylmagnesium bromide (4.17 ml, 2.45 mmol, 0.588 M in THF), ZnCl2 (334 mg, 2.45 mmol), Pd(PtBu3)2 (5 mg, 0.009 mmol), 8.0 ml of chlorotrimethylsilane, and 30 ml of THF. Crude product was re-crystallized from toluene at −30° C. to give 1.53 g (92%) of dark brown crystalline material.

$^1$H NMR (CDCl$_3$, 400 MHz): δ 7.75-7.77 (m, 1H), 7.53-7.57 (m, 1H), 7.41-7.47 (m, 2H), 7.36-7.39 (m, 3H), 7.08-7.19 (m, 4H), 4.63-4.75 (m, 2H), 2.33 (s, 3H), 2.17 (s, 3H), 2.11 (s, 3H), 2.08 (s, 3H), 1.96 (s, 3H), 1.31 (s, 18H).

1.4.7. Synthesis of {3-(3,5-Di-tert-butylphenyl)-4,5,6-trimethylcyclopenta[b]thienyl}[2-(2,6-dimethylphenyl)-2,3-dihydro-1H-isoindol-1-ylidene]titanamine dichloride (Cpd. 8)

1.4.8. Synthesis of dichloro[3-(3,5-di-tert-butylphenyl)-2,4,5,6-tetramethylcyclopenta-[b]thienyl)][2-(2,6-dimethylphenyl)-2,3-dihydro-1H-isoindol-1-ylidene]titanamine (Cpd. 10)

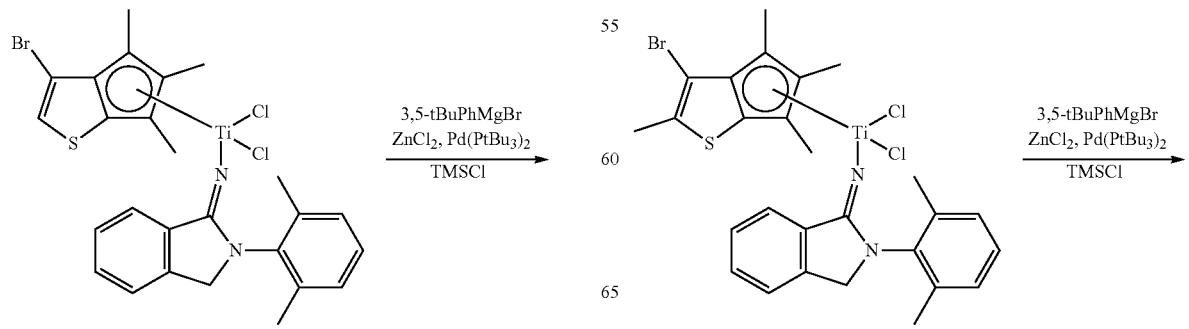

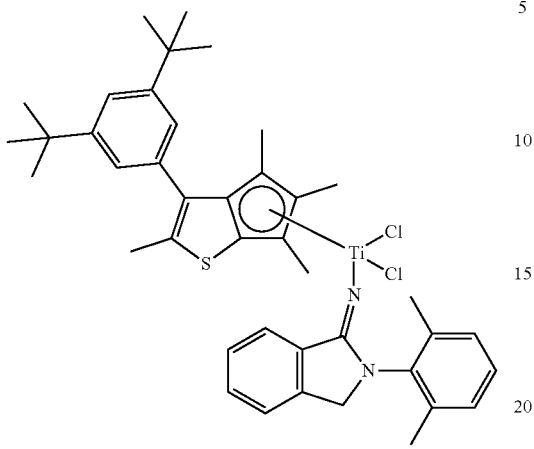

This complex was obtained as described for {3-(3,5-di-tert-butylphenyl)-4,5,6-trimethyl-cyclopenta[b]thienyl}[(2,6-difluorophenyl)(piperidin-1-yl)methylene]titanamine dichloride starting from (3-bromo-2,4,5,6-tetramethylcyclopenta[b]thienyl)[2-(2,6-dimethylphenyl)-2,3-dihydro-1H-isoindol-1-ylidene]titanamine dichloride (3.85 mmol), 3,5-di-tert-butylphenylmagnesium bromide (3.85 mmol, 0.588 M in THF), ZnCl2 (3.85 mmol), Pd(PtBu3)2 (5 mg, 0.009 mmol), 8.0 ml of chlorotrimethylsilane, and 30 ml of THF. Crude product was re-crystallized from toluene at −30° C. to give 1.45 g (52%) of dark orange crystalline material.

$^1$H NMR (CD$_2$Cl$_2$, 400 MHz): δ 7.72 (d, 1H, J=7.5 Hz), 7.59 (m, 1H), 7.52 (d, 1H, J=7.5 Hz), 7.47 (t, 1H, J=7.5 Hz), 7.41 (t, 1H, J4=1.8 Hz), 7.11-7.26 (m, 5H), 4.67-4.82 (m, 2H), 2.36 (s, 3H), 2.25 (s, 3H), 2.16 (s, 3H), 2.06 (s, 3H), 1.94 (s, 3H), 1.87 (s, 3H), 1.33 (s, 18H).

1.4.9. Synthesis of Dichloro(η$^5$-2,2,5,6,7-pentamethyl-1,2,3-trihydrodicyclopenta[b,d]thiophenyl)[2-(2,6-dimethylphenyl)-2,3-dihydro-1H-isoindol-1-ylidene]titan(IV)amine (Cpd. 32)

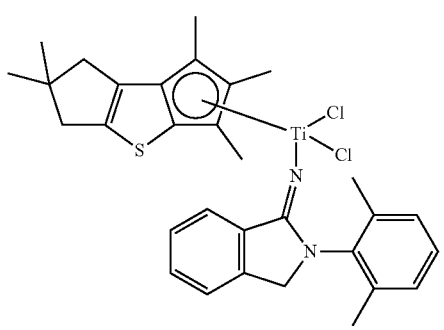

Yield: 38%
$^1$H NMR (CD$_2$Cl$_2$, 400 MHz): δ 7.46-7.60 (m, 4H), 7.28 (m, 2H), 7.13 (m, 1H), 4.70 (s, 2H), 2.55-2.68 (m, 4H), 2.26 (s, 6H), 2.15 (s, 3H), 2.13 (s, 3H), 2.11 (s, 3H), 1.20 (s, 3H), 1.19 (s, 3H).

1.4.10. Synthesis of Dichloro(η$^5$-6,7,8-trimethyl-1,2,3,4-tetrahydrocyclohexa[b]cyclopenta-[d]thiophenyl)[2-(2,6-dimethylphenyl)-2,3-dihydro-1H-isoindol-1-ylidene]titan(IV)amine (Cpd. 25)

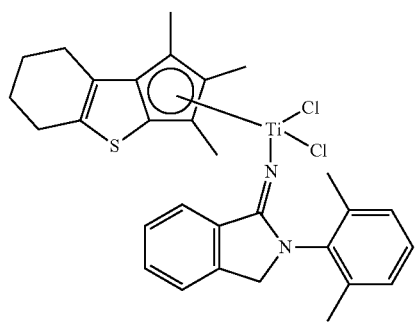

This complex was obtained as described in the general procedure at the beginning of this part
Yield: 67%
$^1$H NMR (CD$_2$Cl$_2$, 400 MHz): δ7.67 (m, 1H), 7.59 (m, 1H), 7.49-7.54 (m, 2H), 7.15-7.24 (m, 3H), 4.68-4.86 (m, 2H), 2.83-2.88 (m, 1H), 2.59-2.69 (m, 2H), 2.47-2.48 (m, 1H), 2.38 (s, 3H), 2.29 (s, 3H), 2.26 (s, 3H), 2.04 (s, 3H), 1.87 (s, 3H), 1.79 (br.s, 4H).

1.4.11. Synthesis of Dichloro(η$^5$-2-phenyl-3,4,5,6-tetramethylcyclopenta[b]thienyl)[2-(2,6-dimethylphenyl)-2,3-dihydro-1H-isoindol-1-ylidene]titan(IV)amine (Cpd. 33)

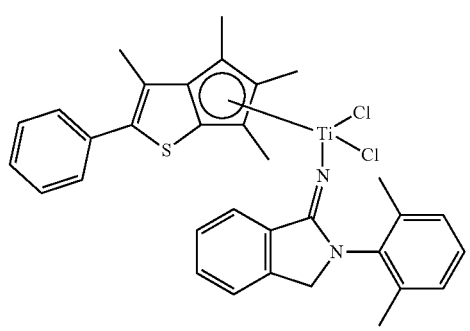

This complex was obtained as described in the general procedure at the beginning of this part
Yield: 45%
$^1$H NMR (CD$_2$Cl$_2$, 400 MHz): δ 7.73 (d, 1H, J=7.6 Hz), 7.51-7.58 (m, 2H), 7.29-7.42 (m, 6H), 7.15-7.22 (m, 3H), 4.70-4.85 (m, 2H), 2.37 (s, 3H), 2.37 (s, 3H), 2.36 (s, 3H), 2.31 (s, 3H), 2.05 (s, 3H), 1.98 (s, 3H).

1.4.12. Synthesis of Dichloro[η⁵-2-(3,5-di-tert-butylphenyl)-3,4,5,6-tetramethylcyclopenta-[b]thienyl][2-(2,6-dimethylphenyl)-2,3-dihydro-1H-isoindol-1-ylidene]titan(IV)amine (Cpd. 34)

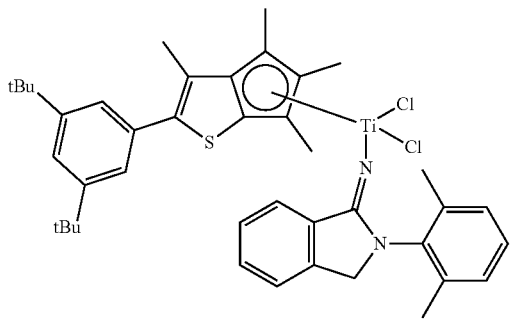

This complex was obtained as described in the general procedure at the beginning of this part Yield: 52%

¹H NMR (CD₂Cl₂, 400 MHz): δ 7.76 (d, 1H, J=7.9 Hz), 7.50-7.56 (m, 2H), 7.39-7.45 (m, 2H), 7.14-7.24 (m, 5H), 4.70-4.84 (m, 2H), 2.39 (s, 3H), 2.37 (s, 3H), 2.36 (s, 3H), 2.30 (s, 3H), 2.06 (s, 3H), 1.96 (s, 3H), 1.31 (s, 18H).

1.4.13. Synthesis of Dichloro(η⁵-2-cyclohexyl-3,4,5,6-tetramethylcyclopenta[b]thienyl)[2-(2,6-dimethylphenyl)-2,3-dihydro-1H-isoindol-1-ylidene]titan(IV)amine (Cpd. 26)

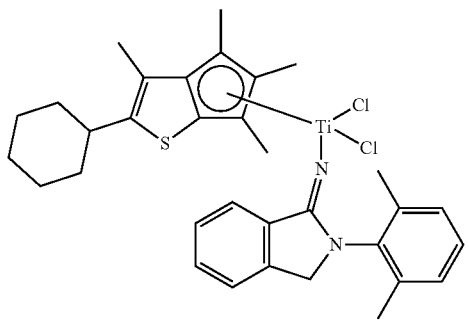

This complex was obtained as described in the general procedure at the beginning of this part Yield: 60%

¹H NMR (CD₂Cl₂, 400 MHz): δ 7.75 (d, 1H, J=7.7 Hz), 7.59 (m, 1H), 7.51 (m, 2H), 7.15-7.24 (m, 3H), 4.69-4.83 (m, 2H), 2.77 (m, 1H), 2.36 (s, 3H), 2.30 (s, 3H), 2.29 (s, 3H), 2.23 (s, 3H), 2.00 (s, 3H), 1.94 (s, 3H), 1.78-1.86 (m, 2H), 1.69 (br.s, 2H), 1.54-1.55 (m, 1H), 1.18-1.39 (m, 5H).

1.5. Syntheses of the Titanium Di-Chloride Amidinate Complexes Bearing Fluorinated Cyclic Amidinate Ligand General Procedure for the Tethering of the Cyclic Amidinate Ligand:

To a solution of the metal precursor in 70 mL of toluene the amidinate ligand (1 equivalent) and the trimethylamine (5 equivalent) was added at room temperature. The mixture was stirred overnight at room temperature and then evaporate to dryness. The residue was dissolved in 150 mL of toluene and the obtained mixture was filtered through a pad of Celite. The filtrate was then evaporated to 15 mL and 100 mL of hexane was added in view of crystallization at −30° C. The crystals were isolated by filtration and washed with 2×50 mL of hexane and then dried in vacuum.

1.5.1. Syntheses of Dichloro(η⁵-2,3,5,6-tetramethylcyclopenta[b]thiophenyl)[2-(2,6-difluorophenyl)-2,3-dihydro-1H-isoindol-1-ylidene]titanamine (Cpd. 19)

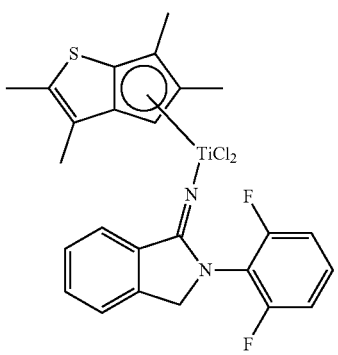

The synthesis was done using the method described at the beginning of this part.

Yield: 1.96 g (86%).

¹H NMR (CDCl₃, 400 MHz): δ 7.64 (d, J=7.7 Hz, 1H), 7.53-7.60 (m, 1H), 7.42-7.50 (m, 2H), 7.35 (tt, J=8.5, 6.1 Hz, 1H), 7.05 (t, J=8.4 Hz, 2H), 6.15 (s, 1H), 4.93 (d, J=17.4 Hz, 1H), 4.81 (d, J=17.3 Hz, 1H), 2.17 (s, 3H), 2.07 (s, 3H), 2.04 (s, 3H), 1.98 (s, 3H).

1.5.2. Syntheses of Dichloro(η⁵-2,3,5-trimethyl-6-phenylcyclopenta[b]thiophenyl)[2-(2,6-difluorophenyl)-2,3-dihydro-1H-isoindol-1-ylidene]titanamine (Cpd. 20)

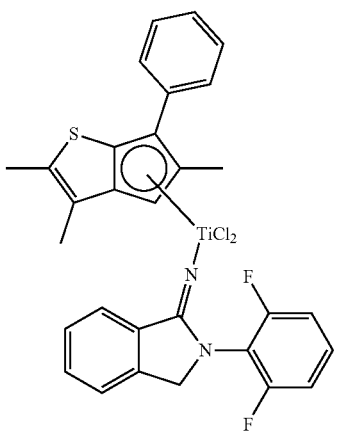

The synthesis was done using the method described at the beginning of this part.

Yield: 2.10 g (83%).

$^1$H NMR (CDCl$_3$, 400 MHz): δ7.51 (d, J=7.4 Hz, 3H), 7.40 (d, J=8.2 Hz, 2H), 7.31-7.37 (m, 1H), 7.17-7.31 (m, 4H), 6.81-6.97 (m, 2H), 6.31 (s, 1H), 4.85 (d, J=17.4 Hz, 1H), 4.72 (d, J=17.5 Hz, 1H), 2.47 (s, 3H), 2.12 (m, 6H).

1.5.3. Syntheses of Dichloro[η$^5$-2,3,5-trimethyl-6-(4-fluorophenyl)-cyclopenta[b]thiophenyl][2-(2,6-difluorophenyl)-2,3-dihydro-1H-isoindol-1-ylidene]titanamine (Cpd. 21)

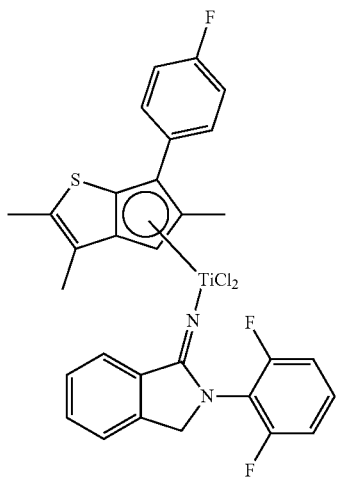

The synthesis was done using the method described at the beginning of this part.

Yield: 1.40 g (76%).

$^1$H NMR (CDCl$_3$, 400 MHz): δ7.51-7.57 (m, 1H), 7.41-7.49 (m, 4H), 7.34-7.41 (m, 1H), 7.19-7.29 (m, 2H), 6.94 (t, J=8.8 Hz, 3H), 4.86 (d, J=17.5 Hz, 1H), 4.71 (d, J=17.5 Hz, 1H), 2.44 (s, 3H), 2.13 (s, 3H), 2.09 (s, 3H).

1.5.4. Syntheses of Dichloro(η$^5$-2,3,5-trimethyl-6-isopropylcyclopenta[b]thiophenyl)[2-(2,6-difluorophenyl)-2,3-dihydro-1H-isoindol-1-ylidene]titanamine (Cpd. 22)

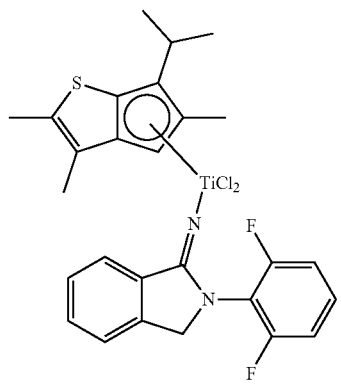

The synthesis was done using the method described at the beginning of this part.

Yield: 616 mg (78%).

$^1$H NMR (CDCl$_3$, 400 MHz): δ7.62-7.67 (m, 1H), 7.53-7.58 (m, 1H), 7.42-7.48 (m, 2H), 7.27-7.36 (m, 1H), 6.97-7.08 (m, 2H), 6.26 (s, 1H), 4.97 (d, J=17.3 Hz, 1H), 4.70 (d, J=17.4 Hz, 1H), 2.92 (sept, J=6.9 Hz, 1H), 2.24 (s, 3H), 2.04 (s, 3H), 1.93 (s, 3H), 1.02 (d, J=6.9 Hz, 3H), 0.89 (d, J=6.9 Hz, 3H).

1.6. Syntheses of the Titanium Di-Methyl Amidinate Complexes Bearing Both Cyclic and Acyclic Amidinate The dichloride complexes were suspended in diethyl ether (20 ml/mmol). The reaction mixture was cooled to −30° C., followed by an addition of MeMgBr (2.2 equiv). This mixture was stirred overnight at room temperature, then evaporated to dryness. N-hexane (10 ml/mmol) was added to the residue and the obtained suspension was filtered through a Celite 503 pad. The filtrate was evaporated to dryness yielding dimethyl titanium complexes. If necessary, the product was recrystallized from n-pentane/n-hexane at −30° C. The respective methyl compounds are designated with an M suffix.

The yield and the 1H NMR characterization are reported in the next table:

| Catalysts | Yield | $^1$H NMR C$_6$D$_6$, 400 MHz |
|---|---|---|
| CE1M | 53% | δ 7.77-7.79 (m, 1H), 7.47-7.49 (m, 1H), 7.14-7.15 (m, 1H), 6.98-7.02 (m, 1H), 6.48-6.58 (m, 3H), 3.47-3.61 (m, 2H), 2.81-2.92 (m, 2H), 2.29 (s, 3H), 2.09 (s, 3H), 1.25-1.35 (m, 2H), 1.08-1.17 (m, 4H), 0.49 (s, 3H), 0.41 (s, 3H) |
| Cpd. 1M | 84% | 6.47-6.59 (m, 3H), 3.63-3.75 (m, 2H), 2.85-2.98 (m, 2H), 2.21 (s, 3H), 2.13 (s, 6H), 2.10 (s, 3H), 1.81 (s, 3H), 1.36-1.46 (m, 2H), 1.12-1.21 (m, 4H), 0.55 (s, 3H), 0.51 (s, 3H) |
| Cpd. 2M | 72% | 7.92-7.94 (m, 1H), 7.12-7.16 (m, 2H), 6.93-7.02 (m, 4H), 4.05-4.14 (m, 2H), 2.18 (s, 3H), 2.15 (s, 3H), 2.14 (s, 3H), 2.13 (s, 3H), 2.10 (s, 3H), 2.04 (s, 3H), 1.69 (s, 3H), 0.51 (s, 3H), 0.41 (s, 3H). |
| Cpd. 3M | 72% | 6.67 (s, 1H), 6.46-6.60 (m, 3H), 3.67-3.73 (m, 2H), 2.85-2.91 (m, 2H), 2.32 (s, 3H), 2.00 (s, 3H), 1.69 (s, 3H), 1.35-1.43 (m, 2H), 1.12-1.16 (m, 4H), 0.55 (s, 3H), 0.53 (s, 3H). |
| Cpd. 4M | 52% | 7.97 (m, 1H), 7.17 (m, 2H), 7.01 (m, 4H), 6.68 (s, 1H), 4.08 (s, 2H), 2.26 (s, 3H), 2.12 (s, 3H), 2.11 (s, 3H), 1.92 (s, 3H), 1.57 (s, 3H), 0.47 (s, 3H), 0.46 (s, 3H). |
| Cpd. 5M | 90% | 6.46-6.59 (m, 3H), 3.69-3.73 (m, 2H), 2.86-2.92 (m, 2H), 2.37 (s, 3H), 2.18 (s, 3H), 2.03 (s, 3H), 1.72 (s, 3H), 1.36-1.42 (m, 2H), 1.13-1.17 (m, 4H), 0.58 (s, 3H), 0.56 (s, 3H). |
| Cpd. 6M | 78% | 7.94 (m, 1H), 7.1 (m, 2H), 7.01 (m, 4H), 4.08 (s, 2H), 2.31 (s, 3H), 2.17 (s, 3H), 2.14 (s, 3H), 2.13 (s, 3H), 1.95 (s, 3H), 1.61 (s, 3H), 0.51 (s, 3H), 0.49 (s, 3H). |
| Cpd. 7M | 77% | 7.59-7.60 (m, 2H), 7.53-7.54 (m, 1H), 6.90 (s, 1H), 6.47-6.57 (m, 3H), 3.70-3.75 (m, 2H), 2.84-2.96 (m, 2H), 2.20 (s, 3H), 2.17 (s, 3H), 1.75 (s, 3H), 1.36-1.40 (m, 2H), 1.36 (s, 18H), 1.13-1.18 (m, 4H), 0.59 (s, 3H), 0.62 (s, 3H). |

| Catalysts | Yield | ¹H NMR C₆D₆, 400 MHz |
|---|---|---|
| Cpd. 8M | 80% | 7.90-7.92 (m, 1H), 7.59-7.60 (m, 2H), 7.53-7.54 (m, 1H), 7.14-7.16 (m, 2H), 6.92-7.00 (m, 4H), 6.90 (s, 1H), 4.04-4.14 (m, 2H), 2.14 (s, 3H), 2.12 (s, 3H), 2.09 (s, 3H), 2.07 (s, 3H), 1.62 (s, 3H), 1.34 (s, 18H), 0.56 (s, 3H), 0.49 (s, 3H). |
| Cpd. 10M | 43% | 7.94 (d, 1H, J = 6.9 Hz), 7.54 (s, 1H), 7.50 (s, 2H), 7.14-7.16 (m, 2H), 6.93-6.98 (m, 4H), 4.10 (m, 2H), 2.33 (s, 3H), 2.14 (s, 3H), 2.10 (s, 3H), 2.09 (s, 3H), 2.01 (s, 3H), 1.63 (s, 3H), 1.34 (s, 18H), 0.56 (s, 3H), 0.55 (s, 3H). |
| Cpd. 11M | 51% | 6.82 (d, 1H), 6.72 (d, 1H), 6.48-6.58 (m, 3H), 3.68 (br.s, 2H), 2.90 (br.s, 2H), 2.12 (s, 6H), 1.82 (s, 3H), 1.39 (br.s, 2H), 1.16 (br.s, 4H), 0.50 (s, 3H), 0.48 (s, 3H) |
| Cpd. 12M | 27% | δ 7.92 (d, 1H, J = 5.7 Hz), 7.14-7.16 (m, 2H), 6.94-7.00 (m, 4H), 6.82 (d, 1H, J = 4.9 Hz), 6.71 (d, 1H, J = 4.9 Hz), 4.09 (s, 2H), 2.14 (s, 3H), 2.12 (s, 3H), 2.06 (s, 3H), 2.03 (s, 3H), 1.70 (s, 3H), 0.44 (s, 3H), 0.40 (s, 3H). |
| Cpd. 13M | 27% | δ 7.60-7.73 (m, 1H), 7.05-7.35 (m, 4H), 6.46-6.55 (m, 3H), 3.56-3.78 (m, 2H), 3.01-3.18 (m, 1H), 2.77 (br.s, 2H), 1.73-2.30 (m, 12H), 1.39 (br.s, 2H), 1.11 (br.s, 4H), 1.02-1.13 (m, 6H), 0.62-0.93 (m, 6H) |
| Cpd. 14M | 55% | δ 7.96 (d, 1H, J = 6.7 Hz), 7.44 (d, 1H, J = 8.7 Hz), 7.18-7.29 (m, 3H), 6.92-7.13 (m, 6H), 4.10 (m, 2H), 3.14 (sept, 1H, J = 6.9 Hz), 2.15 (s, 3H), 2.14 (s, 3H) |
| Cpd. 15M | 59% | δ 7.49 (d, 2H, J = 8.7 Hz), 6.86 (s, 1H), 6.59 (d, 2H, J = 8.7 Hz), 6.46-6.54 (m, 3H), 3.71 (br.s, 2H), 2.91 (br.s, 2H), 2.54 (s, 6H), 2.22 (s, 3H), 1.77 (s, 3H), 1.39 (br.s, 2H), 1.15 (br.s, 4H), 0.65 (s, 3H), 0.62 (s, 3H). |
| Cpd. 16M | 21% | 7.97 (d, 1H, J = 8.5 Hz), 7.50 (d, 2H, J = 8.7 Hz), 7.13-7.15 (m, 2H), 6.94-7.02 (m, 4H), 6.88 (s, 1H), 6.60 (d, 2H, J = 8.7 Hz), 4.10 (s, 2H), 2.55 (s, 6H), 2.15 (s, 3H), 2.14 (s, 3H), 2.13 (s, 3H), 2.12 (s, 3H), 1.61 (s, 3H), 0.56 (s, 3H), 0.53 (s, 3H). |
| Cpd. 17M | 90% | 7.31 (d, 2H, J = 8.1 Hz), 7.02 (d, 2H, J = 8.1 Hz), 6.46-6.58 (m, 3H), 3.70 (br.s, 2H), 2.90 (br.s, 2H), 2.26 (s, 3H), 2.20 (s, 3H), 2.16 (s, 3H), 1.97 (s, 3H), 1.75 (s, 3H), 1.40 (br.s, 2H), 1.16 (br.s, 4H), 0.65 (s, 3H), 0.60 (s, 3H). |
| Cpd. 18M | 67% | δ 7.37 (d, 2H, J = 8.6 Hz), 6.61 (d, 2H, J = 8.6 Hz), 6.47-6.54 (m, 3H), 3.73 (br.s, 2H), 2.92 (br.s, 2H), 2.55 s, 6H), 2.35 (s, 3H), 2.21 (s, 3H), 2.07 (s, 3H), 1.76 (s, 3H), 1.40 (br.s, 2H), 1.17 (br.s, 4H), 0.67 (s, 3H), 0.64 (s, 3H) |
| Cpd. 24M | 71% | 6.50-6.56 (m, 3H), 3.72 (br.s, 2H), 2.92 (br.s, 2H), 2.59 (br.s, 4H), 2.21 (s, 3H), 2.13 (s, 3H), 1.81 (s, 3H), 1.58 (br.s, 4H), 1.42 (br.s, 2H), 1.17 (br.s, 4H), 0.57 (s, 3H), 0.51 (s, 3H). |
| Cpd. 25M | 67% | 7.93 (d, 1H, J = 8.2 Hz), 7.12-7.19 (m, 2H), 6.94-7.02 (m, 4H), 4.06-4.15 (m, 4H), 2.59 (br.s, 4H), 2.19 (s, 3H), 2.14 (s, 6H), 2.04 (s, 3H), 1.71 (s, 3H), 1.58 (br.s, 4H), 0.52 (s, 3H), 0.42 (s, 3H) |
| Cpd. 32M | 74% | 7.13-7.20 (m, 2H), 6.94-7.02 (m, 4H), 4.11 (s, 2H), 2.52-2.63 (m, 4H), 2.18 (s, 3H), 2.15 (s, 3H), 2.14 (s, 3H), 2.02 (s, 3H), 1.72 (s, 3H), 1.13 (s, 3H), 1.12 (s, 3H), 0.51 (s, 3H), 0.43 (s, 3H). |
| Cpd. 28M | 82% | 7.12-7.16 (m, 2H), 7.04-7.06 (m, 1H), 6.47-6.57 (m, 3H), 3.70 (br.s, 2H), 2.90 (br.s, 2H), 2.31 (s, 3H), 2.24 (s, 3H), 2.14 (s, 3H), 1.82 (s, 3H), 1.36 (br.s, 2H), 1.15 (br.s, 4H), 0.60 (s, 3H), 0.57 (s, 3H). |
| Cpd. 29M | 77% | 7.64 (d, 2H, J4 = 1.7 Hz), 7.51 t, 1H, J4 = 1.7 Hz), 6.48-6.56 (m, 3H), 3.70 (br.s, 2H), 2.91 (br.s, 2H), 2.42 (s, 3H), 2.28 (s, 3H), 2.18 (s, 3H), 1.84 (s, 3H), 1.39 (br.s, 2H), 1.31 (s, 18H), 1.16 (br.s, 4H), 0.64 (s, 3H), 0.61 (s, 3H). |
| Cpd. 30M | 84% | 7.49 (d, 1H), 7.26 (d, 1H, J = 7.9 Hz), 7.19-7.21 (m, 1H), 7.02 (br.s, 1H), 6.47-6.59 (m, 3H), 3.75 (br.s, 2H), 3.56 (br.s, 1H), 2.92 (br.s, 2H), 2.23 (s, 3H), 2.15 (s, 3H), 2.11 (s, 3H), 1.81 (s, 3H), 1.40 (br.s, 2H), 1.22 (d, 3H, J = 6.9 Hz), 1.19 (d, 3H, J = 6.9 Hz), 1.17 (br.s, 4H), 0.65 (s, 3H), 0.62 (s, 3H). |
| Cpd. 33M | 72% | 7.94 (m, 1H), 7.54 (d, 2H, J = 8.4 Hz), 7.06-7.16 (m, 5H), 6.93-6.99 (m, 4H), 4.10 (m, 2H), 2.30 (s, 3H), 2.17 (s, 6H), 2.13 (s, 3H), 2.06 (s, 3H), 1.70 (s, 3H), 0.56 (s, 3H), 0.47 (s, 3H). |
| Cpd. 34M | 69% | 7.98 (m, 1H), 7.64 (d, 2H, J4 = 1.7 Hz), 7.51 (t, 1H, J4 = 1.7 Hz), 7.11-7.13 (m, 2H), 6.93-6.99 (m, 4H), 4.10 (m, 2H), 2.41 (s, 3H), 2.21 (s, 3H), 2.17 (s, 3H), 2.13 (s, 3H), 2.09 (s, 3H), 1.72 (s, 3H), 1.30 (s, 18H), 0.59 (s, 3H), 0.50 (s, 3H). |
| Cpd. 31M | 67% | 6.49-6.59 (m, 3H), 3.73 (br.s, 2H), 2.93 (br.s, 2H), 2.80-2.85 (m, 1H), 2.24 (s, 3H), 2.20 (s, 3H), 2.15 (s, 3H), 1.92-2.05 (m, 2H), 1.80 (s, 3H), 1.40-1.66 (m, 7H), 1.07-1.30 (m, 7H), 0.52 (s, 3H), 0.48 (s, 3H). |
| Cpd. 26M | 79% | 7.99 (d, 1H, J = 6.9 Hz), 7.13-7.18 (m, 2H), 6.94-7.02 (m, 4H), 4.11 (m, 2H), 2.86 (m, 1H), 2.20 (s, 3H), 2.19 (s, 3H), 2.16 (s, 3H), 2.14 (s, 3H), 2.07 (s, 3H), 1.67 (s, 3H), 1.51-1.70 (m, 5H), 1.08-1.27 (m, 5H), 0.49 (s, 3H), 0.39 (s, 3H). |
| Cpd. 19M | 66% | δ 7.77-7.89 (m, 1H), 7.08 (m 2H), 6.74-6.85 (m, 1H), 6.48-6.68 (m, 3H), 5.86 (s, 1H), 4.23 (s, 2H), 2.08 (s, 3H), 2.02 (s, 3H), 1.94 (s, 3H), 1.83 (s, 3H), 0.61 (s, 3H), 0.54 (s, 3H). |
| Cpd. 20M | 61% | ¹H NMR (C₆D₆, 400 MHz): δ 7.70 (d, J = 1.2 Hz, 2H), 7.58 (d, J = 7.5 Hz, 1H), 7.13-7.20 (m, 1H), 6.89-7.09 (m, 4H), 6.77 (d, J = 7.4 Hz, 1H), 6.50-6.67 (m, 3H), 5.95 (s, 1H), 4.08-4.29 (m, 2H), 2.20 (s, 3H), 2.02 (s, 3H), 1.96 (s, 3H), 0.69 (s, 3H), 0.62 (s, 3H). |
| Cpd. 21M | 71% | δ 7.57 (d, J = 8.0 Hz, 1H), 7.45 (dd, J = 8.5, 5.4 Hz, 2H), 6.98-7.09 (m, 2H), 6.71-6.87 (m, 3H), 6.46-6.68 (m, 3H), 5.99 (s, 1H), 3.98-4.26 (m, 2H), 2.12 (s, 3H), 2.01 (s, 3H), 1.96 (s, 3H), 0.65 (s, 3H), 0.63 (s, 3H). |
| Cpd. 22M | 42% | δ 7.72-7.86 (m, 1H), 7.04-7.13 (m, 2H), 6.73-6.86 (m, 1H), 6.50-6.70 (m, 3H), 6.04 (s, 1H), 4.13-4.36 (m, 2H), 1.99 (s, 3H), 1.97 (s, 3H), 1.93 (s, 3H), 1.24 (d, J = 6.9 Hz, 4H), 1.13 (d, J = 6.9 Hz, 3H), 0.72 (s, 3H), 0.63 (s, 3H). |

Part III—Batch EPM/EPDM Co-Polymerizations (General Procedure)

The batch co-polymerizations were carried out in a 2-liter batch autoclave equipped with a double intermig and baffles. The reaction temperature was set on 90+/−3° C. (data shown in Tables 1, 2, 3 and 4) (120+/−3° C. for reactions in Table 5) and controlled by a Lauda Thermostat. The feed streams (solvents and monomers) were purified by contacting with various adsorption media to remove catalyst killing impurities such as water, oxygen and polar compounds as is known to those skilled in the art. During polymerisation the ethylene and propylene monomers were continuously fed to the gas cap of the reactor. The pressure of the reactor was kept constant by a back-pressure valve.

In an inert atmosphere of nitrogen, the reactor was filled with pentamethylheptane (PMH) (950 mL), MAO-10T (Crompton, 10 wt % in toluene) or TiBA, BHT (2,6-Di-tert-butyl-4-methylphenol) and, for the EPDM high ENB experiments, 5-ethylidene-2-norbonene (ENB). The reactor was heated to 90° C. (or 120° C. resp.), while stirring at 1350 rpm. The reactor was pressurized and conditioned under a determined ratio of ethylene, propylene and, for the EPDM/EPDM high ENB experiments, hydrogen (0.35 NL/h) was dosed additionally. After 15 minutes, the catalyst component and the borate co-catalyst when applicable were added into the reactor (0.02-0.14 μmol depending on catalyst productivity) and the catalyst vessel was rinsed with PMH (50 mL) subsequently. After 10 minutes of polymerisation, the monomer flow was stopped and the solution was carefully dumped in an Erlenmeyer flask of 2 L, containing a solution of lrganox-1076 in iso-propanol and dried over night at 100° C. under reduced pressure. The polymers were analysed for molecular-weights (SEC-IR) and composition (FT-IR). The experimental conditions and results are given at the bottom of the tables.

1. Polymerization

TABLE 1

EPM 400/200 NL/h; 90° C. 7 bar; MAO-10T

| Catalyst | Cat dosing | ppm M-cont | m % C2 | m % C3 | Mn | Mw | Mw/Mn |
|---|---|---|---|---|---|---|---|
| CE 1M | 0.05 | 0.58 | 44.2 | 55.8 | 153 | 321 | 2.1 |
| Cpd. 1M | 0.07 | 0.27 | 51.3 | 48.7 | 309 | 661 | 2.1 |
| Cpd. 2M | 0.02 | 0.13 | 43.3 | 56.7 | 310 | 696 | 2.2 |
| Cpd. 3M | 0.07 | 0.66 | 48.9 | 51.1 | 205 | 398 | 1.9 |
| Cpd. 4M | 0.05 | 0.16 | 36.5 | 63.5 | 210 | 418 | 2.0 |
| Cpd. 5M | 0.05 | 0.28 | 36.5 | 63.5 | 202 | 383 | 1.9 |
| Cpd. 7M | 0.05 | 0.55 | 38.0 | 62.0 | 327 | 621 | 1.9 |
| Cpd. 8M | 0.02 | 0.15 | 47.3 | 52.7 | 408 | 809 | 2.0 |
| Cpd. 9M | 0.02 | 0.22 | 45.7 | 54.3 | 314 | 606 | 1.9 |
| Cpd. 10M | 0.05 | 0.83 | 48.3 | 51.7 | 301 | 609 | 2.0 |
| Cpd. 11M | 0.05 | 0.50 | 47.7 | 52.3 | 239 | 454 | 1.9 |
| Cpd. 12M | 0.02 | 0.15 | 45.2 | 54.8 | 337 | 620 | 1.8 |
| Cpd. 13M | 0.02 | 0.25 | 41.8 | 58.2 | 372 | 676 | 1.8 |
| Cpd. 14M | 0.02 | 0.11 | 45.1 | 54.9 | 386 | 758 | 2.0 |
| Cpd. 16M | 0.07 | 0.45 | 41.8 | 58.2 | 220 | 532 | 2.4 |
| Cpd. 17M | 0.07 | 0.57 | 40.2 | 59.8 | 314 | 661 | 2.1 |
| Cpd. 18M | 0.07 | 0.44 | 45.6 | 54.4 | 231 | 514 | 2.2 |
| Cpd. 19M | 0.03 | 0.5 | 36 | 64 | 264 | 573 | 2.2 |
| Cpd. 20M | 0.03 | 0.2 | 34 | 66 | 315 | 687 | 2.2 |
| Cpd. 21M | 0.03 | 0.3 | 32.1 | 67.9 | 272 | 581 | 2.1 |
| Cpd. 22M | 0.03 | 0.6 | 32.2 | 67.8 | 501 | 1074 | 2.1 |
| Cpd. 23 | 0.05 | 0.41 | 49.1 | 50.9 | 180 | 403 | 2.2 |
| Cpd. 24M | 0.05 | 0.23 | 46.5 | 53.5 | 314 | 663 | 2.1 |
| Cpd. 25M* | 0.04 | 0.21 | 45.3 | 54.7 | 299 | 639 | 2.1 |
| Cpd. 25M* | 0.04 | 0.29 | 44.2 | 55.8 | 296 | 666 | 2.3 |

MAO-10T = 450 micromoles/I; BHT/Al = 2; C3 = 400 Nl/h; C2 = 200 Nl/h; P = 7 bar; t = 10 min; T = 90° C.

TABLE 2

EPM 400/200 NL/h; 90° C. 7 bar; TiBA/trityl tetrakis(pentafluorophenyl)borate (TBF20)

| Catalyst | Cat dosing | ppm M-cont | m % C2 | m % C3 | Mn | Mw | Mw/Mn |
|---|---|---|---|---|---|---|---|
| CE 1M | 0.4 | 1.6 | 39.4 | 60.3 | 134 | 290 | 2.2 |
| Cpd. 23M | 0.05 | 0.33 | 51.8 | 48.2 | 195 | 420 | 2.2 |
| Cpd. 24M | 0.07 | 0.21 | 45.8 | 54.2 | 179 | 576 | 3.2 |
| Cpd. 25M | 0.04 | 0.21 | 45.3 | 54.7 | 299 | 639 | 2.1 |
| Cpd. 26M | 0.04 | 0.29 | 44.2 | 55.8 | 296 | 666 | 2.3 |
| Cpd. 20M | 0.04 | 0.8 | 32.4 | 67.6 | 240 | 532 | 2.2 |
| Cpd. 21M | 0.04 | 0.4 | 30.4 | 69.6 | 191 | 427 | 2.2 |
| Cpd. 22M | 0.04 | 1.7 | 27.8 | 72.2 | 418 | 981 | 2.3 |

TiBA = 450 micromoles/I; BHT/Al = 2; TRITYL TETRAKIS(PENTAFLUOROPHENYL)BORATE B/Ti = 2; C3 = 400 Nl/h; C2 = 200 Nl/h; P = 7 bar; t = 10 min; T = 90° C.

TABLE 3

EPM 250/250 NL/h; 90° C. 7 bar; MAO-10T + few TiBA/borate

| Catalyst | Cat dosing | M-cont | C2 | C3 | Mn | Mw | Mz | Mw/Mn |
|---|---|---|---|---|---|---|---|---|
| MAO | | | | | | | | |
| CE 1M | 0.02 | 0.8 | 37.7 | 62.3 | 175 | 396 | 1244 | 2.3 |
| Cpd. 1M | 0.07 | 0.2 | 53.3 | 46.7 | 381 | 814 | 2208 | 2.1 |
| Cpd. 2M | 0.03 | 0.1 | 59.3 | 40.7 | 510 | 962 | 1995 | 1.9 |
| Cpd. 3M | 0.05 | 0.5 | 50.3 | 49.7 | 220 | 451 | 1125 | 2.0 |
| Cpd. 4M | 0.03 | 0.1 | 48.4 | 51.6 | 237 | 480 | 1140 | 2.0 |
| Cpd. 5M | 0.02 | 0.3 | 51.4 | 48.6 | 235 | 444 | 947 | 1.9 |
| Cpd. 7M | 0.02 | 0.5 | 54.4 | 45.6 | 403 | 747 | 1518 | 1.9 |
| Cpd. 8M | 0.02 | 0.1 | 57.6 | 42.4 | 572 | 1087 | 2422 | 1.9 |
| Cpd. 9M | 0.02 | 0.2 | 58.2 | 41.8 | 394 | 734 | 1537 | 1.9 |
| Cpd. 10M | 0.05 | 0.8 | 57.0 | 43.0 | 368 | 727 | 1561 | 2.0 |
| Cpd. 11M | 0.02 | 0.4 | 56.1 | 43.9 | 264 | 551 | 1332 | 2.1 |
| Cpd. 12M | 0.02 | 0.1 | 58.7 | 41.3 | 373 | 781 | 1739 | 2.1 |
| Cpd. 13M | 0.02 | 0.2 | 56.5 | 43.5 | 485 | 880 | 2026 | 1.8 |
| Cpd. 14M | 0.02 | 0.1 | 55.6 | 44.4 | 538 | 984 | 1970 | 1.8 |
| Cpd. 16M | 0.07 | 0.2 | 52.3 | 47.7 | 280 | 690 | 1825 | 2.5 |
| Cpd. 17M | 0.07 | 0.4 | 56.7 | 43.3 | 387 | 812 | 1850 | 2.1 |
| Cpd. 18M | 0.07 | 0.3 | 59.1 | 40.8 | 276 | 664 | 1724 | 2.4 |
| Cpd. 19M | 0.02 | 0.5 | 48.8 | 51.2 | 316 | 773 | 1901 | 2.4 |
| Cpd. 20M | 0.02 | 0.2 | 49.8 | 50.2 | 355 | 792 | 1933 | 2.2 |
| Cpd. 21M | 0.02 | 0.3 | 46.5 | 53.5 | 305 | 726 | 2274 | 2.4 |
| Cpd. 22M | 0.02 | 0.3 | 46.7 | 53.3 | 629 | 1276 | 3043 | 2 |
| Cpd. 24M | 0.03 | 0.2 | 58.8 | 41.2 | 364 | 811 | 2064 | 2.2 |
| TIBA/trityl tetrakis(pentafluorophenyl)borate 2 equiv. M/B | | | | | | | | |
| Cpd. 26M | 0.04 | 0.2 | 54.7 | 45.3 | 362 | 841 | 2215 | 2.3 |
| Cpd. 25M | 0.04 | 0.2 | 59.8 | 40.2 | 401 | 858 | 1984 | 2.1 |

MAO-10T = 450 micromoles/I; BHT/Al = 2; C3 = 250 Nl/h; C2 = 250 Nl/h; P = 7 bar; t = 10 min; T = 90° C.

TABLE 4

EPDM 400/200 NL/h high ENB; 90° C. 7 bar; MAO-10T

| Catalyst | Cat dosing | ppm M-cont | m % C2 | m % C3 | M % ENB | Mn | Mw | Mw/Mn |
|---|---|---|---|---|---|---|---|---|
| CE1M | 0.14 | 1.3 | 38.9 | 55.1 | 6.0 | 142 | 294 | 2.1 |
| Cpd. 1M | 0.1 | 0.5 | 43.1 | 50.6 | 6.3 | 233 | 526 | 2.3 |
| Cpd. 2M | 0.05 | 0.3 | 41.0 | 55.4 | 3.6 | 201 | 471 | 2.3 |
| Cpd. 3M | 0.14 | 2.7 | 33.7 | 60.7 | 5.6 | 178 | 353 | 2.0 |
| Cpd. 4M | 0.1 | 0.7 | 34.1 | 64.6 | 1.3 | 195 | 386 | 2.0 |
| Cpd. 5M | 0.14 | 1.1 | 36.9 | 57.7 | 5.4 | 154 | 289 | 1.9 |
| Cpd. 7M | 0.14 | 1.9 | 40.8 | 53.3 | 5.9 | 242 | 447 | 1.9 |
| Cpd. 8M | 0.07 | 0.5 | 40.8 | 55.1 | 4.1 | 273 | 513 | 1.9 |
| Cpd. 9M | 0.07 | 0.9 | 43.2 | 51.4 | 5.4 | 243 | 426 | 1.8 |
| Cpd. 10M | 0.14 | 1.0 | 45.6 | 47.9 | 6.5 | 235 | 478 | 2.0 |
| Cpd. 11M | 0.14 | 0.7 | 42.6 | 51.3 | 6.1 | 200 | 372 | 1.9 |
| Cpd. 12M | 0.05 | 0.5 | 40.9 | 54.7 | 4.4 | 250 | 465 | 1.9 |
| Cpd. 13M | 0.10 | 0.8 | 43.3 | 51.6 | 5.1 | 251 | 473 | 1.9 |
| Cpd. 14M | 0.07 | 0.4 | 38.7 | 57.9 | 3.4 | 194 | 408 | 2.1 |
| Cpd. 16M | 0.14 | 1.3 | 39.1 | 57.3 | 3.6 | 179 | 389 | 2.2 |
| Cpd. 17M | 0.14 | 1.7 | 42.7 | 51.3 | 6.0 | 241 | 495 | 2.1 |
| Cpd. 18M | 0.18 | 1.4 | 43.0 | 53.7 | 3.3 | 183 | 391 | 2.1 |
| Cpd. 19M | 0.05 | 0.8 | 32.4 | 62 | 5.6 | 264 | 537 | 2 |
| Cpd. 20M | 0.05 | 0.4 | 32.5 | 63.7 | 3.8 | 252 | 526 | 2.1 |
| Cpd. 21M | 0.05 | 0.6 | 30.3 | 65.9 | 3.8 | 220 | 468 | 2.1 |
| Cpd. 22M | 0.05 | 0.5 | 33.6 | 62.4 | 4.0 | 268 | 543 | 2 |
| Cpd. 23M | 0.4 | 1.29 | 46.9 | 46.3 | 6.8 | 158 | 338 | 2.1 |
| Cpd. 24M | 0.10 | 0.48 | 45.6 | 49.2 | 5.2 | 228 | 517 | 2.3 |
| TIBA/trityl tetrakis(pentafluorophenyl)borate 2 equiv. M/B | | | | | | | | |
| Cpd. 25M* | 0.05 | 0.28 | 43.3 | 53.7 | 3.0 | 198 | 444 | 2.2 |
| Cpd. 26M* | 0.05 | 0.25 | 43.0 | 53.7 | 3.3 | 195 | 435 | 2.2 |

MAO-10T = 450 micromoles/I; BHT/Al = 2; C3 = 400 Nl/h; C2 = 200 Nl/h; 0.35 Nl/h H2; 2.8 ml ENB; P = 7 bar; t = 10 min; T = 90° C.
*TiBA = 450 micromoles/I; BHT/Al = 2; trityl tetrakis(pentafluorophenyl)borate B/Ti = 2 instead of MAO-10T = 450 micromoles/I;

TABLE 5

EPM 400/172 NL/h, 120° C., 7.4 bar; TiBA/trityl tetrakis(pentafluorophenyl)borate

| Catalyst | Cat dosing | ppm M-cont | m % C2 | m % C3 | Mn | Mw | Mw/Mn |
|---|---|---|---|---|---|---|---|
| CE1M | 0.05 | 1.6 | 43.8 | 56.2 | 111 | 261 | 2.3 |
| Cpd. 20M | 0.05 | 0.6 | 37.8 | 62.2 | 152 | 328 | 2.2 |
| Cpd. 21M | 0.05 | 0.4 | 36.2 | 63.8 | 128 | 272 | 2.1 |
| Cpd. 22M | 0.05 | 1.8 | 37 | 63 | 176 | 418 | 2.4 |
| Cpd. 23M | 0.05 | 0.6 | 55.2 | 44.8 | 137 | 316 | 2.3 |
| Cpd. 24M | 0.1 | 0.5 | 49.7 | 50.3 | 132 | 364 | 2.8 |
| Cpd. 2M | 0.04 | 0.62 | 52.0 | 48.0 | 215 | 435 | 2.0 |
| Cpd. 25M | 0.10 | 0.55 | 48.9 | 51.1 | 170 | 398 | 2.3 |
| Cpd, 26M | 0.05 | 0.86 | 47.3 | 52.7 | 190 | 424 | 2.2 |

TiBA = 450 micromoles/l; BHT/Al = 1; trityl tetrakis(pentafluorophenyl)borate B/Ti = 2; C3 = 400 Nl/h; C2 = 172 Nl/h; P = 7.4 bar; t = 10 min; T = 120° C.

The invention claimed is:

1. A metal complex of the formula (1)

$$TCyLMZ_p \quad (1),$$

wherein
M is a group 4 metal,
Z is an anionic ligand,
p is the number 1 or 2,
TCy is a thiophene-fused cyclopentadienyl-type ligand of the formula (2)

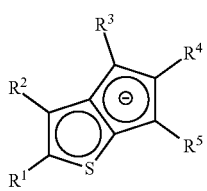

(2)

wherein
$R^1$ and $R^2$ are independently selected from the group consisting of
hydrogen,
halogen,
$C_1$-$C_{10}$ alkyl,
$C_5$-$C_{10}$ cycloalkyl,
unsubstituted $C_6$-$C_{10}$ aryl,
$C_6$-$C_{10}$ aryl substituted with $C_1$-$C_{10}$-alkyl, and
$C_6$-$C_{10}$ aryl substituted with $C_1$-$C_4$-dialkyl amino, $SiR_3$, OR, $NR_2$, SR or $PR_2$,
wherein each R is independently selected from the group consisting of
$C_1$-$C_{10}$-alkyl,
$C_5$-$C_{10}$-cycloalkyl,
$C_6$-$C_{10}$-aryl,
$C_6$-$C_{10}$-aryl substituted with $C_1$-$C_{10}$-alkyl, and
$C_6$-$C_{10}$-aryl substituted with $C_1$-$C_4$-dialkyl amino,
or
$R^1$, $R^2$ and the 2 carbon atoms of the double bond in the thiophene ring form an aliphatic $C_5$-$C_6$-cycloalkene ring which is unsubstituted or $C_1$-$C_4$-alkyl substituted;
$R^3$, $R^4$ and $R^5$ are independently selected from the group consisting of
hydrogen,
$C_1$-$C_4$ alkyl,
unsubstituted $C_6$-$C_{10}$-aryl,
$C_6$-$C_{10}$-aryl substituted with $C_1$-$C_4$-alkyl,
$C_6$-$C_{10}$-aryl substituted with halogen, and
$C_6$-$C_{10}$-aryl substituted with halogen together with $C_1$-$C_4$-alkyl, $SiR_3$, OR, $NR_2$, SR or $PR_2$,
wherein R is selected independently from the group consisting of $C_1$-$C_{10}$-alkyl, $C_5$-$C_{10}$-cycloalkyl, unsubstituted $C_6$-$C_{10}$-aryl, $C_6$-$C_{10}$-aryl substituted with $C_1$-$C_{10}$-alkyl, and $C_6$-$C_{10}$-aryl substituted with $C_1$-$C_4$-dialkyl amino; and
L is an amidinate ligand of the formula (3) that is bonded to the metal M via the imine nitrogen atom,

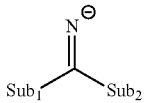

(3)

wherein
$Sub_1$ is selected from the group consisting of an unsubstituted $C_6$-$C_{10}$-aromatic substituent, a $C_1$-$C_4$-alkyl substituted $C_6$-$C_{10}$-aromatic substituent, and a halogen-substituted $C_6$-$C_{10}$-aromatic substituent, and
$Sub_2$ is a substituent comprising a heteroatom of group 15, through which $Sub_2$ is bonded to the imine carbon atom and is of the of the formula —$NR^8R^9$ wherein $R^8$ and $R^9$ are independently selected from the group consisting of hydrocarbyl, halogenated aliphatic hydrocarbyl, aromatic hydrocarbyl, and halogenated aromatic hydrocarbyl, wherein $R^8$, optionally, forms a heterocyclic structure with $R^9$ or $Sub_1$;
or $Sub_1$ and $Sub_2$, together with the imino group form formula (3a)

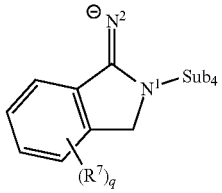

(3a)

bonded to the metal M via the imine nitrogen atom $N^2$,
wherein the benzo ring fused to the amidine ring optionally contains further substituents $R^7$, which are selected from the group consisting of $C_1$-$C_4$-alkyl and halogen and whereby q is a number of 0 to 4, $Sub_4$ is an aliphatic or aromatic, cyclic, or linear substituent comprising a group 14 atom through which $Sub_4$ is bonded to the amino nitrogen atom $N^1$.

2. The metal complex according to claim 1, wherein M is titanium.

3. The metal complex according to claim 1, wherein Z is independently selected from the group consisting of a halogen atom, a $C_{1-10}$ alkyl group, a $C_{7-20}$ aralkyl group, a $C_{6-20}$ aryl group and a $C_{1-20}$ hydrocarbon-substituted amino group.

4. The metal complex according to claim 1, wherein
M is Ti,
Z is selected from the group consisting of chloride and $C_1$-$C_4$-alkyl, and
p is 2.

5. The metal complex according to claim 1, wherein $Sub_1$ is selected from the group consisting of unsubstituted phenyl,
phenyl substituted with $C_1$-$C_4$-alkyl,
phenyl substituted with Cl, and
phenyl substituted with $C_1$-$C_4$-alkyl and Cl, and $Sub_2$ is an amino radical of the formula —$NR^8R^9$ with $R^8$ and $R^9$ being independently selected from the group consisting of aliphatic hydrocarbyl, halogenated aliphatic hydrocarbyl, aromatic hydrocarbyl, and halogenated aromatic hydrocarbonyl whereby $R^8$ optionally forms a heterocyclic structure with $R^9$ or $Sub_1$.

6. The metal complex according to claim 1, wherein TCy is a thiophene fused cyclopentadienyl ligand of the formula (2a)

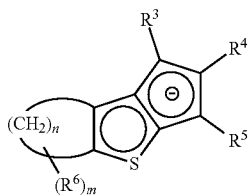

(2a)

wherein
n is a number of 3 to 4 and
$R^6$ for each is independently selected from a $C_1$-$C_4$-alkyl,
m is a number of 0 to 4.

7. The metal complex according to claim 1, wherein the ligand L is of the formula (3a)

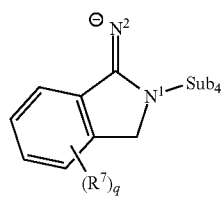

(3a)

wherein the amidine-containing ligand L of formula (3a) is bonded to the metal M via the imine nitrogen atom $N^2$, wherein $R^7$ is independently selected from the group consisting of $C_1$-$C_4$-alkyl and halogen, and q is a number of 0 to 4, and
$Sub_4$ is a phenyl which is unsubstituted or substituted by one or more substituents from the group selected from Cl, F and $C_1$-$C_4$-alkyl.

8. A process for manufacturing a metal complex according to claim 1, comprising reacting a metal complex of formula (3)

$$TCyMZ_{p+1} \qquad (3)$$

with an amidine of the formula LH or its hydrohalogen acid salt LH.HZ wherein L has the meaning as defined in claim 1 and Z means a halogen selected from Cl, Br, or F.

9. A catalyst system comprising
a) the metal complex according to claim 1,
b) an activator and
c) optionally a scavenger.

10. The catalyst system according to claim 9 wherein the scavenger c) is a hydrocarbyl of a metal or metalloid of group 1-13 or its reaction products with at least one sterically hindered compound containing a group 15 or 16 atom.

11. The catalyst system according to claim 10 wherein the activator b) is a borane, a borate or an organoaluminum compound.

12. A process for the preparation of a polymer by polymerizing at least one olefinic monomer comprising contacting said monomer with the metal complex according to claim 1.

13. The process according to claim 12 wherein ethylene and at least a $C_3$-$C_{12}$-α-olefin are used as olefinic monomers.

14. The process according to claim 12 wherein ethylene at least one $C_{3-12}$ alpha olefin and at least one non-conjugated diene selected from the group consisting of 5-methylene-2-norbornene 5-ethylidene-2-norbornene, 5-vinylnorbornene, 2,5-norbornadiene, dicyclo-pentadiene and vinylcyclohexene, are used as olefinic monomers.

15. A process for the preparation of an olefinic polymer by contacting at least one olefinic monomer with a catalyst system comprising
the metal complex according to claim 1,
an activator, and
optionally a scavenger.

* * * * *